United States Patent
Moeller et al.

(10) Patent No.: US 9,745,505 B2
(45) Date of Patent: Aug. 29, 2017

(54) METHODS OF HYDRAULICALLY FRACTURING AND RECOVERING HYDROCARBONS

(71) Applicants: Timothy Moeller, Magnolia, TX (US); Walter Sherwood, Glenville, NY (US); Mark Land, Houston, TX (US); John Ely, Montgomery, TX (US); Thomas Dyk, Cody, WY (US); Andrew Hopkins, Houston, TX (US)

(72) Inventors: Timothy Moeller, Magnolia, TX (US); Walter Sherwood, Glenville, NY (US); Mark Land, Houston, TX (US); John Ely, Montgomery, TX (US); Thomas Dyk, Cody, WY (US); Andrew Hopkins, Houston, TX (US)

(73) Assignee: Melior Innovations, Inc., Houston, TX (US)

( * ) Notice: Subject to any disclaimer, the term of this patent is extended or adjusted under 35 U.S.C. 154(b) by 0 days.

(21) Appl. No.: 14/324,056

(22) Filed: Jul. 3, 2014

(65) Prior Publication Data

US 2014/0326453 A1 Nov. 6, 2014

Related U.S. Application Data

(63) Continuation-in-part of application No. 14/268,150, filed on May 2, 2014.

(Continued)

(51) Int. Cl.
*C09K 8/588* (2006.01)
*E21B 43/267* (2006.01)
(Continued)

(52) U.S. Cl.
CPC .......... *C09K 8/588* (2013.01); *C04B 33/1352* (2013.01); *C04B 35/5603* (2013.01);
(Continued)

(58) Field of Classification Search
None
See application file for complete search history.

(56) References Cited

U.S. PATENT DOCUMENTS 3,409,868 A 11/1968 Salathiel
3,520,656 A 7/1970 Meadows
(Continued)

FOREIGN PATENT DOCUMENTS

EP 0490401 6/1992
EP 0560485 9/1993
(Continued)

OTHER PUBLICATIONS

International Search Report and Written Opinion of the International Searching Authority, PCT/US14/045494, mailed Nov. 4, 2014.
(Continued)

*Primary Examiner* — John J Figueroa
(74) *Attorney, Agent, or Firm* — Glen P. Belvis; Steptoe & Johnson, LLP.

(57) ABSTRACT

There is provided synthetic proppants, and in particular polysilocarb derived ceramic proppants. There is further provided hydraulic fracturing treatments utilizing these proppants, and methods of enhance hydrocarbon recovery.

32 Claims, 31 Drawing Sheets

Related U.S. Application Data

(60) Provisional application No. 61/843,014, filed on Jul. 4, 2013, provisional application No. 61/946,598, filed on Feb. 28, 2014, provisional application No. 61/818,906, filed on May 2, 2013, provisional application No. 61/818,981, filed on May 3, 2013.

(51) Int. Cl.
| | |
|---|---|
| *C08G 77/20* | (2006.01) |
| *C08G 77/50* | (2006.01) |
| *C08L 83/04* | (2006.01) |
| *C04B 33/135* | (2006.01) |
| *C04B 35/56* | (2006.01) |
| *C04B 35/571* | (2006.01) |
| *C08G 77/12* | (2006.01) |

(52) U.S. Cl.
CPC ............ *C04B 35/571* (2013.01); *C08G 77/20* (2013.01); *C08G 77/50* (2013.01); *C08L 83/04* (2013.01); *E21B 43/267* (2013.01); *C04B 2235/3217* (2013.01); *C04B 2235/3418* (2013.01); *C04B 2235/5436* (2013.01); *C04B 2235/5445* (2013.01); *C08G 77/12* (2013.01); *Y02P 40/69* (2015.11)

(56) References Cited

U.S. PATENT DOCUMENTS

| | | | |
|---|---|---|---|
| 4,208,471 A | 6/1980 | Bresak | |
| 4,298,063 A | 11/1981 | Regalbuto | |
| 4,433,069 A | 2/1984 | Harper | |
| 4,516,608 A | 5/1985 | Titus | |
| 4,546,163 A | 10/1985 | Haluska | |
| 4,547,468 A | 10/1985 | Jones | |
| 4,711,928 A | 12/1987 | Lee | |
| 4,840,781 A | 6/1989 | Noake | |
| 5,162,480 A | 11/1992 | Schilling | |
| 5,180,694 A | 1/1993 | Renlund | |
| 5,188,175 A | 2/1993 | Sweet | |
| 5,225,123 A | 7/1993 | Torobin | |
| 5,225,283 A | 7/1993 | Leung | |
| 5,275,980 A | 1/1994 | Schilling, Jr. | |
| 5,328,976 A | 7/1994 | Leung | |
| 5,354,602 A | 10/1994 | Stranford | |
| 5,354,830 A | 10/1994 | Williams | |
| 5,358,674 A | 10/1994 | Rabe | |
| 5,376,595 A | 12/1994 | Zupancic | |
| 5,436,207 A | 7/1995 | Atwell | |
| 5,438,025 A | 8/1995 | Leung | |
| 5,552,466 A | 9/1996 | Beckley | |
| 5,588,491 A | 12/1996 | Brugman | |
| 5,635,250 A | 6/1997 | Blum | |
| 5,698,340 A | 12/1997 | Xue | |
| 5,714,025 A | 2/1998 | Brungardt | |
| 5,872,070 A | 2/1999 | Dismukes | |
| 5,955,194 A | 9/1999 | Campbell | |
| 6,059,034 A * | 5/2000 | Rickards | C09K 8/805 |
| | | | 166/280.2 |
| 6,329,487 B1 | 12/2001 | Abel | |
| 6,348,554 B1 | 2/2002 | Roos | |
| 6,624,228 B1 | 9/2003 | Dismukes | |
| 6,635,215 B2 | 10/2003 | Sugimoto | |
| 7,036,591 B2 * | 5/2006 | Cannan | C09K 8/80 |
| | | | 166/280.2 |
| 7,090,027 B1 | 8/2006 | Williams | |
| 7,175,694 B2 | 2/2007 | Ma | |
| 7,287,573 B2 | 10/2007 | McNulty | |
| 7,789,147 B2 | 9/2010 | Brannon | |
| 7,942,302 B2 | 5/2011 | Roby | |
| 8,006,759 B1 | 8/2011 | Cochran | |
| 8,173,568 B2 | 5/2012 | Nishimura | |
| 2002/0198353 A1 | 12/2002 | Chen | |
| 2003/0102071 A1 | 6/2003 | Mako | |
| 2003/0150614 A1 | 8/2003 | Brown | |
| 2004/0009865 A1 | 1/2004 | Nair | |
| 2004/0074648 A1 | 4/2004 | Legras | |
| 2005/0028979 A1 | 2/2005 | Brannon | |
| 2005/0244641 A1 | 11/2005 | Vincent | |
| 2006/0042171 A1 | 3/2006 | Radtke | |
| 2006/0046920 A1 | 3/2006 | Odaka | |
| 2006/0069176 A1 | 3/2006 | Bowman | |
| 2006/0177661 A1 | 8/2006 | Smith | |
| 2006/0219600 A1 * | 10/2006 | Palamara | C04B 35/185 |
| | | | 209/3 |
| 2007/0015669 A1 * | 1/2007 | Zhang | C09K 8/18 |
| | | | 507/200 |
| 2007/0022913 A1 | 2/2007 | Wang | |
| 2007/0099790 A1 | 5/2007 | Wan | |
| 2008/0095942 A1 | 4/2008 | Sherwood | |
| 2008/0210421 A1 * | 9/2008 | Wilson | C09K 8/80 |
| | | | 166/254.1 |
| 2008/0241383 A1 | 10/2008 | Yoshino | |
| 2009/0202732 A1 | 8/2009 | Kruger | |
| 2009/0206025 A1 | 8/2009 | Ichikawa | |
| 2009/0209405 A1 | 8/2009 | Fei | |
| 2010/0156215 A1 | 6/2010 | Goertzen | |
| 2010/0160104 A1 | 6/2010 | Dinter | |
| 2010/0197526 A1 * | 8/2010 | Zhang | C09K 8/18 |
| | | | 507/105 |
| 2011/0008236 A1 | 1/2011 | Hinman | |
| 2011/0033708 A1 | 2/2011 | Harimoto | |
| 2011/0045963 A1 | 2/2011 | Harimoto | |
| 2011/0077176 A1 | 3/2011 | Smith | |
| 2011/0091722 A1 | 4/2011 | Koehne | |
| 2011/0160104 A1 | 6/2011 | Wu | |
| 2011/0247822 A1 | 10/2011 | Dams | |
| 2012/0121981 A1 | 5/2012 | Harimoto | |
| 2012/0160520 A1 | 6/2012 | Lumbye | |
| 2012/0172475 A1 | 7/2012 | Meador | |
| 2013/0122763 A1 | 5/2013 | Fish | |
| 2013/0206408 A1 * | 8/2013 | Chatterjee | C04B 33/1352 |
| | | | 166/280.1 |
| 2013/0319677 A1 | 12/2013 | Hallundbaek | |
| 2014/0110110 A1 | 4/2014 | Rohring | |
| 2014/0264984 A1 | 9/2014 | Kosvintsev | |
| 2014/0274658 A1 | 9/2014 | Sherwood | |
| 2019/0274658 | 9/2014 | Sherwood | |
| 2014/0308585 A1 | 10/2014 | Han | |
| 2014/0318799 A1 | 10/2014 | Moeller | |
| 2014/0323364 A1 | 10/2014 | Sherwood | |
| 2014/0326453 A1 | 11/2014 | Moeller | |
| 2014/0343220 A1 | 11/2014 | Sherwood | |
| 2015/0027306 A1 | 1/2015 | Tan | |
| 2015/0175750 A1 | 6/2015 | Hopkins | |
| 2015/0252166 A1 | 9/2015 | Dukes | |
| 2015/0252170 A1 | 9/2015 | Diwanji | |
| 2015/0252171 A1 | 9/2015 | Molnar | |
| 2016/0046529 A1 | 2/2016 | Bricco | |
| 2016/0102528 A1 | 4/2016 | Wise | |
| 2016/0152889 A1 | 6/2016 | Hopkins | |
| 2016/0207780 A1 | 7/2016 | Dukes | |
| 2016/0207781 A1 | 7/2016 | Dukes | |
| 2016/0207782 A1 | 7/2016 | Diwanji | |
| 2016/0207783 A1 | 7/2016 | Hopkins | |
| 2016/0207836 A1 | 7/2016 | Land | |
| 2016/0208412 A1 | 7/2016 | Sandgren | |

FOREIGN PATENT DOCUMENTS

| | | |
|---|---|---|
| WO | 2007070957 | 6/2007 |
| WO | WO2013059793 | 4/2013 |
| WO | WO2016118704 | 7/2016 |

OTHER PUBLICATIONS

International Search Report and Written Opinion of the International Searching Authority, PCT/US14/060500, mailed Feb. 24, 2015.

(56) References Cited

OTHER PUBLICATIONS

International Search Report and Written Opinion of the International Searching Authority, PCT/US15/018210, mailed May 20, 2015.
International Search Report and Written Opinion of the International Searching Authority, PCT/US15/018211, mailed May 27, 2015.
International Search Report and Written Opinion of the International Searching Authority, PCT/US2012/061329, mailed Jan. 8, 2013.
International Search Report and Written Opinion of the International Searching Authority, PCT/US2014/045500, mailed Nov. 3, 2014.
International Search Report and Written Opinion of the International Searching Authority, PCT/US14/045497, mailed Nov. 4, 2014.
International Search Report and Written Opinion of the International Searching Authority, PCT/US2014/045494, mailed Nov. 4, 2014.
International Search Report and Written Opinion of the International Searching Authority, PCT/US14/36522, mailed Nov. 5, 2014.
International Search Report and the Written Opinion of the International Searching Authority, PCT/US2015/018211, mailed May 27, 2015.
Interntional Search Report and the Written Opinion of the International Searching Authority, PCT/US2015/021861, mailed Sep. 16, 2015.
Interntional Search Report and the Written Opinion of the International Searching Authority, PCT/US2015/051997, mailed Mar. 3, 2016.
Interntional Search Report and the Written Opinion of the International Searching Authority, PCT/US2016/014245, mailed Mar. 24, 2016.
EEMS CSO 110 HT Product Data Sheet, Polycarbosiloxane liquid polymer for high temperature ceramic applications, Feb. 2010. 2 pp.
EEMS, CSO 111 HT Product Data Sheet, Stabilized polycarbosiloxane liquid polymer for high temperature ceramic applications, May 2010, 3 pp.
EEMS, CSO 121 Product Data Sheet, Polycarbosiloxane liquid polymer for fire-resistant non-ceramic applications and high temperature ceramic applications, Mar. 2010, 3 pp.
EEMS, CSO 300, 305, 310, 320 Products Data Sheet, Polycarbosiloxane liquid polymers, Jul. 10, 2010, 3 pp.
EEMS, CSO 315 Product Data Sheet, Polycarbosiloxane liquid polymer for pre-preg molding and wet lay-up processing of fiber reinforced composites, Sep. 2011, 1 pp.
EEMS, 500 Series Product Data Sheet; Liquid polymers for very high temperature ceramic applications, Jun. 2012, 3 pp.
EEMS, CSO 110 HT Material Safety Data Sheet, Feb. 26, 2010, 4 pp.
EEMS, CSO 121 HT Material Safety Data Sheet, Jun. 7, 2011, 4 pp.
EEMS, CSO 131 & 130 Material Safety Data Sheet, Jun. 27, 2012, 4 pp.
EEMS, CSO 230 Material Safety Data Sheet, Jun. 5, 2011, 4 pp.
EEMS, CSO 310 HT Material Safety Data Sheet, Jun. 7, 2010, 4 pp.
EEMS, CSO 350 Material Safety Data Sheet, Jun. 7, 2010, 4 pp.
EEMS, CSO 120 Product Data Sheet, Low-cost polycarbosiloxane liquid polymer for 2200° F. temperature stable ceramic applications, Sep. 2011, 1 pp.
EEMS, CSO 120 HT Material Safety Data Sheet, Jun. 7, 2011, 4 pp.
EEMS, CSO 230 HT Product Data Sheet, Polycarbosiloxane liquid polymer for high temperature ceramic applications, Mar. 2012, 3 pp.
EEMS, CSO 315 HT Material Safety Data Sheet, Jun. 7, 2010, 4 pp.
Applicant, Information disclosure statement of commercial activity, Jun. 17, 2016, 6 pp.
Sahin, Y., Preparation and some properties of SiC particle reinforced aluminum alloy composites, Materials and Design 24 (2003) 671-679, 9 pp., © 2003 Elsevier Science Ltd., doi:10.1016/S0261-3069(03)00156-0.
Salemi, S., Density Functional and Monte Carlo-Based Electron Transport Simulation in 4H-SiC(0001)/SiO2 DMOSFET Transition Region, 978-1-4673-5736-4/13/, © 2013 IEEE, 180-183, 4 pp.
Schawe, J., Riesen, R., Widmann, J., Schubnel, M., Jörimann, U., UserCom Jan. 2000, Information for Users of Meter Toledo thermal analysis systems, Brochure, 28 pp., Redaktion, Mettler Toledo GmbH, Analytical, Sonnenbergstrasse 74, CH-8603 Schwerzenhach, Schweiz.
Schiavion, M.A., Gervais, C., Babonneau, F., Soraru, G.D., Crystallization Behavior of Novel Silicon Boron Oxycarbide Glasses, Journal of the American Ceramic Society. vol. 87, No. 2. 203-208, 6 pp.
Schiavion, M.A., Redondo, S.U.A., Pina, S.R.O., Yoshida, I.V.P., Investigation on Kinetics of Thermal Decomposition in Polysiloxane Networks Used as Precursors of Silicon Oxycarbide Glasses, Journal of Non-Crystalline Solids, Jun. 2002. DOI: 10.1016/S0022-3093(02)01009-8, Journal of Non-Crystalline Solids 304 (2002) 92-100, 10 pp.
Schiavon, M.A., Armelin, N.A., Yoshida, I.V.P., Novel poly(borosiloxane) Precursors to Amorphous SiBCO Ceramics, Materials Chemistry and Physics, vol. 112, Issue 3, Dec. 20, 2008, pp. 1047-1054.
Schoenung, J.M., Kraft, E.H., Ashkin, D., Advanced silicon nitride components: A cost analysis. Ceramic Engineering and Science Proceedings), 497-504, 8 pp., Ersan Ustundag & Gary Fischman, © 1999 The American Ceramic Society.
Sehsc, Materials handling guide: Hydrogen-bonded silicon compounds developed by the operating safety committee of the silicones environmental, 39 pp., Health and Safety Council of North America, SiH Materials Handling Guide, Aug. 2007, 39. pp.
Serra, J., Gonzalez, P., Liste, S., Serra, C., Chiussi, S., León, B., Pérez-Amor, M., Ylänen, H.O., Hupa, M., FTIR and XPS studies of bioactive silica based glasses, Journal of Non-Crystalline Solids 332 (2003) 20-27, 8 pp., © 2003 Elsevier B.V.
Shao, X., Dong, D., Parkinson, G., Li, C-Z., A Microchanneled Ceramic Membrane for Highly-Efficient Oxygen Separation, 7 pp., Electronic Supplementary Material (ESI) for Journal of Materials Chemistry A, This journal is © The Royal Society of Chemistry 2013.
Shorowordi, K.M., Laoui, T., Haseeb, A.S.M.A., Celis, J.P., Froyen, L., Microstructure and interface characteristics of B4C, SiC and Al2O3 reinforced Al matrix composites: a comparative study, Journal of Materials Processing Technology 142 (2003) 738-743, 6 pp, © 2003 Elsevier B.V.
SID Richardson Carbon Company, Making Carbon Black, Graphics by Fred Hendrickson, Slides, 37 pp.
Smoak, R.H., Kraft, E.H., Sintered Alpha Silicon Carbide: Some Aspects of the Microstructure-Strength Relationship, 9 pp., The Carborundum Company Alpha Silicon Carbide Division, Niagara Falls, New York 14302, Presented at Fall Meeting American Ceramic Society, Sep. 27, 1977, Hyannis, Massachusetts.
Sone, H, Kaneko, T., Miyakawa, N., In Situ Measurements and Growth Kinetics of Silicon Carbide Chemical Vapor Deposition From Methyltrichlorosilane, Journal of Crystal Growth 219 (2000) 245-252, 8 pp., © 2003 Elsevier Science B.V.
Soraru, G.D., Modena, S., Chemical durability of silicon oxycarbide glasses, J. Am. Ceram. Soc., 85 [6] 1529-36 (2002), 8 pp.
Soraru, G.D, Dallapiccola, E., D'Andrea, G., Mechanical characterization of sol-gel-derived silicon oxycarbide glasses, J. Am. Ceram. Soc., 79 [8] 2074-80 (1996), 5 pp.
Soraru, G.D., Walter, S., Brequel, H. Enzo, S., Microstructural and mechanical characterization of sol gel-derived Si—O—C Glasses, Journal of the European Ceramic Society, Dec. 2002, 22 (2002) 2389-2400, 12 pp.
Soraru, G.D, Dalcanale, F., Campostrini, R., Gaston, A., Blum, Y., Carturan, S., Aravind, P.R., Novel polysiloxane and polycarbosilane aerogels via hydrosilylation of preceramic polymers, Communication, Journal of Materials Chemistry, J. Mater. Chem., 2012, 22, 7676-7680, 5 pp.
Soraru, G.D., Pederiva, L., Latournerie, J., Raj, R., Pyrolysis kinetics for the conversion of a polymer into an amorphous silicon oxycarbide ceramic, J. Am. Ceram. Soc., 85 [9] 2181-87 (2002), 7 pp.

(56) References Cited

OTHER PUBLICATIONS

Soraru, G.D., Liu, Q., Interrante, L.V., Apple, T., Role of Precursor Molecular Structure on the Microstructure and High Temperature Stability of Silicon Oxycarbide Glasses Derived from Methylene-Bridged Polycarbosilanes, Chem. Mater. 1998, 10, 4047-4054, 8 pp., Published on Web Nov. 17, 1998, © American Chemical Society.

Soraru, G.D., D'Andrea, G., Campostrini, R., Babonneau, F., Mariotto, G., Structural Characterization and High-Temperature Behavior of Silicon Oxycarbide Glasses Prepared from Sol-Gel Precursors Containing Si—H Bonds, J. Am. Ceram. Soc., 78 [2] 379-87 (1995), 9 pp.

Soukiassian, P., Amy, F., Silicon Carbide Surface Oxidation, Research Highlights, NSRRC Activity Report 2002/2003, 4 pp.

Sousa, B.F, Valeria, I., Yoshida, P., Ferrari, J.L., Schiavon, M.A., Silicon Oxycarbide Glasses Derived From Polymeric Networks with Different Molecular Architecture Prepared by Hydrosilylation Reaction, J Mater Sci (2013) 48:1911-1919, 9 pp., DOI 10.1007 /s 10853-0 12-6955-4, Published online: Oct. 26, 2012, Copyright Springer Science+Business Media New York 2012.

SRI International, Ceramic Composites, website jpeg, 1 pp.

Strachota, A., Cerný, M., Glogar, P., Sucharda, Z., Havelcová, M., Chlup, Z., Dlouhý, I., Kozák, V., Preparation of Silicon Oxycarbide Composites Toughened by Inorganic Fibers via Pyrolysis of Precursor Siloxane Composites, 12 Annual Conference of the Materials Research Society of Serbia, Herceg Novi, Montenegro, Sep. 6-10, 2010, ACTA Physica Polonica A, vol. 120 (2011), No. 2, 5 pp.

Su, D., Li, Y-L, An, H-J, Liu, X., Hou, F., Li, J-Y, Fu, X., Pyrolytic Transformation of Liquid Precursors to Shaped Bulk Ceramics, Journal of the European Ceramic Society, vol. 30, Issue 6, Apr. 2010, pp. 1503-1511.

Suárez, M., Fernández, A., Menéndez, J.L., Torrecillas, R., Kessel, H.U., Hennicke, J., Kirchner, R., Kessel, T., Challenges and Opportunities for Spark Plasma Sintering: A Key Technology for a New Generation of Materials, Chapter 13, 23 pp.. INTECH, © 2013 Suarez et al, licensee InTech.

Suh, M.H., Kwon, W-T., Kim, E.B., Kim, S-R., Bae, S.Y., Choi, D.J. Kim, Y., H2 Permeable Nanoporous SiC Membrane for an IGCC Application, Journal of Ceramic Processing Research, vol. 10, No. 3 pp. 359-363 (2009), 5 pp.

Syväjärvi, M., Yakimova, R., Tuominen, M., Kakanakova-Georgieva, A., MacMillan, M.F., Henry, A., Wahab, Q., Janzen, E., Growth of 6H and 4H-SiC by Sublimation Epitaxy, Journal of Crystal Growth 197 (1999) 155-162, 8 pp., © 1999 Elsevier Science B.V.

Tata Chemicals Europe Limited, Solubility of Sodium Bicarbonate in Water, United Kingdom, 1 pp., www.tatachemicals.com.

Transmission Electron Microscopy, 111-136, 26 pp.

Tian, H. Ma, Q-S., Pan, Y., Liu, W., Structure and Mechanical Properties of Porous Silicon Oxycarbide Ceramics Derived from Silicone Resin with Different Filler Content, SciVerse ScienceDirect, Ceramics International 39 (2013) 71-74, 4 pp., © 2012 Elsevier Ltd. and Technical Group S.r.l.

Tomar, V., Nanocomposite Ceramics—What are Nanocomposite Ceramics?, Nanotechnology Thought Leaders—Insights from the World's Leading Players. 9 pp., Saved from URL http://www.azonano.com/article_aspx?ArticleID=250t.

Toney, F.L., Mack, D.J., The Next Generation of Foam: A Field Study of Northwestern Oklahoma Foam Fracturing, SPE 21644, 113-123, 11 pp., This paper was prepared for presentation at the Production Operations Symposium held in Oklahoma City, Oklahoma, Apr. 7-9, 1991, Copyright 1991, Society of Petroleum Engineers, Inc.

Topuz, B., Simsek, D., çiftçioğlu, M., Preparation of monodisperse silica spheres and determination of their densification behavior, Science Direct, Ceramics International 41(2015) 43-52, 10 pp., © 2014 Elsevier Ltd. and Technial Group S.r.l.

Trottier, R., Dhodapkar, S., A Guide to Characterizing Particle Size and Shape, Instrumentation, CEP, Jul. 2014, 36-46, 11 pp.

Twigg, M.V., Richardson, J.T., Fundamentals and Applications of Structured Ceramic Foam Catalysts, Ind. Eng. Chem. Res. 2007, 46, 4166-417, 16 pp., 2007 American Chemical Society, Published on Web Feb. 24, 2007.

Ujihara, T., Maekawa, R., Tanaka, R., Sasaki, K., Kuroda, K., Takeda, Y., Solution Growth of High-Quality 3C-SiC crystals, Journal of Crystal Growth 310 (2008) 1438-1442, 5 pp., Available online Jan. 15, 2008, Science Direct, © 2007 Elsevier B.V.

Vakifahmetoglu, C., Colombo, P., A Direct Method for the Fabrication of Macro-Porous SiOC Ceramics from Preceramic Polymers, Advanced Engineering Materials 2008, 10, No. 3, 4 pp., DOI: 10.1002/adem.200700330, 256, © 2008 Wiley-VCH Verlag GmbH & Co. KGaA,Weinheim.

Vakifahmetoglu, C., Menapace, I., Hirsch, A., Biasetto, L., Hauser, R., Riedel, R., Colombo, P., Highly Porous Macro-and Micro-Cellular Ceramics from A Polysilazane Precursor, Ceramics International 35 (2009) 3281-3290, 10 pp., Science Direct, Available online Jun. 18, 2009, © 2009 Elsevier Ltd. and Technical Group S.r.l.

Van Der Vlis, A.C., Haafkens, R., Schipper, B.A., Visser, W., Criteria for Proppant Placement and Fracture Conductivity, Society of Petroleum Engineers of AIME, SPE 5637, 15 pp., Copyright 1975, American Institute of Mining, Metallurgical, and Petroleum Engineers, Inc.

Wacker, Silres® MSE 100: A Unique Silicone Resin that Cures at Room Temperature, Wacker Chemie AG, 81737 München, Germany, 2 pp.

Walter, S. Soraru, G.D., Brèquel, H., Enzo, S., Microstructural and mechanical characterization of sol gel-derived Si—O—C glasses, Journal of the European Ceramic Society 22 (2002) 2389-2400, 12 pp., , © 2002 Published by Elsevier Science Ltd.

Wang, F., Gill, W.N., Kirk, C.A., Apple, T., NMR characterization of postcure temperature effects on the microstructures of Blackglas™ Resin and Ceramic. Journal of Non-Crystalline Solids 275 (2000) 210-215, 6 pp, , © 2000 Published by Elsevier Science B.V.

Wang, F., Apple, T., Gill, W.M., Thermal Redistribution Reactions of Blackglas™ Ceramic, Journal of Applied Polymer Science, vol. 81, 142-152 (2001), 10 pp, © John Wiley & Sons, Inc.

Wang, S.F., Zhang, J. Luo, D.W., Gu, F., Tang, D.Y., Dong, Z.L., Tan, G.E.B., Que, W.X., Zhang, T.S., Li, S., Kong, L.B., Transparent Ceramics: Processing, Materials and Applications, Progress in Solid State Chemistry 41 (2013) 20-54, 34 p., , © 2012 Published by Elsevier Ltd.

Wijesundara, M.B.J., Azevedo, R., SiC Materials and Processing Technology, Chapter 2, Silicon Carbide Microsystems for Harsh Environments, MEMS Reference Shelf 22, DOI 10.1007/978-1-4419-7121-0 2, 33-95, 63 pp., © Springer Soience+Business Media, LLC 2011.

Wiley, John & Sons, Inc., Phenolic resins. Encyclopedia of Polymer Science and Technology, vol. 7, 322-368, 47 pp., © John Wiley & Sons, Inc.

Witucki, G.L., A silane primer: Chemistry and applications of alkoxy silanes, Back to Basics, Reprinted from Jul. 1993 Issue of the Journal of Coatings Technology, vol. 65, No. 822, 57-60, 4 pp., Copyright 1993 by the Federation of Societies for Coatings Technology, Blue Bell, PA USA, Presented at the 57th Annual Meeting of the Federation of Societies of Coatings Technology on Oct. 21, 1992 in Chicago, IL.

Wright, P.V., Beevers, M.S., Preparation of cyclic polysiloxanes, Chapter 3, 25 pp.

Wu, Jiquan, Li, Y., Chen, L., Zhang, Z., Wang, D., Xu, C., Simple fabrication of micro/nano-porous SiOC foam from polysiloxane, communication, Journal of Materials Chemistry, J. Mater. Chem., 2012, 22, 6542-6545, 4 pp., © The Royal Society of Chemistry 2012.

Yazdanfar, M., Pedersen, H., Sukkaew, P., Ivanov, I.G., Danielsson, O., Kordina, O., Janzén, E., On the Use of Methane as a Carbon Precursor in Chemical Vapor Deposition of Silicon Carbide, Journal of Crystal Growth, 390 (2014) 24-29, 6 pp., Availavle online Dec. 27, 2013, © 2013 Elsevier B.V.

(56) References Cited

OTHER PUBLICATIONS

Yeo, I-G, Lee, T-W, Lee, W-J., Shin, B-C, Choi, J-W, Ku, K-R, Kim, Y-H, The Quality Investigation of 6H-SiC Crystals Grown by a Conventional PVT Method With Various SiC Powders, Transactions on Electrical and Electronic Materials, vol. 11, No. 2, pp. 61-64, 4 pp., Apr. 25, 2010, © 2010 Kieeme.

Yilmaz, O., Buytoz, S., Abrasive wear of A12O3-reinforced aluminum-based MMCs, Composites Science and Technology 61 (2001) 2381-2392, 12 pp., © 2001 Published by Elsevier Science Ltd., PII: S0266-3538(01)00131-2.

Yoo, K-C, Ruderman, W., Growth of Single Crystal Beta Silicon Carbide, Phase I, Final Report for the period Jul. 1992 through Dec. 1992, Office of Naval Research, Washington, DC, Contract N00014-92-C-0127, INRAD, Inc. Northvale, NJ 07647, 33 pp.

Yoon, J.L., Kim, J. II, Kim, S.R, Kwon, W.T., Shin, D-G., Kim, Y., Fabrication of SiOC/C coatings on stainless steel using poly(phenyl carbosilane) and their anti-corrosion properties, Innovative Processing and Manufacturing of Advanced Ceramics and Composites II, 71-77, 4 pp.

Zhmakin, A.I., Modelling of Heat Transfer in Single Crystal Growth, Ioffe Physical Technical Institute, Russian Academy of Sciences, St. Petersburg, Russia, Softimpact Ltd., P.O. 83, 194156 St. Petersburg, Russia, 25 pp.

Dvornic, P.R., Thermal properties of polysiloxanes, Chapter 7, R.G. Jones et al., (eds.), Silicon-Containing Po9lymers, 185-212, © 2000 Kluwer Academic Publishers. Printed in the Netherlands, 28 pp.

Abderrazak, H., Hmida, E.S.B.H., Silicon carbide: synthesis and properties, properties and application of silicone carbide, Chapter 16, Apr. 2011, Prof. Rosario Gerhardt (Ed.), ISBN: 078-953-307-201-2, 361-388, 29 pp., InTech, Available from: http://www.intechopen.com/books/properties-and-applications-of-siliconcarbide/silicon-carbide-synthesis-and-properties.

Andriot, M, Degroot, J.V., Jr., Meeks, R., Gerlach, E., Jungk, M., Wolf, A.T., Cray, S., Easton, T., Mountney, A., Leadley, S., Chao, S.H., Colas; A., De Buyl, F., Dupont, A., Garaud, J.L., Gubbels, F., Lecomte, J.P., Lenoble, B. Stassen, S., Stevens, C., Thomas, X., Shearer, G., Silicones in industrial applications, 106 pp., Dow Corning.

American National Standards Institute (ANSI) and American Petroleum Institute (API), Measurement of properties of proppants used in hydraulic fracturing and gravel-packing operations, ANSI/API Recommended Practice 19C, May 2008, First Edition, ISO 13503-2:2006 (Identical), Petroleum and natural gas industries—Completion fluids and materials, Copyrighted Material Licensed to Bruce Bricco on Feb. 5, 2013 for licensee and #39's use only, Distributed by Thomson Reuters (Scientific), Inc., 42 pp.

American National Standards Institute (ANSI) and American Petroleum Institute (API), Measuring the long term conductivity of proppants, ANSI/API Recommended Practice 19D, First Edition, May 2008, Errata, Jul. 2008, ISO 13503-5 (Identical), Part 5: Procedures for measuring the long-term conductivity of proppants, Copyrighted Material Licensed to Bruce Bricco on Feb. 5, 2013 for licensee and #39's use only, Distributed by Thomson Reuters (Scientific), Inc., 35 pp.

Araûjo, F.G., Latorre, G.P., Hench, L.L., Structural evolution of a porous type-VI sol-gel glass, Journal of Non-Crystalline Solids 185 (1995) 41-46, 8 pp., © 1995 Elsevier Science B.V.

Ashland, Corrosion Resistant Fiberglass Reinforced Pipe—FRP, 3 pp., http://www.ashland.com/strategic-applications/APM/Corrosion-resistant-FRP.

Aud, W.W., Poulson, T.D., Burns, R.A., Rushing, T.R., Orr, W.D., Lateral proppant distribution: The good, the bad, and the ugly of putting frac jobs away, Society of Petroleum Engineers, Inc., SPE 56725, Copyright 1999, 10 pp.

Baker, R.W., Lokhandwala, K., Natural gas processing with membranes: An overview, membrane technology and research, Inc.; California. Received for Review Aug. 8, 2007, Revised Manuscript Received Nov. 30, 2007; Accepted, Dec. 4, 2007, IE071083W, 13 pp.

Bakumov, V., Schwarz, M., Kroke E., Emulsion processing of polymer-derived porous Si/C/(O) ceramic bodies, Institute of Inorganic Chemistry, Germany, Accepted Apr. 2, 2009, Available online May 14, 2009, Journal of the European Ceramic Society 29 (2009) 2857-2865, 9 pp., © 2009 Elsevier Ltd.

Bannwarth, H., Gas physics and vacuum technology, Liquid Ring Vacuum Pumps, Compressors and Systems, 110 pp., © 2005 Wiley-VCH Verlag GmbH & Co. KGaA, Weinheim ISBN: 3-527-31249-8.

Bayyaa, S.S., Villalobos, G.R., Hunt, M.P., Sangheraa, J.S., SADOWSKi, B.M., Aggarwal, I.D., Cinibulk, M., Carney, C., Keller, K., Development of transparent polycrystalline beta-silicon carbide, Material Technologies and Applications to Optics, Structures, Components. and Sub-Systems, edited by Joseph L. Robichaud, Matthias Krodel, William A. Goodman, Proc. of SPIE vol. 8837, 88370S © 2013 SPIE CCC code' 0277-786X/13/$18 . doi: 10.1117112.2023954, 7 pp.

Bazarjani, M.S., Prasad, R.M., Schitco, C., Gurlo, A., Riedel, R., A fundamental design approach towards microporous polymer derived nanocomposites , for gas separation applications, [O5B.2], Technische Universität Darmstadt, Germany, 2 pp.

Bernardo, P., Clarizia, G., 30 years of membrane technology for gas separation, chemical engineering transactions, vol. 32 (2013), 1999-2004, DOI: 10.3303/CET1332334, ISBN 978-88-95608-23-5; ISSN 1974-9791, 6 pp., © 2013 AIDIC Servizi S.r.l. ISBN 978-88-95608-23-5: ISSN 1974-9791.

Bernardo, E., Fiocco, L., Parcianello, G., Storti, E., Colombo, P., Advanced ceramics from preceramic polymers modified at the nano-scale: A review, Materials 2014, 7, 1927-1956, doi:10.3390/ma7031927, 30 pp.

Bernardo, E,, Colombo, P., Manias, E., SiOC glass modified by montmorillonite clay, Ceramics International 32 (2006) 679-686, 8 pp., © 2005 Elsevier Ltd and Techna Group S.r.l.

Berndt, F., Jahn, P., Rendtel, A., Motz, G., Ziegler, G., Monolithic SiOC ceramics with tailored porosity, Institute for Materials Research (WFN), D-2 J 502, Germany, 4 pp.

Blum, Y., Soraru, G.D., Ramaswamy, A.P., Hui, D., Carturan, S.M., Controlled mesoporosity in SiOC via chemically bonded polymeric "Spacers" (2013), Journal of the American Ceramic Society, vol. 96, No. 9, 8 pp., DOI: 10.1111/jace.12485, © 2013 The American Ceramic Society.

Boyle, M.A., Martin, C.J., Neuner, J.D., Epoxy Resins, Constituent Materials, 12 pp.

Brequei, H., Parmentier, T.J., Walter, S., Badheka, R., Trimmel, G., Masse, S., Latournerie, J., Dempsey, P., Turquat, C., Desmartin-Chomel, A., Le Neindre-Prum, L. Jayasooriya, U.A., Hourlier, D., Kleebe, H.-J., Soraru, G.D., Enzo, S., Babonneau, F., Systematic structural characterization of the high-temperature behavior of nearly stoichiometric silicon Oxycarbide Glasses, Chem. Mater. (2004) 16, 2585-2598, 14 pp., © 2004 American Chemical Society, Published on Web May 29, 2004.

Brundle, C. R., Evans, C.A., Jr., Wilson, S., Encyclopedia of materials characterization, surfaces, interfaces, thin films, This book was acquired, developed, and produced by Manning Publications Co., © 1992 by Butterworth-Heinemann, a division of Reed Publishing (USA) Inc., Stoneham, MA02180, Manning Publications Co., Greenwich, CT 06830, 1 0 9 8 7 6 5 4 3, Printed in the USA, 782 pp.

Budden, G., Some like it hot, Dow Cornng Limited, U.K., Silicone characteristics, 15 pp.

Bujalski, D.R., Grigoras, S., Lee, W-L., Wieber, G.M., Zank, G.A., Stoichiometry control of SiOC ceramics by siloxane polymer functionality, Journal of Materials Chemistry, J. Mater. Chem., 1998, 8(6), 1427-1433 1433, 7 pp.

Bunsell, A.R., Piant, A., A review of the development of three generations of small diameter silicon carbide fibres, J Mater Sci 41 (2006) 823-839, 17 pp., DOI: 1O.1007/s 10853-006-6566-z, © 2006 Springer Science + Business Media, Inc.

Casado, C.M., Cuadrado, I., Moran, M., Alonso. B., Barranco, M., Losada, J., Cyclic siloxanes and silsesquioxanes as cores and frameworks for the construction of ferrocenyl dendrimers and polymers, Applied Organometallic Chemistry, App. Organometal. Chem. 13, 245-259 (1999), 15 pp., © 1999 John Wiley & Sons, Ltd.

(56) References Cited

OTHER PUBLICATIONS

Chen, T., Dong, M., Wang, J., Zhang, L., Li, C., Study on properties of silicon oxycarbide thin films prepared by RF magnetron sputtering, Science and Technology on Surface Engineering Laboratory, Lanzhou Institute of Physics, Lanzhou 730000, China, 5 pp., 2nd International Conference on Electronic & Mechanical Engineering and Information Technology (EMEIT-2012), Published by Atlantis Press, Paris, France.
Cho, S.H., White, S.R., Braun, P.V., Room-temperature polydimethylsiloxane-based self-healing polymers, Chemistry of Materials, pubs.acs.org/cm, dx.doi.org/10.1021/cm302501b | Chem. Mater. 2012, 24, 4209-4214, 6 pp., © 2012 American Chemical Society.
Chung, D-W, Kim, T.G., Study on the effect of platinum catalyst for the synthesis of polydimethylsiloxane grafted with polyoxyethylene, J. Ind. Eng. Chem, vol. 13, No. 4, (2007) 571-577, 7 pp.
Clark, M.D.T., Carbon black, Chapter 9, Petroleum Specialty Products, Extensive revision and editing by Heather Wansbrough following correspondence with Steve Lipsham, 43 pp.
Colas, A., Silicones: preparation, properties, and performance, Dow Corning, Life Sciences, © 2005 Dow Corning Corporation, Printed in USA VIS2339 Form No. 01-3077-01, 14 pp.
Collins, P., Heithaus, M., Adams, C., Li, J.H., Chemical modification of carbon black for improved performance in coatings, Cabot Corporation, Coatings Business Unit, CRP-216-294, 9 pp.
Colombo, P., Raj, R, editors, Advances in polymer derived ceramics and composites, Ceramic Transactions, vol. 213, 28 pp., A Collection of Papers Presented at the 8th Pacific Rim Conference on Ceramic and Glass Technology, May 3I-Jun. 5, 2009, Vancouver, British Columbia, Volume Editor, Singh, M., A John Wiley & Sons, Inc. Publication.
Colombo, P., Sglavo, V. Pippel, E., Woltersdorf, J., Joining of reaction-bonded silicon carbide using a preceramic polymer, J. Journal of Matenals Science 33 (1998) 2405 2412, 8 pp., © 1998 Chapman & Hall.
Colombo, P., Mera, G., Riedel, R., Soraru, G.D., Polymer-derived ceramics: 40 years of research and innovation in advanced ceramics, J. Am. Ceram, Soc. 93 [7] 1805-1837 (2010), 33 pp., © 2010 The American Ceramics Society.
Colombo, P., Riedel, R., Soraru, G.D., Kleebe, H-J., Polymer derived ceramics from nano-structure to applications, Printed in the USA, 10 9 8 7 6 5 4 3 2, © 2010 DEStech Publications, Inc., ISBN: 978-1-60595-000-6, 475 pp.
Colombo, P., Modesti, M., Silicon oxycarbide ceramic foams from a preceramic polymer, Journal of the American Ceramic Society, vol. 82, No. 3, 573-78 (1999), 6 pp.
Coorstek Material, Material Properties Charts, Important Information, 18 pp. CoorsTek, Inc., Golden, Colorado.
Craddock, D.L., Goza, B.T., Bishop, J.C., A case history-fracturing the morrow in southern blaine and western Canadian counties, Oklahoma, SPE 11567, 6 pp., Copyright 1983 Society of Petroleum Engineers of AIME. This paper was presented at the 1983 Production Operation Symposium held in Oklahoma City, Oklahoma, Feb. 27-Mar. 1, 1983.
Cypryk, M., Apeloig, Y., Mechanism of the acid-catalyzed Si—O bond cleavage in siloxanes and siloxanols. A theoretical study, Organometallics (2002), vol. 21, No. 11, 2165-2175 , 11 pp., Publication on Web Apr. 24, 2002, © American Chemical Society.
Dalcanale, F. Grossenbacher, J., Blugan, G., Gullo, M.R, Lauria, A., Brugger, J., Tevaearai, H., Graule, T., Niederberger, M., Kuebler, J., Influence of carbon enrichment on electrical conductivity and processing of polycarbosilane derived ceramic for MEMS applications, ScienceDirect, Journal of the European Ceramic Society 34 (2014) 3559-3570, 12 pp., © 2014 Elsevier Ltd.
Dasgupta, R., Aluminum alloy-based metal matrix composites: a potential material for wear resistant applications. Research Article, International Scholarly Research Network , ISRN Metallurgy, vol. (2012), Article ID 594573, 14 pages, doi:10.5402/2012/594573 , CSIR-Advanced Materials and Processes Research Institute (AMPRI), Hoshangabad Road, Madhya Pradesh, Bhopal 462064, India, © 2012 Rupa Dasgupta.
De Vekki, D.A., Skvortsov, N.K., Metal complex catalyzed , hydrosilylation of vinyl-with hydrosiloxanes, (A Review), Chemistry and Chemical Technology, Technology of Organic Substances, 18 pp.
De Vos, R.M., Verweij, H., High-selectivity, high-flux silica membranes for gas separation, Science 279, 1710 (1998), DOI: 10.1126/science.279.5357.1710, 3 pp,, American Association for the Advancement of Science, Washington, DC 20005.
Dow Corning, Safe handling of silicon hydride containing polysiloxanes, Updated Aug. 22, 2003, 29 pp., Printed in U.S.A. FPH 33079 Form No. 24-711A-01.
Dow Corning, Xiameter® MHX-1107 Fluid 20CST and 30CST, Polymethylhydrogensiloxane, Feb. 16, 2012, 2 pp., Form No. 95-1087-01, © 2012 Dow Corning Corporation.
Dume, B., Silicon carbide shows promise for quantum computing, physicsworld.com, Nov. 4, 2011, 2 pp., Retrieved: Aug. 16, 2015: http://physicsworld.com/cws/articlelnews/2011/nov/04/silicon-carbide-shows-promise-for-quantum-computing.
Entegris, Inc., Supersic® materials, © 2011-2012 Entegris, Inc., 2 pp., Printed in USA.
Eom, J-H., Kim, Y-W., Song, I-H, Kim, H-D., Microstructure and properties of porous silicon carbide ceramics fabricated by carbothermal reduction and subsequent sintering process, Materials Science and Engineering Materials Science and Engineering, A 464 (2007) 129-134, 6 pp., © 2007 Elsevier B.V.
Fernandez, G.J., Murr, L.E., Characterization of tool wear and weld optimization in the friction-stir welding of cast aluminum Materials Characterization 359+20% SiC metal-matrix composite, Materials Characterization 52 (2004)65-75, 11 pp., © 2004 Elsevier Inc.
Friess, M., Bill, J., Golczewski, J., Zimmermann, A., Aldinger, F., Crystallization of polymer-derived silicon carbonitride at 1873 k under nitrogen overpressure, J. Am. Ceram. Soc., 85 [10] 2587-89 (2002), 3 pp.
Gallis, S., Huang, M., Nikas, V., Kaloyeros, A. E., Nguyen, A. P. D., Stesmans, A., Afanas'Ev, V. V., The origin of white luminescence from silicon oxycarbide thin films, Research Gate, Applied Physics Letters 104, 061906 (2014), DOI: 10.1063/1.4865100, 6 pp., AIP Publishing, New York.
Microsemi PPG, Gallium Nitride (GaN) versus Silicon Carbide (SiC) In The High Frequency (RF) and Power Switching Applications, 8 pp., Digikey.com.
Miracle, D. B., Donaldson, S.L., Introduction to Composites, Air Force Research Laboratory, 15 pp.
Mixing and Agitation, Chapter 10, 287-304, 18 pp.
Modern Dispersons, Insights on Carbon Black Fundamentals, 8 pp., 78 Marguerite Ave., Leonminster, MA 01453-4227 USA, www.moderndispersons.com.
Montgomery, D.C., Runger, G.C., Applied Statistics and Probability for Engineers, Third Edition, 976 pp., Copyright 2003 © John Wiley & Sons, Inc., Library of Congress Cataloging-in-Publication Data, Includes bibliographical references and index., ISBN 0-471-20454-4 (acid-free paper), 1. Statistics. 2. Probabilities. I. QA276.12.M645 2002, 519.5—dc21, 2002016765, Printed in the United States of America., 10 9 8 7 6 5 4 3 2 1.
Morcos, R.M., Navrotsky, A., Varga,T., Blum, Y., Ahn, D., Poli, F., Müller, K. Raj, R., Energetics of SixOyCz polymer-derived ceramics prepared under varying conditions, Journal of the American Ceramic Society, 2008, J. Am. Ceram. Soc. 91 [9] 2969-2974 (2008), 6 pp., © 2008 The American Ceramic Society.
Moysan, C., Riedel, R., Harshe, R., Rouxel, T., Augereau, F., Mechanical characterization of a polysiloxane-derived SiOC Glass, Journal of the European Ceramic Society 27 (2007) 397-403, 7 pp.
Myers, R., Potratz, J., Moody, M., Field application of new lightweight proppant in appalachian tight gas sandstones, Society of Petroleum Engineers Inc., Sep. 2004, SPE 91469, 9 pp., Prepared for presentation at the2004 SPE Eastern Regional Meeting, Charleston, WV., Copyright 2004 Society of Petroleum Engineers.
Mynbaeva, M.G., Abramov, P.L., Lebedev, A.A., Tregubova, A.S., Litvin, D.P., Vasiliev, A.V., Chemekova, T.Y., Makarov, Y.N., Fabrication of improved-quality seed crystals for growth of bulk silicon

(56) References Cited

OTHER PUBLICATIONS carbide, fabrication, treatment, and testing of materials and structures, Semiconductors, vol. 45, No. 6, 2011, 828-831, 4 pp.
Narisawa, M., Iwase, A., Watase, S., Matsukawa, K., Kawai, T., Photo luminescent properties of polymer derived ceramics at near stoichiometric SiO2-xSiC-y(H) compositions, Innovative Processing and Manufacturing of Advanced Ceramics and Composites II, 79-84, 4 pp.
Narisawa, M., Silicone resin applications for ceramic precursors and composites, Review, Materials 2010, 3, 3518-3536: 19 pp., doi:10.3390/ma3063518, Materials, ISSN 1996-1944.
Nexteltm, 3M, Ceramic Textiles Technical Notebook, www.3M.com/ceramics, 98-0400-5870-7, Nov. 2004, 55 pp.
Nguong, C. W., Lee, S. N. B., Sujan, D., A Review on Natural Fibre Reinforced Polymer Composites, World Academy of Science, Engineering and Technology, International Journal of Chemical, Molecular, Nuciear, Materials and Metallurgical Engineering vol. 7, No. 1, 2013, International Scholarly and Scientific Research & Innovation 7(1) 2013, 8 pp., International Science Index, vol. 7, N:1, 2013, waset.org/Publication/6783.
Norris, A., Silicones: ideal material solutions for the photovoltaic industry, Photovoltaics International, www.pv-tech.org., 3 pp., © 2008 Dow Corning.
Nyczyk-Malinowska, A., Wójcik-Bania, M., Gumula, T., Hasik, M., Cypryk, M. Olejniczak, Z., New Precursors to SiCO Ceramics Derived from Linear Poly(vinylsiloxanes) of Regular Chain Composition, Feature Article, ScienceDirect, Journal of the European Ceramic Society 34 (2014) 889-902, 14 pp., © 2013 Elsevier Ltd.
Nyczyk, A., Paluszkiewicz, C., Pyda, A., Hasik, M., Preceramic polysiloxane networks obtained by hydrosilylation of 1,3,5,7-tetravinyl-1 ,3,5,7-tetramethylcyclotetrasiloxane, Spectrochimica Acta Part A: Molecular and Biomolecular Spectroscopy, Spectrochimica Acta Part A 79 (2011) 801-808, 8 pp.
Orion, Carbon Black Pigments for Industrial Coatings, Technical Information 1458, 12 pp., 2013 Orion Engineered Carbons GmbH, Dec-3146 Dec. 2013.
Oteo, J.L., Mazo, M.A., Palencia, C., Rubio, F., Rubio, J., Synthesis and characterization of silicon oxycarbide derived nanocomposites obtained through ceramic processing of TEOS/PDMS preceramic materials, Journal of Nano Research vol. 14 (2011) pp. 27-38, 15 pp., © 2011 Trans Tech Publications, Switzerland, doi: 10.4028/www.scientijic.net/JNanoR.14.27, Online available since Apr. 14, 2011 at www.scientific.net.
Palisch, T., Duenckel, R., Chapman, M., Woolfork, S., Vincent, M.C., How to Use and Misuse Proppant Crush Tests—Exposing the Top 10 Myths, SPE 119242, 15 pp., Copyright 2009, Society of Petroleum Engineers, This paper was prepared for presentation at the 2009 SPE Hydraulic Fracturing Technology Conference held in the Woodlands, Texas, USA, Jan. 19-21, 2009.
Pantano, C.G., Singh, A.K., Zhang, H., Silicon oxycarbide glasses, Journal of Sol-Gel Science and Technology 14, 7-25 (1999), 19 pp., © 1999 Kluwer Academic Publishers. Manufactured in the Netherlands.
Parameters, Basic Parameters of Silicon Carbide (SiC), SiC Silicon Carbide, 5 pp., www.ioffe.rssi.ru/SVA/NSM/Semicond/SiC/basic.html.
Park, H-K, Sung, I-K, Kim, D-P, A facile route to prepare high surface area mesoporous SiC From SiO2 sphere templates, J. Mater. Chem., 2004, 14, 3436-3439, 4 pp., First published as an Advance Article on the web Sep. 22, 2004, Purchased by davis.rand @mellorinnovations.com on Oct. 6, 2015.
Park, H.., Review on the Current Status of Magnesium Smelting, Geosystem Engineering, 11(1), 13-18 (Mar. 2008), 6 pp.
Pearson, C. M., Griffin, L., Wright, C., Weijers, L., Breaking Up Is Hard to Do: Creating Hydraulic Fracture Complexity in the Bakken Central Basin, SPE 163827, 15 pp., Copyright 2013, Society of Petroleum Engineers.
Pearson, C. M., Griffin, L., Chikaloff, J., Measuring Field Supplied Proppant Conductivity—Issues Discovered in an Operator's Multi-Year Testing Program in the Bakken Shale, SPE 168641, 12 pp.. Copyright 2014, Society of Petroleum Engineers.
Pena-Alonso, R., Rubio, J., Rubio, F., Oteo, J.L., FT-IR and Porosity Study of Si—B—C—O Materials Obtained from TEOS-TEB-PDMS Derived Get Precursors, Journal of Sol-Gel Science and Technology 26, 195-199, 5 pp., 2003, © 2003 Kluwer Academic Publishers. Manufactured in the Netherlands.
Pippel, E., Lichtenberger, O., Woltersdorf, J., Identification of silicon oxycarbide bonding in Si—C—O-glasses by EELS, 2 pp., Journal of Materials Science Letters, 19, 2000, 2059-2060, © 2000 Kluwer Academic Publishers.
Pitcher, M.W., Joray, S.J., Bianconi, P.A., Smooth Continuous Films of Stoichiometric Silicon Carbide from Poly (methylsilyne), Adv. Mater, 2004, 16, No. 8, Apr. 19, 4 pp., © 2004 WILEY-VCH Verlag GmbH & Co. KGaA, Weinheim DOI: 10.1002/adma.200306467.
Plawsky, J.L., Wang, F., Gill, W.N., Kinetic Model for the Pyrolysis of Polysiloxane Polymers to Ceramic Composites, AIChE Journal, Oct. 2002, vol. 48, No. 10, 2315-2323, 9 pp.
Poddar, P., Srivastava, V.C., DE, P.K., Sahoo, K.L., Processing and mechanical properties of SiC reinforced cast magnesium matrix composites by stir casting process, Materials Science and Engineering A 460-461 (2007) 357-364, 8 pp., © 2007 Elsevier B.V.
Polymer to Ceramic Transformation, [Image], 1 pp.
Pomorsk, T. A., Bittel, B. C., Lenahan, P. M., Mays, E., Ege, C., Bielefeld, J., Michalak, D., King, S. W., Defect Structure and Electronic Properties of SiOC:H Films Used for Back End of Line Dielectrics, Journal of Applied Physics 115, 234508 (2014), 21 pp., doi: 10.1063/1.4882023, AIP Publishing.
Post, T., Understanding the Real World of Mixing, CEP Mar. 2010. 25-32, 8 pp.
Pradeep, V.S., Study of silicon oxycarbide (SiOC) as anode materials for Li-ion batteries, Dec. 2013, 178 pp., Doctoral School in Materials University of Trento, Italy, Department of Industrial Engineering, Advisor: Prof. Gian Domenico Soraru, Co-Advisor: Dr.-Ing, Magdalena Graczyk-Zajac.
Qian, B., Shen, Z., Laser sintering of ceramics, Journal of Asian Ceramic Societies 1 (2013 ) 315-321; 7 pp., ScienceDirect, © 2013 The Ceramic Society of Japan and the Korean Ceramic Society, Production and Hosting by Elsevier B.V.
Raj, R., Riedel, R., Soraru, G.D., Introduction to the Special Topical Issue on Ultrahigh-Temperature Polymer-Derived Ceramics, Ultrahigh-Temperature Ceramics, J. Am. Ceram. Soc., 84 [10] 2158-59 (Oct. 2001), 2 pp.
Rangarajan, S., Aswath, P.B., Role of Precursor Chemistry on Synthesis of Si—O—C and Si—O—C—N Ceramics by Polymer Pyrolysis, Journal of Materials Science, Apr. 2011, J Mater Sci (2011) 46:2201-2211, 14 pp, DOI: 10.1007/s10853-010-5058-3, Published online: Nov. 24, 2010, Springer Science+Business Media, LLC 2010.
Rashed, A.H., Properties and Characteristics of Silicon Carbide, 22 pp., Copyright 2002 Poco Graphite, Inc., Decatur, TX 76234.
Raysoni, N. Weaver, J., Long-term proppant performance, SPE 150669, 16 pp., Copyright 2012, Society of Petroleum Engineers, This paper was prepared for presentation at the SPE International Symposium and Exhibition on Formation Damage Control held in Lafayette, Louisiana, USA, Feb. 15-17, 2012.
Renlund, G.M., Prochazka, S., Doremus, R.H., Silicon oxycarbide glasses: Part I. preparation and chemistry, J. Mater. Res., vol. 6, No. 12, Dec. 1991, 2716-2722, 7 pp., © 1991 Materials Research Society.
Renlund, G.M., Prochazka, S., Doremus, R.H., Silicon oxycarbide glasses: Part II. structure and properties, J. Mater. Res., vol. 6, No. 12, Dec. 1991, 2723-2734, 12 pp.
Revis, A., Discussion Slides, Phone Conference, Aug. 4, 2015, 1:30 p.m., 20 pp.
Roewer, G., Herzog, U., Trommer, K. Müller, E., Frühauf, S., Silicon Carbide—A Survey of Synthetic Approaches, Properties and Applications, Structure and Bonding, vol. 101, 59-135, 77 pp., © Springer-Verlag Berlin Heidelberg 2002.
Rogers Corporation, Silicone Materials Selection Guide, Bisco Silicones, Brochure, High Performance Foams Division, Carol Stream, IL, USA, 9 pp., Printed in USA, 1110-1111-5.0AG, Publication #180-016.

(56) References Cited

OTHER PUBLICATIONS

Romero, M., Rawlings, R.D., Rincón, J.Ma., Nucleation and crystal growth in glasses from inorganic wastes from urban incineration, Journal of Non-Crystalline Solids, 271 (2000) 1-2, 106-118; DOI: 10.1016/S0022-3093(00)00082-X, 20 pp.

Rouxel, T., Elastic Properties and Short-to Medium-Range Order in Glasses, J. Am. Ceram. Soc., 90 [10] 3019-3039 (2007), 21 pp., DOI: 10.1111/j.1551-2916.2007.01945.x, © 2007, The American Ceramic Society.

Ryan, J.V., Free Carbon Structure in Silicon Oxycarbide Thin Films, A Thesis in Materials Science and Engineering, 2007, 175 pp., The Pennsylvania State University Graduate School, Copyright © 2007 Joseph V. Ryan, Submitted in Partial Fulfillment of the Requirements for the Degree of Doctor of Philosophy, Dec. 2007.

Saha, A., Raj, R., Williamson, D.L., A Model for the nanodomains in polymer-derived SiCO, J. Am. Ceram. Soc., 89 [7] 2188-2195 (2006), 8 pp., vol. 89. No. 7., © 2006 The American Ceramic Society.

Saha, A., Raj, R., Crystallization maps for SiCO amorphous ceramics, J. Am. Ceram. Soc., 90 [2] 578 583 (Feb. 2007), 7 pp., © 2006 The American Ceramic Society.

Sahimi, M., Tsotsis, T., Rahn, L., Nanoporous membranes for hydrogen production: Experimental studies and molecular simulations, 3 pp., 2013 Annual Merit Review and Peer Evaluation Meeting, DOE Hydrogen and Fuel Cells Program.

Ganesan, G., Raghukandan, K., Karthikeyan, R., Pai, B.C., Development of processing maps for 6061 Al/15% SiCp Composite Material, Materials Science and Engineering A369 (2004) 230-235, 6 pp., © 2003 Elsevier B. V.

Gao, P-C, Simon, P., Favier, F., Silicon carbide with tunable ordered mesoporosity, Microporous and Mesoporous Materials, 180 (2013) 172-177, 6 pp., journal homepage: www.elsevier.com/locate/micromeso; © 2013 Elsevier Inc.

Goela, J.S., CVD growth and characterization of [B]-SiC for IR windows, Morton Advanced Materials, 1998, 17 pp., 185 New Boston St., Woburn, MA 01801.

Goela, J.S., Taylor, R.L., Transparent SiC for mid-IR windows and domes, SPIE vol. 2286, 14 pp., Morton Advanced Materials, 185 New Boston Street, Woburn, MA 01801.

Greil, P., Advanced materials progress report on advanced engineering ceramics, Advanced Materials, Adv. Mater. 2002.14, No. 10, May 17, 8 pp., WILEY-VCH Verlag GmbH. D-69469 Weinhcim, 2002 0935-9648/02/1005-0716. © WILEY-VCH Verlag GmbH, D-89469 Weinheim, 2002.

Gumula, T., Paluszkiewicz, C., Blazewicz, S., Study on Thermal Decomposition Processes of Polysiloxane Polymers—From Polymer to Nanosized Silicon Carbide, Journal of Analytical and Applied Pyrolysis, J. Anal. Appl. Pyrolysis 86 (2009) 375-380, 6 pp., journal homepage: www.elsevier.com/locate/jaap. © 2009 Elsevier B.V.

Hamilton, H., Palladium-based membranes for , hydrogen separation, Platinum Metals Rev., 2012, 56, (2), 117-123, 7 pp., http://dx.doi.org/10.1595/147106712X632460 , © 2012 Johnson Matthey.

Handke, M., Kowalewska, A., Siloxane and silsesquioxane molecules—precursors for silicate materials, Spectrochimica Acta Part A: Molecular and Biomolecular Spectroscopy , vol. 79, Issue 4, Aug. 15, 2011, pp. 749-757., 9 pp.

Harrison, S., Marcus., H.L., Structural analysis of silicon carbide deposited by gas-phase selective area laser deposition (SALD), Institute of Materials Science, 97 North Eagleville Road , Storrs. CT 06269..3136 , (860) 486..4623 , Fax: (860) 486..4745, 471:478, 8 pp.

Hashim, J., Looney, L., Hashmi, M.S.J., The enhancement of wettability of sic particles in cast aluminum matrix composites, Journal of Materials Processing Technology 119 (2001) 329-335, 7 pp., © 2001 Elsevier Science B.V.

Hayashi, T., Hydrosilylation of carbon-carbon double bonds, Chapter 7, 15 pp., Department of Chemistry, Faculty of Science, Kyoto University, Sakyo, Kyoto 606-8502. Japan.

Hellmann, J.R., Scheetz, B.E., Final report: Evaluation of proppants derived from ion exchanged mixed glass cullet for use in gas-laden shale formations, Pennsylvania State University, 2012, Project #SWC 4312 for the period Oct. 1, 2009-May 31, 2012, Contract #DE-FE003616; subaward# 4312-TPSU-DOE-3616 , Submitted to the Stripper Well Consortium, Jun. 5, 2012. 28 pp.

Henderson, D.A., Novel piezo motor enables positive displacement microfluidic pump, Presented at NSTI Nanotech 2007, 4 pp, (c) 2007 New Scale Technologies, Inc. I phone (585) 924-4450, www.newscaletech.com.

Holte, D., Flash vacuum pyrolysis, Baran Group Meeting, Apr. 21, 2012. 8 pp.

Howell, B.A., Alomari, M., Thermal degradation of poly(propylene oxide). 8 pp., Center for Applications in Polymer Science, Department of Chemistry, Central Michigan University , Mt. Pleasant, MI 48859-0001.

Hurwitz, F.I., Heimann, P.J., Kacik, T.A., Redistribution reactions in blackglass™ during pyrolysis and their effect on oxidative stability, Ceramic Engineering & science Proceedings, Editor John B. Wachtman, 8 pp., © 1995 The American Ceramic Society.

Hurwitz, F.I., Meador, M.A.B., Tailoring silicon oxycarbide glasses for oxidative stability, NASA Lewis Research Center, Cleveland, OH44135, 26 pp.

Hwang, Y., Riu, D-H, Kim, K-J, Chang, C-H, Porous SiOC Beads by freeze-drying polycarbosilane emulsions, Materials Letters, Mater Lett (2014), 4 pp., http://dxx.doi.org/10.1016/j.matlet.2014.05.194, © 2014 Published by Elsevier B.V.

Idesaki, A., Sugimoto, M., Yoshikawa, M., Synthesis of a porous SiC material from polycarbosilane by direct foaming and radiation curing, Innovating Processing and Manufacturing of Advanced Ceramics and Composites II, 61-69, 5 pp.

Jenšterle, J., Zornik, M., Presentation pre-development status of C. CAST brake disc material, 30 pp., MS Production, Slovenija.

Jeon, E., Kim, H., Yun, J., Preparation of silicon oxycarbide amorphous ceramics from polymer precursors and the characterization of their high temperature stability, Journal of Ceramic Processing Research, vol. 13, No. 3, pp. 239-242 (2012), 4 pp.

Johnson, J.S., Grobsky, K., Bray, D.J., Rapid fabrication of lightweight silicon carbide mirrors, Proc. SPIE vol. 4771, 2002, 11 pp., © 2002 SPIE.

Jüttke, Y., Richter, H., Voigt, I., Prasad, R.M., Bazarjani, M.S., Ghurlo, A., Riedel, R., Polymer derived ceramic membranes for gas separation, Chemical Engineering Transactions, vol. 32, 1891-1896, 2013,6 pp., A publication of the Italian Association of Chemical Engineering, Online at: www.aidic.it/cet , 2013, ISBN 978-88-95608-23-5; ISSN 1974-9791, © 2013, AIDIC Servizi S.r.l.

Kang, S-J, L., Park, J-H, Ko, S-Y, Lee, H-Y, Solid-State Conversion of Single Crystals: The Principle and the State-of-the-Art, Journal of the American Ceramic Society, vol. 98, No. 2, Feb. 2015, 13 pp., © 2015 The American Ceramic Society.

Kim, C.Y., Kim, S.H., Kim, H.S., Navamathavan, R., Choi, C.K., Formation mechanism and structural characteristics of low-dielectric-constant SiOC(-H) films deposited by using plasma-enhanced chemical-vapor deposition with DMDMS and O2 Precursors, Journal of the Korean Physical Society, vol. 50, No. 4, Apr. 2007, 1119-1124, 6 pp.

Kinowski, C., Bouazaoui, M., Bechara, R., Hench, L.L., Nedelec, J.M., Turrell, S., Kinetics of densification of porous silica gels: a structural and textural study, Journal of Non-Crystalline Solids, 291 (2001) 143-152, 10 pp., © 2001 Elsevier Science B.V.

Kleebe, H-J., Turquat, C., Phase Separation in an SiCO Glass Studied by Transmission Electron Microscopy and Electron Energy-loss Spectroscopy, Journal of the American Ceramic Society, vol. 84, No. 5, 2001, 1073-1080, 8 pp.

Kullman, J., The Complicated World of Proppant Selection, Power Point, South Dakota School of Mines & Technology, Oct. 2011, 65 pp.

Laine, R.M., Babonneau, F., Preceramic Polymer Routes to Silicon Carbide, Reviews, Chem. Mater. 1993, 5, 260-279, 20 pp.

Laine, R.M., Sellinger, A., Si-containing ceramic precursors, Chapter 39, The Chemistry of Organic Silicon Compounds, vol. 2, 2245-2316, 72 pp., © 1998 John Wiley & Sons, Ltd, ISBN: 0-471-96757-2.

(56) References Cited

OTHER PUBLICATIONS

Launer, P.J., Infrared Analysis of Organosilicon Compounds: Spectra-Structure Correlations, Laboratory for Materials, Inc., Burnt Hills, New York 12027, 100-103, 4 pp., Reprinted from Silicon Compounds Register and Review, Edited by B., Arkles, et al, 1987, Petrarch Systems.

Lee, R., Carbosilanes: Reactions & Mechanisms of SMP-10 Pre-Ceramic Polymers, Marshall Space Flight Center, Jacobs ESTS Group / ICRC, Jul. 2009, 23 pp.

Leslie, C.J., Kim H.J., Chen, H., Walker. K.M., Boakye, E.E., Chen, C. Carney, C.M., Cinibulk, M.K., Chen, M.-Y., Polymer-Derived Ceramics for Development of Ultra-High Temperature Composites, Innovative Processing and Manufacturing of Advanced Ceramics and Composites II, 33-45, 7 pp.

Lewis, L.N., Stein, J., Gao, Y., Colborn, R.E., Hutchins, G., Platinum catalysts used in the silicones industry their synthesis and activity in hydrosilylation, Platinum Metals Rev., 1997, 41, (2), 66-75, 10 pp.

Li, Y., Wu, D., Chang, L., Shi, Y., Wu, D., Fang, Z., A Model for the Bulk Crushing Strength of Spherical Catalysts, Ind. Eng. Chem. Res. 1999, 38, 1911-1916, 6 pp.

Liang, T., Li, Y-L, Su, D., Du, H.-B., Silicon oxycarbide ceramics with reduced carbon by pyrolysis of polysiloxanes in water vapor, Journal of the European Ceramic Society 30 (2010) 2677-2682, 6 pp.

Linck, C., Ionescu, E., Papendorf, B., Galuskova, D., Galusek, D., Sajgalik, P., Riedel R., Corrosion behavior of silicon oxycarbide-based ceramic nanocomposites under hydrothermal conditions, Int. J. Mat. Res. (formerly Z. Metallkd.) 103 (2012) 1, 31-39, 9 pp., International Journal of Materials Research downloaded from www.hanser-elibrary.com by Mr. Mark Land on Jan. 3, 2014 for personal use only.

Linsmeier, K. D., Technical Ceramics, The material of choice for the most demanding applications, CeramTec GmbH, 73207 Plochingen, www.ceramtec.com, Verlag Modeme Industrie, 2011, 85 pp., All rights reserved with Süddeutscher Verlag onpact GmbH, 81677 Munich, www.sv-onpact.de.

Liu, P. KT, Development of Hydrogen Selective Membranes/Modules as Reactors/Separators for Distributed Hydrogen Production, DE-FG36-05GO15092, May 18-22, 2009, 23 pp., Media and Process Technology Inc., Pittsburgh, PA 15238.

Liu, C-Y., Liao, N-B., Yang, Y., Zhang, J-L, Effect of Sputtering Power on Nano-mechanical Properties of SiCO Film, International Conference on Material Science and Application (ICMSA 2015), 1037-1041, 5 pp.

Liu, X., Li, Y-L, Hou, F., Fabrication of SiOC Ceramic Microparts and Patterned Structures from Polysiloxanes via Liquid Cast and Pyrolysis, J. Am. Ceram. Soc., 92 [1] 49-53 (2009), 5 pp., DOI: 10.1111/j.1551-2916.2008.02849.x, © 2008 The American Ceramic Society.

Liu, C., Chen, H.Z., Komarneni, S., Pantano, C.G., High Surface Area SiC/Silicon Oxycarbide Glasses Prepared from Phenyltrimethoxysilane-Tetramethoxysilane Gels, Journal of Porous Materials 2, 245-252 (1996), 8 pp., 1996 Kluwer Academic Publishers, Manufactured in The Netherlands.

Louette, P., Bodino, F., Pireaux, J-J., Poly (methyl hydrogen siloxane) (PMHS) XPS Reference Core Level and Energy Loss Spectra, Surface Science Spectra, vol. 12, 2005, 1055-5269/2005/12/133/6 © 2006 American Vacuum Society 133.

Lu., B., Zhang, Y., Densification behavior and microstructure evolution of hot-pressed SiC—SiBCN ceramics, Science Direct, Ceramics International 41(2015) 8541-8551, 11 pp., http://dx.doi.org/10.1016/j.ceramint.2015.03.0610272-8842 © 2015 Elsevier Ltd and Techna Group S.r.l.

Mack, M.G., Coker, C.E., Development and Field Testing of Advanced Ceramic Proppants, Society of Petroleum Engineers, 2013, SPE 166323, 16 pp, Prepared for presentation at the SPE Annual Technical Conference and Exhibition held in New Orleans, Louisiana, USA Sep. 30-Oct. 2, 2013.

Malczewski, R.M., Jahn, D.A., Schoenherr, W.J., Peroxide or Platinum? Cure System Considerations for Silicone Tubing Applications, Dow Corning Healthcare, 2003, 5 pp., Dow Corning Corporation, Printed in USA Form No. 52-1077-01.

Martinez, F.L., Ruiz-Merino, R., Del Prado, A., San Andrès, E., Màrtil, I., González-Diaz, G., Jeynes, C., Barradas. N.P., Wang, L., Reehal, H.S., Bonding structure and hydrogen content in silicon nitride thin films deposited by the electron cyclotron resonance plasma method, 12 pp. This work was partially supported by the Ministry of Science and Technology (Spain) under contract TIC2001/1253.

Meador, M.A.B., Hurwitz, F.I., Gonczy, S.T., NMR Study of Redistribution Reactions in Blackglas™ and Their Influence on Oxidative Stability, Ceramic Engineering & Science Proceedings, Victor Greenhut, 1996, The American Ceramic Society 394-400, 7 pp.

Meals, R.N., Hydrosilation in the synthesis of organosilanes. 141-157, 17 pp., Silicone Products Department, General Electric Co., Waterford, New York.

Mera, G., Navrotsky, A., Sen, S., Kleebed, H-J., Riedel, R., Polymer-derived SiCN and SiOC ceramics—structure and energetics at the nanoscale, Journal of Materials Chemistry A, J. Mater. Chem. A, 2013, 1, 3826-3836, 11 pp., DOI: 10.1039/c2ta00727d, © The Royal Society of Chemistry 2013, RSC Publishing.

\* cited by examiner (TES)

METHODS OF HYDRAULICALLY FRACTURING AND RECOVERING HYDROCARBONS

This application: (i) claims under 35 U.S.C. §119(e)(1) the benefit of the filing date of Jul. 4, 2013 of U.S. provisional application Ser. No. 61/843,014; (ii) claims under 35 U.S.C. §119(e)(1) the benefit of the filing date of Feb. 28, 2014 of U.S. provisional application Ser. No. 61/946,598; and, (iii) is a continuation-in-part of U.S. patent application Ser. No. 14/268,150 filed May 2, 2014, which claims, under 35 U.S.C. §119(e)(1), the benefit of the filing date of May 2, 2013 of U.S. provisional application Ser. No. 61/818,906 and the benefit of the filing date of May 3, 2013 of U.S. provisional application Ser. No. 61/818,981 the entire disclosures of each of which are incorporated herein by reference.

BACKGROUND OF THE INVENTION

Field of the Invention

The present inventions relate to synthetic proppants, ceramic proppants and polymeric derived ceramic proppants; methods for making these proppants; fracing fluids utilizing these proppants; and hydraulic fracturing methods with these proppants. In particular, the present inventions relate to proppants and hydraulic fracturing activities that utilize polymeric derived siloxane based ceramics. Thus, the present inventions further relate to treating wells, e.g., hydrocarbon producing wells, water wells and geothermal wells, to increase and enhance the production from these wells by siloxane based polymeric derived ceramic proppant hydraulic fracturing. Still more particularly, methods are provided for increasing the fluid conductivity between a subterranean formation containing a desired natural resource, e.g., natural gas, crude oil, water, and geothermal heat source, and a well or borehole to transport the natural resource to the surface or a desired location or collection point for that natural resource.

In the production of natural resources from formations within the earth a well or borehole is drilled into the earth to the location where the natural resource is believed to be located. These natural resources may be a hydrocarbon reservoir, containing natural gas, crude oil and combinations of these; the natural resource may be fresh water; it may be a heat source for geothermal energy; or it may be some other natural resource that is located within the ground.

These resource-containing formations may be a few hundred feet, a few thousand feet, or tens of thousands of feet below the surface of the earth, including under the floor of a body of water, e.g., below the sea floor. In addition to being at various depths within the earth, these formations may cover areas of differing sizes, shapes and volumes.

Unfortunately, and generally, when a well is drilled into these formations the natural resources rarely flow into the well at rates, durations and amounts that are economically viable. This problem occurs for several reasons, some of which are well understood, others of which are not as well understood, and some of which may not yet be known. These problems can relate to the viscosity of the natural resource, the porosity of the formation, the geology of the formation, the formation pressures, and the perforations that place the production tubing in the well in fluid communication with the formation, to name a few.

Typically, and by way of general illustration, in drilling a well an initial borehole is made into the earth, e.g., the surface of land or seabed, and then subsequent and smaller diameter boreholes are drilled to extend the overall depth of the borehole. In this manner as the overall borehole gets deeper its diameter becomes smaller; resulting in what can be envisioned as a telescoping assembly of holes with the largest diameter hole being at the top of the borehole closest to the surface of the earth.

Thus, by way of example, the starting phases of a subsea drill process may be explained in general as follows. Once the drilling rig is positioned on the surface of the water over the area where drilling is to take place, an initial borehole is made by drilling a 36" hole in the earth to a depth of about 200-300 ft. below the seafloor. A 30" casing is inserted into this initial borehole. This 30" casing may also be called a conductor. The 30" conductor may or may not be cemented into place. During this drilling operation a riser is generally not used and the cuttings from the borehole, e.g., the earth and other material removed from the borehole by the drilling activity are returned to the seafloor. Next, a 26" diameter borehole is drilled within the 30" casing, extending the depth of the borehole to about 1,000-1,500 ft. This drilling operation may also be conducted without using a riser. A 20" casing is then inserted into the 30" conductor and 26" borehole. This 20" casing is cemented into place. The 20" casing has a wellhead secured to it. (In other operations an additional smaller diameter borehole may be drilled, and a smaller diameter casing inserted into that borehole with the wellhead being secured to that smaller diameter casing.) A BOP (blow out preventer) is then secured to a riser and lowered by the riser to the sea floor; where the BOP is secured to the wellhead. From this point forward all drilling activity in the borehole takes place through the riser and the BOP.

For a land based drill process, the steps are similar, although the large diameter tubulars, 30"-20" are typically not used. Thus, and generally, there is a surface casing that is typically about 13⅜" diameter. This may extend from the surface, e.g., wellhead and BOP, to depths of tens of feet to hundreds of feet. One of the purposes of the surface casing is to meet environmental concerns in protecting ground water. The surface casing should have sufficiently large diameter to allow the drill string, product equipment such as ESPs and circulation mud to pass through. Below the casing one or more different diameter intermediate casings may be used. (It is understood that sections of a borehole may not be cased, which sections are referred to as open hole.) These can have diameters in the range of about 9" to about 7", although larger and smaller sizes may be used, and can extend to depths of thousands and tens of thousands of feet. Inside of the casing and extending from a pay zone, or production zone of the borehole up to and through the wellhead on the surface is the production tubing. There may be a single production tubing or multiple production tubings in a single borehole, with each of the production tubing endings being at different depths.

Typically, when completing a well, it is necessary to perform a perforation operation, and perform a hydraulic fracturing, or fracing operation. In general, when a well has been drilled and casing, e.g., a metal pipe, is run to the prescribed depth, the casing is typically cemented in place by pumping cement down and into the annular space between the casing and the earth. (It is understood that many different down hole casing, open hole, and completion approaches may be used.) The casing, among other things, prevents the hole from collapsing and fluids from flowing between permeable zones in the annulus. Thus, this casing forms a structural support for the well and a barrier to the earth.

While important for the structural integrity of the well, the casing and cement present a problem when they are in the production zone. Thus, in addition to holding back the earth, they also prevent the hydrocarbons from flowing into the well and from being recovered. Additionally, the formation itself may have been damaged by the drilling process, e.g., by the pressure from the drilling mud, and this damaged area of the formation may form an additional barrier to the flow of hydrocarbons into the well. Similarly, in most situations where casing is not needed in the production area, e.g., open hole, the formation itself is generally tight, and more typically can be very tight, and thus, will not permit the hydrocarbons to flow into the well. In some situations the formation pressure is large enough that the hydrocarbons readily flow into the well in an uncased, or open hole. Nevertheless, as formation pressure lessens a point will be reached where the formation itself shuts-off, or significantly reduces, the flow of hydrocarbons into the well. Also such low formation pressure could have insufficient force to flow fluid from the bottom of the borehole to the surface, requiring the use of artificial lift.

To address, in part, this problem of the flow of hydrocarbons (as well as other resources, e.g., geothermal) into the well being blocked by the casing, cement and the formation itself, openings, e.g., perforations, are made in the well in the area of the pay zone. Generally, a perforation is a small, about ¼ " to about 1" or 2" in diameter hole that extends through the casing, cement and damaged formation and goes into the formation. This hole creates a passage for the hydrocarbons to flow from the formation into the well. In a typical well, a large number of these holes are made through the casing and into the formation in the pay zone.

Generally, in a perforating operation a perforating tool or gun is lowered into the borehole to the location where the production zone or pay zone is located. The perforating gun is a long, typically round tool, that has a small enough diameter to fit into the casing or tubular and reach the area within the borehole where the production zone is believed to be. Once positioned in the production zone a series of explosive charges, e.g., shaped charges, are ignited. The hot gases and molten metal from the explosion cut a hole, i.e., the perf or perforation, through the casing and into the formation. These explosive-made perforations extend a few inches, e.g., 6" to 18" into the formation.

The ability of, or ease with which, the natural resource can flow out of the formation and into the well or production tubing (into and out of, for example, in the case of engineered geothermal wells, and some advanced recovery methods for hydrocarbon wells) can generally be understood as the fluid communication between the well and the formation. As this fluid communication is increased several enhancements or benefits may be obtained: the volume or rate of flow (e.g., gallons per minute) can increase; the distance within the formation out from the well where the natural resources will flow into the well can be increase (e.g., the volume and area of the formation that can be drained by a single well is increased, and it will thus take less total wells to recover the resources from an entire field); the time period when the well is producing resources can be lengthened; the flow rate can be maintained at a higher rate for a longer period of time; and combinations of these and other efficiencies and benefits.

Fluid communication between the formation and the well can be greatly increased by the use of hydraulic fracturing techniques. The first uses of hydraulic fracturing date back to the late 1940s and early 1950s. In general hydraulic fracturing treatments involve forcing fluids down the well and into the formation, where the fluids enter the formation and crack, e.g., force the layers of rock to break apart or fracture. These fractures create channels or flow paths that may have cross sections of a few micron's, to a few millimeters, to several millimeters in size, and potentially larger. The fractures may also extend out from the well in all directions for a few feet, several feet and tens of feet or further. It should be remembered that the longitudinal axis of the well in the reservoir may not be vertical: it may be on an angle (either slopping up or down) or it may be horizontal. For example, in the recovery of shale gas and oil the wells are typically essentially horizontal in the reservoir. The section of the well located within the reservoir, i.e., the section of the formation containing the natural resources, can be called the pay zone.

Typical fluid volumes in a propped fracturing treatment of a formation in general can range from a few thousand to a few million gallons. Proppant volumes can approach several thousand cubic feet. In general the objective of a proppant fracturing is to create and enhance fluid communication between the wellbore and the hydrocarbons in the formation, e.g., the reservoir. Thus, proppant fracturing techniques are used to create and enhance conductive pathways for the hydrocarbons to get from the reservoir to the wellbore. Further, a desirable way of enhancing the efficacy of proppant fracturing techniques is to have uniform proppant distribution. In this manner a uniformly conductive fracture along the wellbore height and fracture half-length can be provided. However, the complicated nature of proppant settling, and in particular in non-Newtonian fluids often causes a higher concentration of proppant to settle down in the lower part of the fracture. This in turn can create a lack of adequate proppant coverage on the upper portion of the fracture and the wellbore. Clustering of proppant, encapsulation, bridging, crushing and embedment are a few negative occurrences or phenomena that can lower the potential conductivity of the proppant pack, and efficacy of hydraulic fracture and the well.

The fluids used to perform hydraulic fracture can range from very simple, e.g., water, to very complex. Additionally, these fluids, e.g., fracing fluids or fracturing fluids, typically carry with them proppants; but not in all cases, e.g., when acids are used to fracture carbonate formations. Proppants are small particles, e.g., grains of sand, aluminum shot, sintered bauxite, ceramic beads, resin coated sand or ceramics, that are flowed into the fractures and hold, e.g., "prop" or hold open the fractures when the pressure of the fracturing fluid is reduced and the fluid is removed to allow the resource, e.g., hydrocarbons, to flow into the well.

In this manner the proppants hold open the fractures, keeping the channels open so that the hydrocarbons can more readily flow into the well. Additionally, the fractures greatly increase the surface area from which the hydrocarbons can flow into the well. Proppants may not be needed, or generally may not be used when acids are used to create a frac and subsequent channel in a carbonate rich reservoir, where the acids dissolve part or all of the rock leaving an opening for the formation fluids to flow to the wellbore.

Typically fracturing fluids consist primarily of water but also have other materials in them. The number of other materials, e.g., chemical additives used in a typical fracture treatment varies depending on the conditions of the specific well being fractured. Generally, a typical fracture treatment will use from about 2 to about 25 additives.

Generally the predominant fluids being used for fracture treatments in the shale formations are water-based fracturing fluids mixed with friction-reducing additives, e.g., slick water, or slick water fracs. Overall the concentration of additives in most slick water fracturing fluids is generally about 0.5% to 2% with water and sand making up 98% to 99.5% by weight. The addition of friction reducers allows fracturing fluids and proppant to be pumped to the target zone at a higher rate and reduced pressure than if water alone were used.

In addition to friction reducers, other such additives may be, for example, biocides to prevent microorganism growth and to reduce biofouling of the fractures; oxygen scavengers and other stabilizers to prevent corrosion of metal pipes; and acids that are used to remove drilling mud damage within the near-wellbore.

Further these chemicals and additives could be one or more of the following, and may have the following uses or address the following needs: diluted acid (15%), e.g., hydrochloric acid or muriatic acid, which may help dissolve minerals and initiate cracks in the rock; a biocide, e.g., glutaraldehyde, which eliminates bacteria in the water that produce corrosive byproducts; a breaker, e.g., ammonium persulfate, which allows a delayed break down of the gel polymer chains; a corrosion inhibitor, e.g., N,N-dimethyl formamide, which prevents the corrosion of pipes and equipment; a cross-linker, e.g., borate salts, which maintains fluid viscosity as temperature increases; a friction reducer; e.g., polyacrylamide or mineral oil, which minimizes friction between the fluid and the pipe; guar gum or hydroxyethyl cellulose, which thickens the water in order to help suspend the proppant; an iron control agent, e.g., citric acid, which prevents precipitation of metal oxides; potassium chloride, which creates a brine carrier fluid; an oxygen scavenger, e.g., ammonium bisulfite, which removes oxygen from the water to reduce corrosion; a pH adjuster or buffering agent, e.g., sodium or potassium carbonate, which helps to maintain the effectiveness of other additives, such as, e.g., the cross-linker; scale inhibitor, e.g., ethylene glycol, which prevents scale deposits in pipes and equipment; and a surfactant, e.g., isopropanol, which is used to increase the viscosity of the fracture fluid.

The composition of the fluid, the characteristics of the proppant, the amount of proppant, the pressures and volumes of fluids used, the number of times, e.g., stages, when the fluid is forced into the formation, and combinations and variations of these and other factors may be preselected or predetermined for specific fracturing jobs, based upon the formation, geology, perforation type, nature and characteristics of the natural resource, and formation pressure, among other things.

Generally, proppant transport inside a hydraulic fracture has two components when the fracture is being generated. The horizontal component is generally dictated by the fluid velocity and associated streamlines which help carry proppant to the tip of the fracture. The vertical component is generally dictated by the terminal particle settling velocity of the proppant particle in the fluid and is a function of proppant diameter and density as well as fluid viscosity and density. The terminal settling velocity, the fluid velocity, and thus the proppant transportation and deposit into the fractures can be further effected and complicated by the various phenomena and conditions present during the fracturing operation.

Proppant characteristics can play an important, if not critical role, in the success of the hydraulic fracturing operation. The proppants' ability to remain dispersed in the fluid and flow to the desired locations in the fractures, and to do so in a predictable manner to form packs, or assemblies of proppant in manners that enhance, rather than restrict, the flow of the natural resource being recovered is based upon its characteristics. The proppants must also be cost effective and preferably inexpensive to make and use, because of the large amounts of proppant material that is required for a fracturing job. Yet they must be strong enough to withstand the pressures of the formation and keep the fractures open. They must also be compatible with the various other components of the fracturing fluid, which for example, may include acids, such as HCl. Thus, for these and other reasons, the art has searched for, but prior to the present inventions has failed to find, a low density, highly uniform, inexpensive, and strong proppant.

Materials made of, or derived from, carbosilane or polycarbosilane (Si—C), silane or polysilane (Si—Si), silazane or polysilazane (Si—N—Si), silicon carbide (SiC), carbosilazane or polycarbosilazane (Si—N—Si—C—Si), siloxane or polysiloxanes (Si—O) are known. These general types of materials have great, but unrealized promise; and have failed to find large-scale applications or market acceptance. Instead, their use has been relegated to very narrow, limited, low volume, high priced and highly specific applications, such as a ceramic component in a rocket nozzle, or a patch for the space shuttle. Thus, they have failed to obtain wide spread use as ceramics, and it is believed they have obtained even less acceptance and use, if any, as a plastic material, e.g., cured but not pyrolized.

To a greater or lesser extent all of these materials and the process used to make them suffer from one or more failings, including for example: they are exceptionally expensive and difficult to make, having costs in the thousands and tens-of-thousands of dollars per pound; they require high and very high purity starting materials; the process requires hazardous organic solvents such as toluene, tetrahydrofuran (THF), and hexane; the materials are incapable of making non-reinforced structures having any usable strength; the process produces undesirable and hazardous byproducts, such as hydrochloric acid and sludge, which may contain magnesium; the process requires multiple solvent and reagent based reaction steps coupled with curing and pyrolizing steps; the materials are incapable of forming a useful prepreg; and their overall physical properties are mixed, e.g., good temperature properties but highly brittle.

As a result, although believed to have great promise, these types of materials have failed to find large-scale applications or market acceptance and have remained essentially scientific curiosities.

Related Art and Terminology

As used herein, unless specified otherwise, the terms "hydrocarbon exploration and production", "exploration and production activities", "E&P", and "E&P activities", and similar such terms are to be given their broadest possible meaning, and include surveying, geological analysis, well planning, reservoir planning, reservoir management, drilling a well, workover and completion activities, hydrocarbon production, flowing of hydrocarbons from a well, collection of hydrocarbons, secondary and tertiary recovery from a well, the management of flowing hydrocarbons from a well, and any other upstream activities.

As used herein, unless specified otherwise, the term "earth" should be given its broadest possible meaning, and includes, the ground, all natural materials, such as rocks, and artificial materials, such as concrete, that are or may be found in the ground.

As used herein, unless specified otherwise "offshore" and "offshore drilling activities" and similar such terms are used in their broadest sense and would include drilling activities on, or in, any body of water, whether fresh or salt water, whether manmade or naturally occurring, such as for example rivers, lakes, canals, inland seas, oceans, seas, such as the North Sea, bays and gulfs, such as the Gulf of Mexico. As used herein, unless specified otherwise the term "offshore drilling rig" is to be given its broadest possible meaning and would include fixed towers, tenders, platforms, barges, jack-ups, floating platforms, drill ships, dynamically positioned drill ships, semi-submersibles and dynamically positioned semi-submersibles. As used herein, unless specified otherwise the term "seafloor" is to be given its broadest possible meaning and would include any surface of the earth that lies under, or is at the bottom of, any body of water, whether fresh or salt water, whether manmade or naturally occurring.

As used herein, unless specified otherwise, the term "borehole" should be given it broadest possible meaning and includes any opening that is created in the earth that is substantially longer than it is wide, such as a well, a well bore, a well hole, a micro hole, a slimhole and other terms commonly used or known in the arts to define these types of narrow long passages. Wells would further include exploratory, production, abandoned, reentered, reworked, and injection wells. They would include both cased and uncased wells, and sections of those wells. Uncased wells, or section of wells, also are called open holes, or open hole sections. Boreholes may further have segments or sections that have different orientations, they may have straight sections and arcuate sections and combinations thereof. Thus, as used herein unless expressly provided otherwise, the "bottom" of a borehole, the "bottom surface" of the borehole and similar terms refer to the end of the borehole, i.e., that portion of the borehole furthest along the path of the borehole from the borehole's opening, the surface of the earth, or the borehole's beginning. The terms "side" and "wall" of a borehole should to be given their broadest possible meaning and include the longitudinal surfaces of the borehole, whether or not casing or a liner is present, as such, these terms would include the sides of an open borehole or the sides of the casing that has been positioned within a borehole. Boreholes may be made up of a single passage, multiple passages, connected passages, (e.g., branched configuration, fishboned configuration, or comb configuration), and combinations and variations thereof.

As used herein, unless specified otherwise, the term "advancing a borehole", "drilling a well", and similar such terms should be given their broadest possible meaning and include increasing the length of the borehole. Thus, by advancing a borehole, provided the orientation is not horizontal and is downward, e.g., less than 90°, the depth of the borehole may also be increased.

Boreholes are generally formed and advanced by using mechanical drilling equipment having a rotating drilling tool, e.g., a bit. For example, and in general, when creating a borehole in the earth, a drilling bit is extending to and into the earth and rotated to create a hole in the earth. To perform the drilling operation the bit must be forced against the material to be removed with a sufficient force to exceed the shear strength, compressive strength or combinations thereof, of that material. The material that is cut from the earth is generally known as cuttings, e.g., waste, which may be chips of rock, dust, rock fibers and other types of materials and structures that may be created by the bit's interactions with the earth. These cuttings are typically removed from the borehole by the use of fluids, which fluids can be liquids, foams or gases, or other materials know to the art.

The true vertical depth ("TVD") of a borehole is the distance from the top or surface of the borehole to the depth at which the bottom of the borehole is located, measured along a straight vertical line. The measured depth ("MD") of a borehole is the distance as measured along the actual path of the borehole from the top or surface to the bottom. As used herein unless specified otherwise the term depth of a borehole will refer to MD. In general, a point of reference may be used for the top of the borehole, such as the rotary table, drill floor, well head or initial opening or surface of the structure in which the borehole is placed.

As used herein, unless specified otherwise, the term "drill pipe" is to be given its broadest possible meaning and includes all forms of pipe used for drilling activities; and refers to a single section or piece of pipe. As used herein the terms "stand of drill pipe," "drill pipe stand," "stand of pipe," "stand" and similar type terms should be given their broadest possible meaning and include two, three or four sections of drill pipe that have been connected, e.g., joined together, typically by joints having threaded connections. As used herein the terms "drill string," "string," "string of drill pipe," string of pipe" and similar type terms should be given their broadest definition and would include a stand or stands joined together for the purpose of being employed in a borehole. Thus, a drill string could include many stands and many hundreds of sections of drill pipe.

As used herein, unless specified otherwise, the terms "workover," "completion" and "workover and completion" and similar such terms should be given their broadest possible meanings and would include activities that take place at or near the completion of drilling a well, activities that take place at or the near the commencement of production from the well, activities that take place on the well when the well is a producing or operating well, activities that take place to reopen or reenter an abandoned or plugged well or branch of a well, and would also include for example, perforating, cementing, acidizing, fracturing, pressure testing, the removal of well debris, removal of plugs, insertion or replacement of production tubing, forming windows in casing to drill or complete lateral or branch wellbores, cutting and milling operations in general, insertion of screens, stimulating, cleaning, testing, analyzing and other such activities.

As used herein, unless specified otherwise, the terms "formation," "reservoir," "pay zone," and similar terms, are to be given their broadest possible meanings and would include all locations, areas, and geological features within the earth that contain, may contain, or are believed to contain, hydrocarbons.

As used herein, unless specified otherwise, the terms "field," "oil field" and similar terms, are to be given their broadest possible meanings, and would include any area of land, sea floor, or water that is loosely or directly associated with a formation, and more particularly with a resource containing formation, thus, a field may have one or more exploratory and producing wells associated with it, a field may have one or more governmental body or private resource leases associated with it, and one or more field(s) may be directly associated with a resource containing formation.

As used herein, unless specified otherwise, the terms "conventional gas", "conventional oil", "conventional", "conventional production" and similar such terms are to be given their broadest possible meaning and include hydrocarbons, e.g., gas and oil, that are trapped in structures in the earth. Generally, in these conventional formations the hydrocarbons have migrated in permeable, or semi-permeable formations to a trap, or area where they are accumulated. Typically, in conventional formations a non-porous layer is above, or encompassing the area of accumulated hydrocarbons, in essence trapping the hydrocarbon accumulation. Conventional reservoirs have been historically the sources of the vast majority of hydrocarbons produced. As used herein, unless specified otherwise, the terms "unconventional gas", "unconventional oil", "unconventional", "unconventional production" and similar such terms are to be given their broadest possible meaning and includes hydrocarbons that are held in impermeable rock, and which have not migrated to traps or areas of accumulation.

As used herein, unless stated otherwise, room temperature is 25° C. And, standard temperature and pressure is 25° C. and 1 atmosphere. As used herein, unless stated otherwise, generally, the term "about" is meant to encompass a variance or range of ±10%, the experimental or instrument error associated with obtaining the stated value, and preferably the larger of these.

SUMMARY

There has been a long-standing, expanding and unmeet need, for improved ways to obtain resources, and in particular, hydrocarbon resources from the earth. Hydraulic fracturing technology, and in particular proppants and fracturing fluids, have not advanced at a sufficient rate and pace, to keep up with the evolution and advances in hydrocarbon exploration and production. Thus, there exists a long felt, increasing and unfulfilled need for, among other things, a proppant material having predetermined characteristics to enhance hydraulic fracturing operations and the recovery of natural resources, such as oil and natural gas, from wells. The present inventions, among other things, solve these needs by providing the articles of manufacture, devices and processes taught, and disclosed herein.

Thus, there is provided a method of enhancing conductivity of a well to increase the recovery of hydrocarbons from a subterranean hydrocarbon reservoir associated with the well, the method including: positioning a polysiloxane derived ceramic proppant in a fluid channel in a subterranean reservoir comprising hydrocarbons, whereby the proppant is in fluid association with the hydrocarbons; and, flowing the hydrocarbons over the polysiloxane derived ceramic proppant; and, recovering the hydrocarbons that have flowed over the proppant.

Further there are provided methods and proppants that may have one or more of the following features: the proppant is a material resulting from the pyrolysis of a polymeric precursor comprising a backbone having the formula —$R_1$—Si—C—C—Si—O—Si—C—C—Si—$R_2$—, where $R_1$ and $R_2$ comprise materials selected from the group consisting of methyl, hydroxyl, vinyl and allyl; the proppant is a filled proppant; the proppant is a polysilocarb derived ceramic proppant; the proppant is made up of silicon, carbon and oxygen; wherein the proppant is made from a polysilocarb batch comprising a precursor selected from the group consisting of methyl hydrogen, siloxane backbone additive, vinyl substituted and vinyl terminated polydimethyl siloxane, vinyl substituted and hydrogen terminated polydimethyl siloxane, allyl terminated polydimethyl siloxane, silanol terminated polydimethyl siloxane, hydrogen terminated polydimethyl siloxane, vinyl terminated diphenyl dimethyl polysiloxane, hydroxyl terminated diphenyl dimethyl polysiloxane, hydride terminated diphenyl dimethyl polysiloxane, styrene vinyl benzene dimethyl polysiloxane, and tetramethyltetravinylcyclotetrasiloxane; wherein the proppant is made from a polysilocarb batch comprising a precursor comprising methyl hydrogen and a siloxane backbone additive; wherein the proppant is made from a polysilocarb batch comprising a precursor comprising styrene vinyl benzene dimethyl polysiloxane; wherein the proppant is made from a polysilocarb batch comprising a precursor comprising methyl hydrogen, vinyl terminated polydimethyl siloxane, and tetramethyltetravinylcyclotetrasiloxane; wherein the proppant is made from a polysilocarb batch comprising a precursor comprising methyl hydrogen, vinyl terminated polydimethyl siloxane, tetramethyltetravinylcyclotetrasiloxane and a catalyst; wherein the proppant is made from a polysilocarb batch comprising a precursor comprising a methyl terminated hydride substituted polysiloxane; wherein the proppant is made from a polysilocarb batch comprising a precursor selected from the group consisting of a methyl terminated vinyl polysiloxane, a vinyl terminated vinyl polysiloxane, a hydride terminated vinyl polysiloxane, and an allyl terminated dimethyl polysiloxane; wherein the proppant is made from a polysilocarb batch comprising a precursor selected from the group consisting of a vinyl terminated dimethyl polysiloxane, a hydroxy terminated dimethyl polysiloxane, a hydride terminated dimethyl polysiloxane, and a hydroxy terminated vinyl polysiloxane; and, wherein the proppant is made from a polysilocarb batch comprising a precursor selected from the group consisting of a phenyl terminated dimethyl polysiloxane, a phenyl and methyl terminated dimethyl polysiloxane, a methyl terminated dimethyl diphenyl polysiloxane, a vinyl terminated dimethyl diphenyl polysiloxane, a hydroxy terminated dimethyl diphenyl polysiloxane, and a hydride terminated dimethyl diphenyl polysiloxane.

Yet further there are provided proppants that can consists essentially of silicon, carbon and oxygen, e.g., its main and primary materials are, silicon, carbon and oxygen, while other minor, non-functional components may be present. Additionally, there provided proppants that can consist of silicon, carbon and oxygen, e.g., they are made up solely of silicon, carbon, and oxygen.

In addition there are provided methods and proppants that may have one or more of the following features: wherein the proppant is made from a polysilocarb batch comprising a molar ratio of hydride groups to vinyl groups is about 1.12 to 1 to about 2.36 to 1; wherein the proppant is made from a polysilocarb batch comprising a molar ratio of hydride groups to vinyl groups is about 1.50 to 1; wherein the proppant is made from a polysilocarb batch comprising a molar ratio of hydride groups to vinyl groups is about 3.93 to 1; wherein the proppant is made from a polysilocarb batch comprising a molar ratio of hydride groups to vinyl groups is about 5.93 to 1; wherein the proppant is a spherical proppant; wherein the proppant is an essentially perfectly spherical proppant; and, wherein the proppant a substantially perfectly spherical proppant.

Further there are provided methods and proppants that may have one or more of the following features: wherein the hydrocarbon is natural gas and the formation is a shale formation; wherein the hydrocarbon is crude oil and the formation is a shale formation; wherein the shale formation is Barnett shale; wherein the shale formation is Bakken shale; wherein the shale formation is Utica shale; and wherein the shale formation is Eagleford shale; and wherein the shale formation is another shale formation known or later discovered.

Moreover, there is provided a method of enhancing conductivity of a well to increase the recovery of hydrocarbons from a subterranean hydrocarbon reservoir associated with the well, the method including: positioning a synthetic proppant in a fluid channel in a subterranean reservoir comprising hydrocarbons, whereby the proppant is in fluid association with the hydrocarbons; the proppant having an apparent specific gravity of less than about 2 and a crush test of less than about 1% fines generated at 10,000 psi., flowing the hydrocarbons over the polysiloxane derived ceramic proppant; and, recovering the hydrocarbons that have flowed over the proppant.

Yet still further there are provided methods and proppants that may have one or more of the following features: wherein the proppant has an actual density and an apparent density; and the actual density and apparent density are within 5% of each other; wherein the proppant has an actual density and an apparent density; and the actual density and apparent density are the same; wherein the proppant has a specific gravity of less than, a crush test of less than about 1% fines generated at 15,000 psi; wherein the plurality of proppants has at least about 100,000 spherical type proppants; and wherein the plurality of proppants has at least about 1,000,000 spherical type proppants.

Further there is provided a method of enhancing conductivity of a well to increase the recovery of hydrocarbons from a subterranean hydrocarbon reservoir associated with the well, the method including: positioning a synthetic proppant in a fluid channel in a subterranean reservoir comprising hydrocarbons, whereby the proppant is in fluid association with the hydrocarbons; the proppant having an apparent specific gravity of less than about 2.5 and a crush test of less than about 1% fines generated at 15,000 psi., flowing the hydrocarbons over the polysiloxane derived ceramic proppant; and, recovering the hydrocarbons that have flowed over the proppant.

Furthermore, there is provided a method of enhancing conductivity of a well to increase the recovery of hydrocarbons from a subterranean hydrocarbon reservoir associated with the well, including: positioning a ceramic proppant in a fluid channel in a subterranean reservoir comprising hydrocarbons, whereby the proppant is in fluid association with the hydrocarbons; the proppant comprises silicon, oxygen and carbon; and, flowing the hydrocarbons over the proppant; and, recovering the hydrocarbons that have flowed over the proppant.

Yet still further there are provided methods and proppants that may have one or more of the following features: wherein the proppant has a specific gravity of less than 2; wherein the proppant has a crush test of less than about 1% fines generated at 15,000 psi; and, wherein the proppant has a specific gravity of less than 2, a crush test of less than about 1% fines generated at 15,000 psi.

In addition there is provided a method of hydraulically fracturing a well, including: preparing at least about 100,000 gallons of a hydraulic fracturing fluid, the hydraulic fracturing fluid comprising a polysiloxane derived ceramic proppant; pumping at least about 100,000 gallons of hydraulic fracturing fluid into a borehole in a formation, and out of the borehole into the formation; whereby fractures are created in the formation; and, leaving at least some of the proppant in the fractures.

Yet still further there are provided methods and proppants that may have one or more of the following features: wherein the fracturing fluid has at least about 1 lb per gallon of proppant; wherein the fracturing fluid has at least about 2 lbs per gallon of proppant; the fracturing fluid has at least 3 lbs per gallon of proppant; the fracturing fluid has at least 4 lbs per gallon of proppant; the fracturing fluid has at least 5 lbs per gallon of proppant, at least about 8 lbs/gal; at least about 10 lbs/gal; and about 12 lbs/gal or more.

Still further there is provided a method of hydraulically fracturing a well, the method including: preparing at least about 100,000 gallons of a hydraulic fracturing fluid, the hydraulic fracturing fluid comprising a synthetic proppant; the proppant having an apparent specific gravity of less than about 2 and a crush test of less than about 1% fines generated at 10,000 psi., pumping at least about 100,000 gallons of hydraulic fracturing fluid into a borehole in a formation, and out of the borehole into the formation; whereby fractures are created in the formation; and, leaving at least some of the proppant in the fractures.

Moreover, there is provided a method of hydraulically fracturing a well, including: preparing at least about 100,000 gallons of a hydraulic fracturing fluid, the hydraulic fracturing fluid comprising a synthetic proppant; the proppant having an apparent specific gravity of less than about 2.5 and a crush test of less than about 1% fines generated at 15,000 psi., pumping at least about 100,000 gallons of hydraulic fracturing fluid into a borehole in a formation, and out of the borehole into the formation; whereby fractures are created in the formation; and, leaving at least some of the proppant in the fractures.

Still additionally there is provide a method of enhancing conductivity of a well to increase the recovery of hydrocarbons from a subterranean hydrocarbon reservoir associated with the well, the method including: locating a plurality of polysiloxane derived ceramic proppants in flow channels in a subterranean formation comprising a reservoir of hydrocarbons, whereby the proppants are in contact with the formation and the hydrocarbons; and, a well connecting a surface of the earth to the formation; moving the hydrocarbons from the formation through the proppant containing flow channels and into the well; and moving the hydrocarbons to the surface.

Yet still further there are provided methods and proppants that may have one or more of the following features: wherein the proppants have a particle size disruption of at least about 95% of the proppants being within about a 10 mesh range; wherein the proppants have a specific gravity of less 1.9; wherein the proppants have a bulk density of less about 1.3 g/cc; wherein the proppants have a bulk density of less about 1.3 g/cc.

DESCRIPTION OF THE PREFERRED EMBODIMENTS

Figure 1:
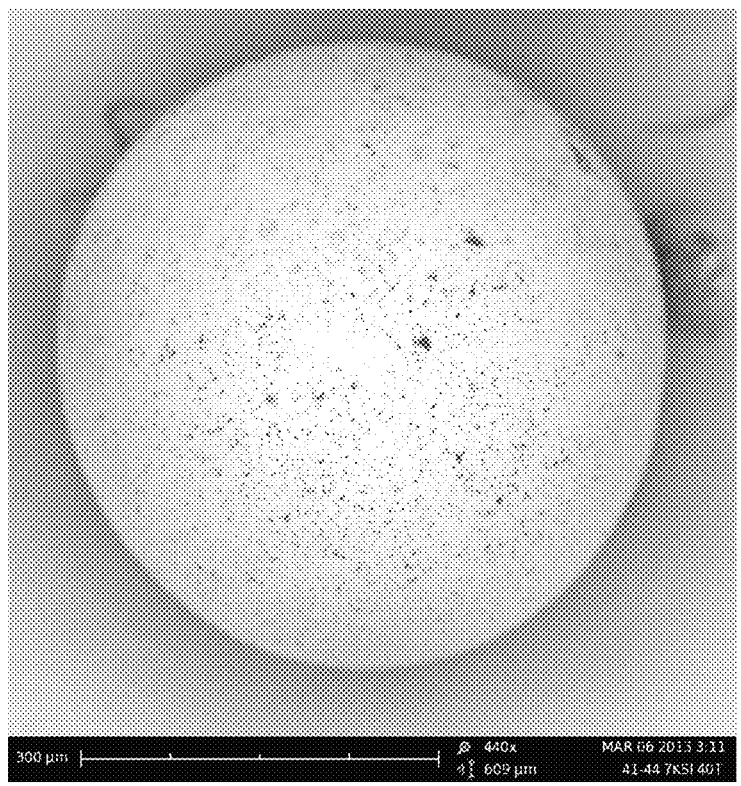
FIG. 1 is a Scanning Electron Photomicrograph (SEM) of an embodiment of a spherical polysiloxane derived ceramic ("PsDC") proppant in accordance with the present invention (440×, 300 μm reference bar).

In general, the present inventions relate to synthetic proppants; methods for making these proppants; fracing fluids utilizing the proppants; and hydraulic fracturing methods.

In general, embodiments of the present inventions relate to polymeric derived ceramic proppants; methods for making these proppants; fracing fluids utilizing these proppants; and hydraulic fracturing methods. In particular, the present inventions relate to proppants and hydraulic fracturing activities that utilize polymeric derived siloxane based ceramics, e.g., polysilocarb derived materials.

In general, embodiments of the present inventions further relate to treating wells, e.g., hydrocarbon producing wells, water wells and geothermal wells, to increase and enhance the production from these wells; and thus, for example, these embodiments relate to new hydraulic fracturing treatments and methods. Still more particularly, embodiments of methods are provided for increasing the fluid conductivity between a subterranean formation containing a desired natural resource, e.g., natural gas, crude oil, water, and geothermal heat source, and a well or borehole to transport the natural resource to the surface or a desired location or collection point for that natural resource. For example, embodiments of the present inventions further relate to treating wells, e.g., hydrocarbon producing wells, water wells and geothermal wells, to increase and enhance the production from these wells by synthetic proppant hydraulic fracturing treatments, including siloxane based polymeric derived ceramic proppant hydraulic fracturing, and including polysilocarb based polymer derived ceramic proppant hydraulic fracturing.

As used herein, unless specified otherwise, the terms "%", "percent", "weight %" and "mass %" and similar such terms are used interchangeably and refer to the weight of a first component as a percentage of the weight of the total, e.g., batch, mixture or proppant. As used herein, unless specified otherwise "volume %" and "% volume" and similar such terms refer to the volume of a first component as a percentage of the volume of the total, e.g., batch, mixture or proppant. As used herein, unless specified otherwise, mesh size and mesh can be corresponded to the relative diameters as set forth in Table 1. As used herein, unless specified otherwise: if particles are described as having a mesh size of "A" it means that the particles will pass through that mess, but will be stopped by a smaller mesh size; if particles are described as having a mesh size of +(plus) mesh "A" it means that the particles will sit upon (e.g., be stopped by) the mesh "A" screen or sieve; and, if particles are described as being – (minus) mesh "A" it means that the particles will pass through (e.g., not be stopped by) the mesh "A" screen or sieve. When particle sizes, for a sample of proppants (a few 100 proppants, to thousands of proppants, to millions of proppants, to tons of proppants) are described as "A"/"B", "A" denotes the largest size of the distribution of sizes, and "B" denotes the smallest size of the distribution of sizes. Thus, a sample of proppants being characterized as mesh 20/40 would have proppants that will pass through a 20 mesh sieve, but will not pass through (i.e., are caught by, sit a top) a 40 mesh sieve.

TABLE 1

| U.S. Mesh (i.e., mesh) | Inches | Microns ($\mu$m) | Millimeters (mm) |
| --- | --- | --- | --- |
| 3 | 0.2650 | 6730 | 6.730 |
| 4 | 0.1870 | 4760 | 4.760 |
| 5 | 0.1570 | 4000 | 4.000 |
| 6 | 0.1320 | 3360 | 3.360 |
| 7 | 0.1110 | 2830 | 2.830 |
| 8 | 0.0937 | 2380 | 2.380 |
| 10 | 0.0787 | 2000 | 2.000 |

TABLE 1-continued

| U.S. Mesh (i.e., mesh) | Inches | Microns (μm) | Millimeters (mm) |
|---|---|---|---|
| 12 | 0.0661 | 1680 | 1.680 |
| 14 | 0.0555 | 1410 | 1.410 |
| 16 | 0.0469 | 1190 | 1.190 |
| 18 | 0.0394 | 1000 | 1.000 |
| 20 | 0.0331 | 841 | 0.841 |
| 25 | 0.0280 | 707 | 0.707 |
| 30 | 0.0232 | 595 | 0.595 |
| 35 | 0.0197 | 500 | 0.500 |
| 40 | 0.0165 | 400 | 0.400 |
| 45 | 0.0138 | 354 | 0.354 |
| 50 | 0.0117 | 297 | 0.297 |
| 60 | 0.0098 | 250 | 0.250 |
| 70 | 0.0083 | 210 | 0.210 |
| 80 | 0.0070 | 177 | 0.177 |
| 100 | 0.0059 | 149 | 0.149 |
| 120 | 0.0049 | 125 | 0.125 |
| 140 | 0.0041 | 105 | 0.105 |
| 170 | 0.0035 | 88 | 0.088 |
| 200 | 0.0029 | 74 | 0.074 |
| 230 | 0.0024 | 63 | 0.063 |
| 270 | 0.0021 | 53 | 0.053 |
| 325 | 0.0017 | 44 | 0.044 |
| 400 | 0.0015 | 37 | 0.037 |

Generally, the synthetic proppants and, any preforms, may be any predetermined volumetric shape. The preform proppants may be the same shape or a different shape from the final synthetic proppants. Thus, the preforms, the proppants and both, may be shaped into balls, spheres, squares, prolate spheroids, ellipsoids, spheroids, eggs, cones, rods, boxes, multifaceted structures, and polyhedrons (e.g., dodecahedron, icosidodecahedron, rhombic triacontahedron, and prism), as well as, other structures or shapes. The synthetic proppants may be made into the shape of any proppant that has been used, has been suggested, is being used, or may be developed in the future for use in hydraulic fracing, or in other similar types of operations. There shapes may also be random, such obtained from breaking up a block of material.

Spherical type structures are examples of a presently preferred shape for proppants. Sphere and spherical shall mean, and include unless expressly stated otherwise, any structure that has at least about 90% of its total volume within a "perfect sphere," i.e., all points along the surface of the structure have radii of equal distance. A spherical type structure shall mean, and include all spheres, and any other structure having at least about 70% of its total volume within a perfect sphere.

Although this specification focuses on proppants, and in particular proppants for hydraulic fracturing, it is to be understood that the small volumetric shapes (preferably predetermined volumetric shapes) of the present materials, e.g., beads, etc., may have many other uses, in addition to hydraulic fracturing, and that the scope of protection to be afford such materials is not limited to proppants, and hydraulic fracturing. These shapes can be many different sizes (for proppant, as well as other uses), including any of the sizes on Table 1, and can be larger and smaller.

The batch formulations and processes of making synthetic proppants provides the ability to make proppants that are, among other shapes, spheres, perfect spheres, essentially perfect spheres (any other structure having at least about 98% of its total volume within a perfect sphere), and substantially perfect spheres (any other structure having at least about 95% of its total volume within a perfect sphere).

Figure 2:
FIG. 2 is an SEM of an embodiment of a PsDC in accordance with the present invention after being subjected to a load, and exposing internal surfaces in accordance with the present inventions (370×, 360 μm reference bar).

Turning to FIG. 1 there is shown a scanning electron photo micrograph (SEPM) of an embodiment of a synthetic proppant of the present invention. The proppant is spherical, and has no porosity. The outer surface is smooth, uniform and solid. FIG. 2 shows a proppant of the same type as FIG. 1 that has been subject to a load, of at least about 12,000 psi or greater. The proppant has fractured and pieces of the proppant have fallen away, revealing the inner sections of the proppant, and showing that the proppant has no porosity, e.g., there are no voids or pores (open or closed). The proppants of FIGS. 1 and 2 are polymer derived ceramic (PDC), and in particular, are polysilocarb derived ceramics (PsDC).

Embodiments of the synthetic proppant preferably have an apparent density that is close to, i.e., within 90% of the actual density of the material making up the proppant; more preferably the apparent density of the proppant is essentially the same as the actual density, i.e., within 95% of the actual density, and still more preferably the apparent density of the proppant is the same as the actual density, i.e., within 98% of the actual density. Thus, it is understood that apparent density takes into consideration (would include in the calculation) the voids in a structure if any; while actual density would not. For example, a common sponge would have an apparent density that is significantly lower than its actual density. The absence of pores, or voids, from the structure of the volumetric shapes is preferred, both absent from the surface and from the interior.

Figure 3:
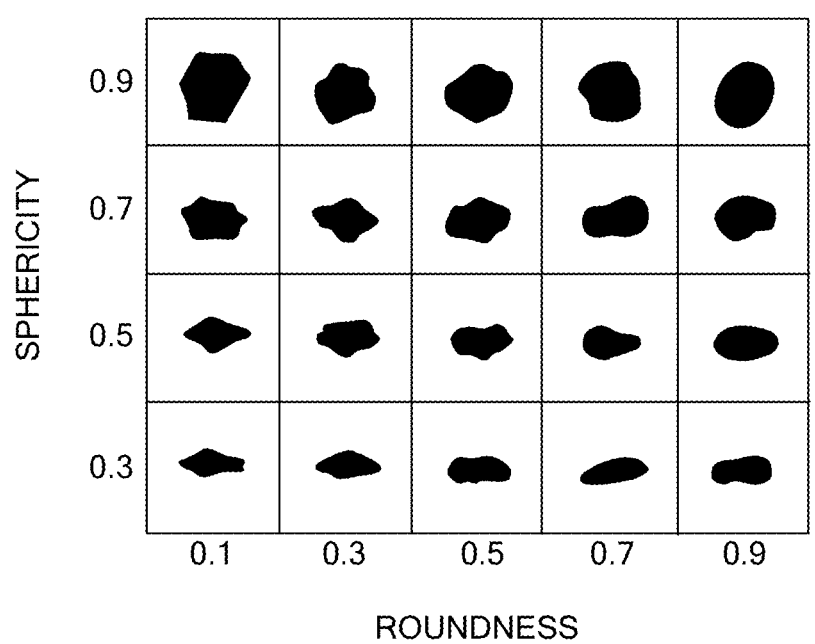
FIG. 3 is a Krumbein and Sloss Sphericity and Roundness chart.

The volumetric shapes of the synthetic proppants may also be characterized by using a Krumbein and Sloss chart (FIG. 3) and analysis, which is a well known methodology by those of skill in the art, and which is also set forth in Section 7, "Proppant sphericity and roundness" of ANSI/API Recommended Practice 19C, May 2008 (also ISO 13503-2:2006). Under this characterization, the synthetic proppants may have average sphericity of at least about 0.5, at least about 0.7, at least about 0.9, and greater. The synthetic proppants may have an average roundness of at least about 0.5, at least about 0.7, at least about 0.9 and greater. The siloxane derived ceramic proppants, e.g., polysilocarb derived ceramic proppants, may have average sphericity of at least about 0.5, at least about 0.7, at least about 0.9, and greater. The siloxane derived ceramic proppants, e.g., polysilocarb derived ceramic proppants, may have an average roundness of at least about 0.5, at least about 0.7, at least about 0.9 and greater. The polysiloxane derived ceramic proppants, e.g., polysilocarb derived ceramic proppants, may have average sphericity/roundness values of about ≥0.9/≥0.9, ≥0.7/≥0.9, ≥0.9/≥0.7 and ≥0.7/≥0.7.

Synthetic proppants, e.g., polysilocarb derived ceramic proppants ("PsDC proppant"), may, for example, also have some, or all of, the characteristics set forth in Table 2, which characteristics are based upon testing and methodologies that are well know in the art, and which are also set forth in ANSI/API Recommended Practice 19C, May 2008 (also ISO 13503-2:2006) as well as, API RP 56/58/60 (the entire disclosure of each of which is incorporated herein by reference). Generally, testing that may be used in categorizing proppants can be found in, and is known to those of skill in the art, in ANSI, API, and ISO, publications, reports, standards, etc., which collectively will be referred to herein as "API (ISO)." Other additional testing and categorizations may be used, which generally known to those of skill in the art, or that are set forth in this specification. Embodiments of the present inventions can exceed, out perform and both, one or more of the characteristics set forth in Table 2.

TABLE 2

| Characteristic/Physical Property | Example 31 | Example 1 | Example 2 | PsDC proppant | PsDC proppant | Preferred Range | More Preferred Range |
|---|---|---|---|---|---|---|---|
| Turbidity (NTU) | 57 | 19 | 26 | 15 | 13 | ≤250 | ≤20 |
| Krumbein Shape Factors | | | | | | | |
| Roundness | >0.9 | >0.9 | >0.9 | 0.7 | 0.7 | ≥0.8 | ≥0.95 |
| Sphericity | >0.9 | >0.9 | >0.9 | .07 | 0.8 | ≥0.8 | ≥0.95 |
| Clusters (%) | 0 | 0 | 0 | 1 | 0 | ≤2 | ≤1 |
| Bulk Density (g/cc) | 1.25 | 1.27 | 1.27 | 1.4 | 1.20 | | |
| Bulk Density lbs/ft$^2$ | 78.12 | 79.25 | 79.44 | 87.40 | 74.91 | | |
| Specific Gravity | 2.1 | 2.09 | 2.12 | 1.90 | 1.70 | 2.1-1.0 | 1.8-1.3 |
| Particle size distribution Sieve | | | | | | | |
| 16 | 0.0 | 0.0 | 0.0 | 0.0 | 0.0 | | |
| 18 | 0.0 | 0.0 | 0.0 | 0.0 | 0.0 | | |
| 20 | 0.0 | 0.2 | 0.0 | 0.0 | 0.0 | | |
| 25 | 3.5 | 13.3 | 1.4 | 0.0 | 0.0 | | |
| 30 | 96.5 | 73.1 | 96.9 | 1 | 0.0 | | |
| 35 | 0.1 | 9.5 | 1.6 | 8 | 0.0 | | |
| 40 | 0.0 | 2.2 | 0.0 | 89 | 0.0 | | |
| 50 | 0.0 | 0.4 | 0.0 | 2 | 0.0 | | |
| 60 | 0.0 | 0.0 | 0.0 | 0.0 | 0.0 | | |
| 70 | 0.0 | 0.0 | 0.0 | 0.0 | 0.0 | | |
| 80 | 0.0 | 0.0 | 0.0 | 0.0 | 0.0 | | |
| 90 | 0.0 | 0.0 | 0.0 | 0.0 | 0.0 | | |
| 100 | 0.0 | 0.0 | 0.0 | 0.0 | 0.0 | | |
| 110 | 0.0 | 0.0 | 0.0 | 0.0 | 1 | | |
| 120 | 0.0 | 0.0 | 0.0 | 0.0 | 97 | | |
| 130 | 0.0 | 0.0 | 0.0 | 0.0 | 2 | | |
| 140 | 0.0 | 0.0 | 0.0 | 0.0 | 0.0 | | |
| 150 | 0.0 | 0.0 | 0.0 | 0.0 | 0.0 | | |
| 160 | 0.0 | 0.0 | 0.0 | 0.0 | 0.0 | | |
| Pan | 0.0 | 0.0 | 0.0 | 0.0 | 0.4 | ≤1.0 | ≤0.5 |
| % in size | 100 | 98.1 | 99.9 | 99 | 93 | ≥95* | ≥97** |
| Mean Particle Diameter mm | 0.659 | 0.653 | 0.655 | 0.400 | 0.149 | 1.680-0.053 | 0.841-0.074 |
| Median Particle Diameter (MPD) mm | 0.657 | 0.645 | 0.652 | 0.395 | 0.140 | 1.680-0.053 | 0.841-0.074 |
| Solubility in 12/3 HCL/HF for 0.5 HR @ 150 F. (% weight loss) | 3.5 | 3.1 | 2.4 | 3.5 | 3.8 | ≤7.0 | ≤4 |
| Solubility in 15% HCL for 0.5 HR @ 150 F. (% weight loss) | | 0.2 | 1.8 | 0.3 | 0.4 | ≤7.0 | ≤4 |
| Settling Rate (ft/min) | 51.26 | 49.24 | 51.74 | 15.00 | 10.00 | ≤30 | ≤12 |
| ISO crush Analysis (% Fines) 4 lbs/ft$^2$ @ 4,000 psi | | 9.6 | | 7.5 | 7.5 | ≤10 | ≤8.0 |
| ISO crush Analysis (% Fines) 4 lbs/ft$^2$ @ 5,000 psi | | 13.2 | 9.7 | 9.1 | 6.7 | ≤10 | ≤8.0 |
| ISO crush Analysis (% Fines) 4 lbs/ft$^2$ @ 6,000 psi | | | 11.3 | 9.9 | 8.4 | ≤10 | ≤8.0 |
| ISO crush Analysis (% Fines) 4 lbs/ft$^2$ @ 7,000 psi | 8.6 | | | 10 | 8.9 | ≤10 | ≤8.0 |
| ISO crush Analysis (% Fines) 4 lbs/ft$^2$ @ 8,000 psi | 10.4 | | | 12 | 9.9 | ≤10 | ≤8.0 |
| Wettability (pH of Water Extract) | | Fair | Fair | Good | Fair | Wettable | Fair or better |
| pH of Water Extract | | | | | | | |
| Initial pH | | 7.99 | 8.56 | 8.4 | 8.2 | x | x |
| mL NaOH to pH 9 | | 0.70 | 0.55 | 0.6 | 0.75 | 0.6 ± 0.2 | 0.6 ± 0.05 |

TABLE 2-continued

| Characteristic/Physical Property | Example 31 | Example 1 | Example 2 | PsDC proppant | PsDC proppant | Preferred Range | More Preferred Range |
|---|---|---|---|---|---|---|---|
| mL NaOH to pH 10 | | 3.00 | 2.30 | 3.10 | 2.10 | 2.5 ± 1.5 | 2.5 ± 0.5 |
| mL NaOH to pH 11 | | 6.20 | 6.10 | 6.25 | 6.0 | 6.0 ± 1 | 6.0 ± 0.5 |

\* \*\*for a particular targeted diameter sphere size within the targeted range

The characteristics and physical properties identified in Table 2 are further explained as follows.

Turbidity—A measure to determine the levels of dust, silt, suspended clay, or finely divided inorganic matter levels in fracturing proppants. High turbidity reflects improper proppant manufacturing and/or handling practices. The more often and more aggressively a proppant is handled, the higher the turbidity. Offloading pressures exceeding characteristics or guidelines can have a detrimental effect on the proppant performance. Produced dust can consume oxidative breakers, alter fracturing fluid pH, and/or interfere with crosslinker mechanisms. As a result, higher chemical loadings may be required to control fracturing fluid rheological properties and performance. If fluid rheology is altered, then designed or modeled fracture geometry and conductivity will be altered. A change in conductivity directly correlates to reservoir flow rate.

Krumbein Shape Factors—Determines proppant roundness and sphericity. Grain roundness is a measure of the relative sharpness of grain corners, or of grain curvature. Particle sphericity is a measure of how closely a proppant particle approaches the shape of a sphere. Charts developed by Krumbein and Sloss in 1963 are the most widely used method of determining shape factors.

Clusters—Proppant grains should consist of single, well-rounded particles. During the mining and manufacturing process of proppants, grains can attach to one another causing a cluster. It is recommended by ISO 13503-2 that clusters be limited to less than 1% to be considered suitable for fracturing proppants.

Bulk Density—A dry test to gain an estimation of the weight of proppant that will fill a unit volume, and includes both proppant and porosity void volume. This is used to determine the weight of a proppant needed to fill a fracture or a storage tank.

Specific Gravity—Also called Apparent Density, it includes internal porosity of a particle as part of its volume. It is measured with a low viscosity fluid that wets the particle surface.

Sieve Analysis: Particle Size Distribution & Median Particle Diameter—Also called a sieve analysis, this test determines the particle size distribution of a proppant sample. Calibrated sieves are stacked according to ISO 13503-2 recommended practices and loaded with a pre-measured amount of proppant. The stack is placed in a Ro-Tap sieve shaker for 10 minutes and then the amount on each sieve is measured and a percent by weight is calculated on each sieve. A minimum of 90% of the tested proppant sample should fall between the designated sieve sizes. Not over 0.1% of the total tested sample should be larger than the first sieve size and not over 1.0% should fall on the pan. The in-size percent, mean particle diameter, and median particle diameter are calculated, which relates directly to propped fracture flow capacity and reservoir productivity.

API/ISO Crush Test—The API test is useful for comparing proppant crush resistance and overall strength under varying stresses. A proppant is exposed to varying stress levels and the amount of fines is calculated and compared to manufacturer specifications. A PT Crush Profile—can show graphically how median particle diameter (MPD) can vary with changes in closure stress. Unlike the ISO crush test, the PT Crush Profile uses the entire proppant sample for crushing at each stress, the sample is then sieved to determine particle distribution, and MPD is then calculated. A change in MPD directly correlates to flow capacity and reservoir productivity.

Acid Solubility—The solubility of a proppant in 12-3 hydrochloric-hydrofluoric acid (HCl—HF) is an indication of the amount of undesirable contaminates. Exposing a proppant (specifically gravel pack/frac pack materials) may result in dissolution of part of the proppant, deterioration in propping capabilities, and a reduction in fracture conductivity in the zone contacted by such acid. The loss of fracture conductivity near the wellbore may cause a dramatic reduction in well productivity.

pH of Water Extract—This test reflects the potential chemical impact of a proppant on fracturing fluid pH. Processing or manufacturing of prior art proppants can leave residues, or 'free phenol' in the case of resin coated proppants, which can interfere with polymer hydration rates, crosslinking mechanisms, etc. These effects if detected can usually be remedied by increasing buffering capacity, but if undetected can alter fracturing fluid rheology, change fracture geometry, and impact propped fracture conductivity. A change in conductivity directly correlates to reservoir production rate.

Preferably the synthetic proppant has, minimal, little, to no affect on the chemistry of the fracturing fluid, regardless of the different additives that can be in a fracturing fluid. In particular, it is highly preferable that the synthetic proppant does not effect or change the chemistry of the fracturing fluid. The synthetic proppant many, in embodiments, provide enhancements or benefits, either chemical, physical or both, to the fracturing fluid, e.g., reduced abrasion, increased lubricity, buffering and specialty properties, e.g., by having a specialty surface treatment, such as a biocide.

In general PsDC proppants essential have little to no affect on the pH of the fracturing fluid. Thus, they can be used with most, in not all, fracturing fluids and will not adversely affect or impact pH, buffering, or pH control, or intentional or planned pH variations, of the wellbore fluids during the fracturing procedures. Further, the PsDC proppants may be coated with, or otherwise contain pH control or solution buffering materials, or sites, and in this manner help to control or maintain a predetermined pH for the fracturing fluids in the down hole environment during fracturing procedures or during production of hydrocarbons.

Regardless of the failure mechanism, fluid flow, or hydraulic mechanisms taking place, the synthetic proppants, e.g., PDC proppants, e.g., PsDC proppants exhibit surprising and exceptional performance features, including among other things improved strength to weight ratios, and improved conductivities over prior art proppants.

Figure 4:
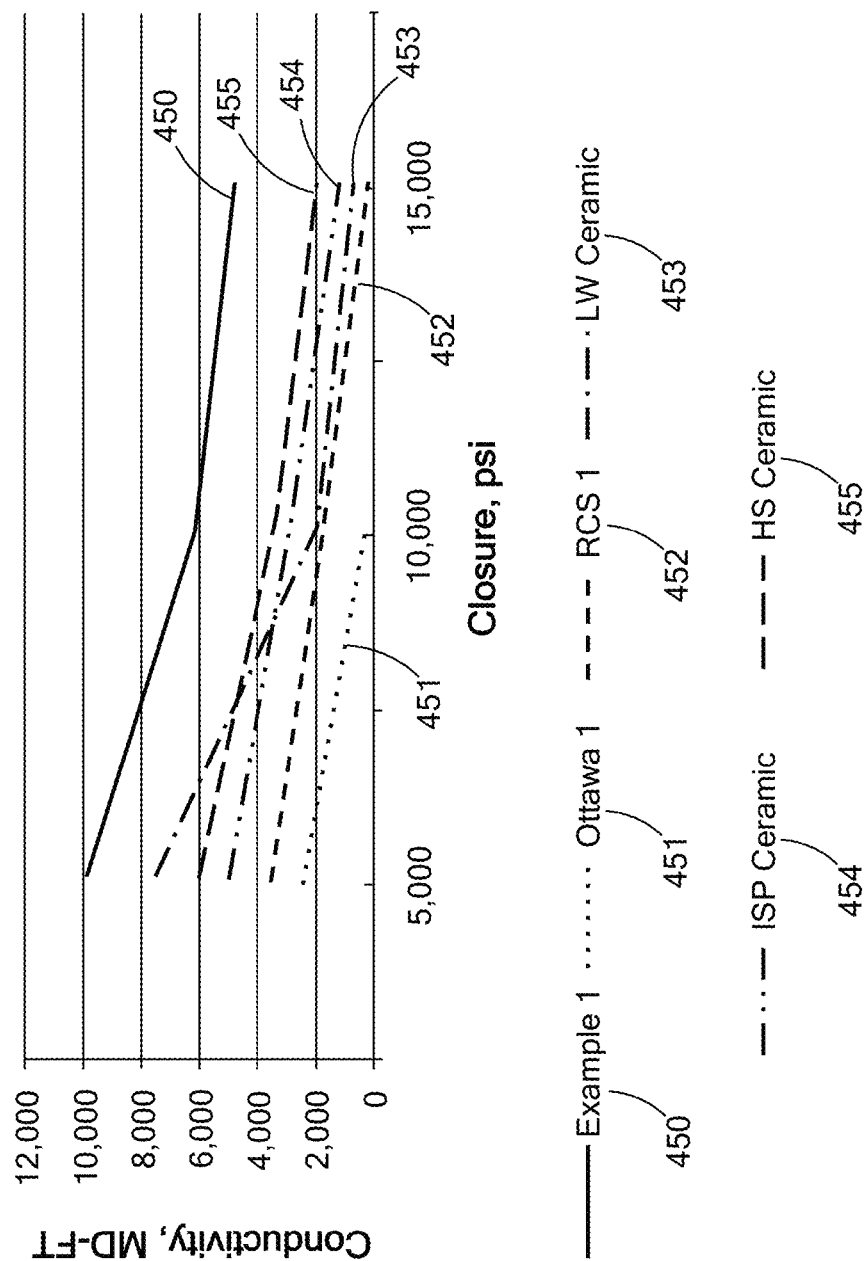
FIG. 4 is a chart comparing the conductivity data for an embodiment of proppants in accordance with the present invention with published conductivity data for prior art proppants.

For example, turning to FIG. 4, which is a chart comparing the short-term conductivity data (line 450) for the proppant of Example 1 with published long-term conductivity data for prior art proppants, Ottawa 451 (high grade sand), RCS 452 (resin coated sand), 453 LW Ceramic (lightweight ceramic proppant), 454 ISP Ceramic (intermediate strength proppant), and 455 HS Ceramic (high strength ceramic proppant). From the data present in FIG. 4 it can be seen that the proppant of Example 1, 450, even though it had an API (ISO) crush test value of 4,000 psi, exhibited superior conductivity to all prior art proppants evaluated from closure of 5,000 psi to 15,000 psi.

Further, embodiments of synthetic proppants, e.g., PDC proppants, e.g., PsDC proppants can exhibit conductivity data, at pressures about 5,000 psi over its API (ISO) crush test rating: that are at least about 70% of its conductivity data at its rated pressure; that are at least about 80% of its conductivity data at its rated pressure; that are at least about 90% of its conductivity data at its rated pressure; and greater. Embodiments of PsDC proppants can exhibit conductivity data, at pressures about 10,000 psi over its API (ISO) crush test rating: that are at least about 60% of its conductivity data at its rated pressure; that are at least about 70% of its conductivity data at its rated pressure; that are at least about 80% of its conductivity data at its rated pressure; and greater.

The enhanced conductivity data alone or in combination with other enhanced features of embodiments of synthetic proppants, e.g., PDC proppants, e.g., PsDC proppants, such as sphericity, roundness, uniform size distribution, and density provide for the potential for significant improvements in both long-term and short-term in reservoir recovery, e.g., for enhanced initial production, short term and long term production of hydrocarbons from a well.

Thus, for example, performing a synthetic, e.g., PDC, e.g., PsDC hydraulic fracture treatment, and thus having these proppants in the hydrocarbon reservoir, may for example provide benefits such as increases in initial flow of the hydrocarbons, increases in the ability to maintain those increased initial flows for extend or longer periods of time over the life of the well, increase time when the well remains producing, increases in the ability to drain larger areas of a reservoir with or from a single well, and combinations and variations of these and other benefits that may be realized through the use of synthetic proppants, e.g., PDC proppants, e.g., PsDC proppants in hydrocarbon, water and geothermal resources exploration and production.

Figure 5:
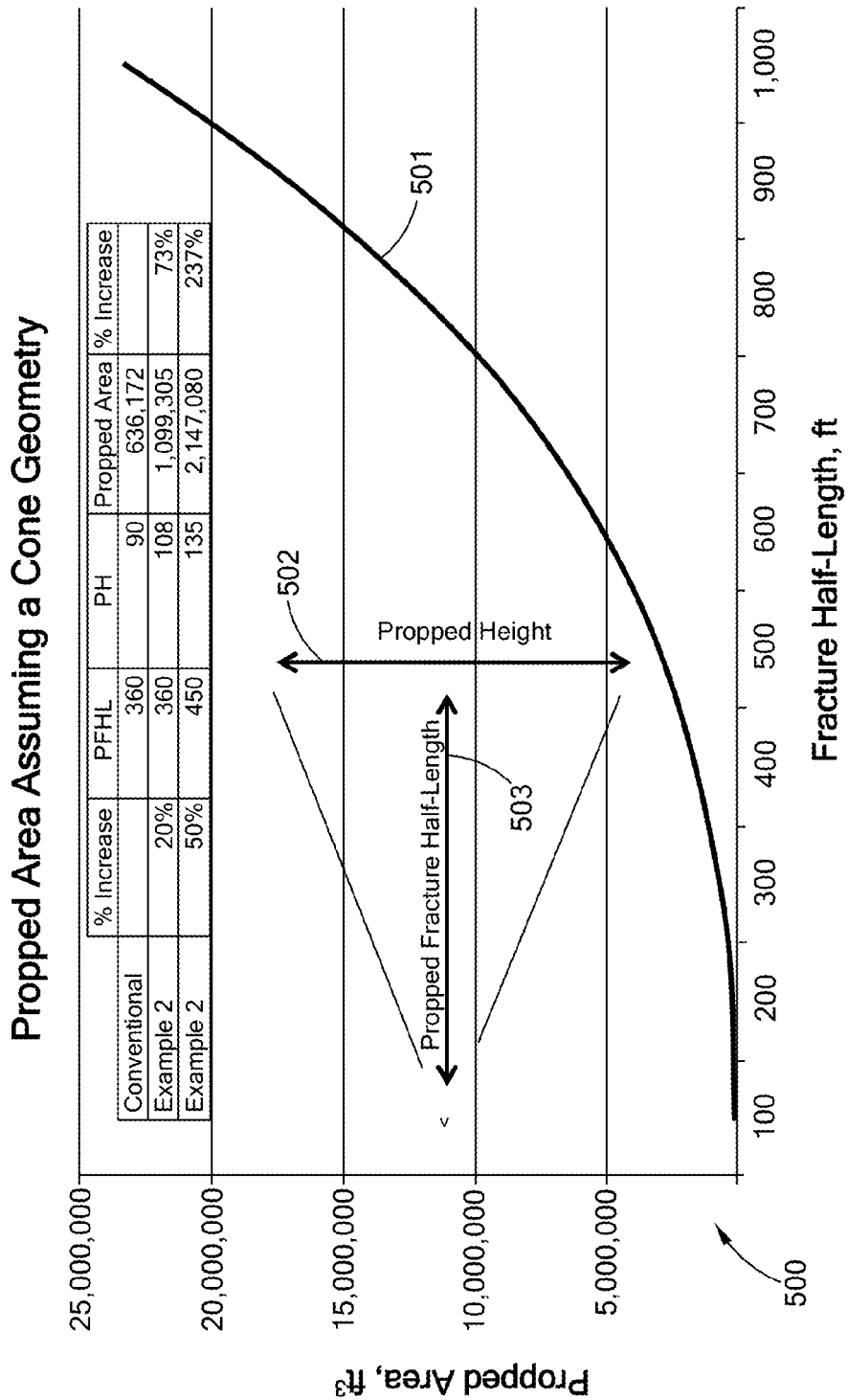
FIG. 5 is a table and chart showing increased propped area for an embodiment of a PsDC hydraulic fracture treatment in accordance with the present invention.

Thus, for example, turning to FIG. 5 there is a table, and charted data 500 showing the increase in propped area this is obtainable with embodiments of synthetic proppants, e.g., PDC proppants, e.g., PsDC proppants. The propped area can be increased by increasing the propped fracture half-length (PFHL), shown by double-arrow 503, and by increasing the propped height (PH), shown by double-arrow 502, and preferably both. The increase in the propped area is shown by line 501. In the table and chart of FIG. 5, the expected performance of the proppant of Example 2 is compared against the performance of a conventional proppant. The proppant of Example 2 can have a 20% increase in PFHL and PH, which results in a 73% increase in total propped area. More preferably, the proppant of Example 2 can have a 50% increase in PFHL and PH, which results in a 237% increase in total propped area. It is theorized that, among other reasons, because of the reduced density (both apparent and actual) of the synthetic proppants, e.g., PDC proppants, e.g., PsDC proppants, and their considerable increase in strength, for these reduced densities, the synthetic proppants are capable of obtaining these significantly larger propped fracture areas, and thus significantly greater hydrocarbon production from a PsDC hydraulically fractured well than can be obtained from prior proppants and fracturing treatments.

Figure 6:
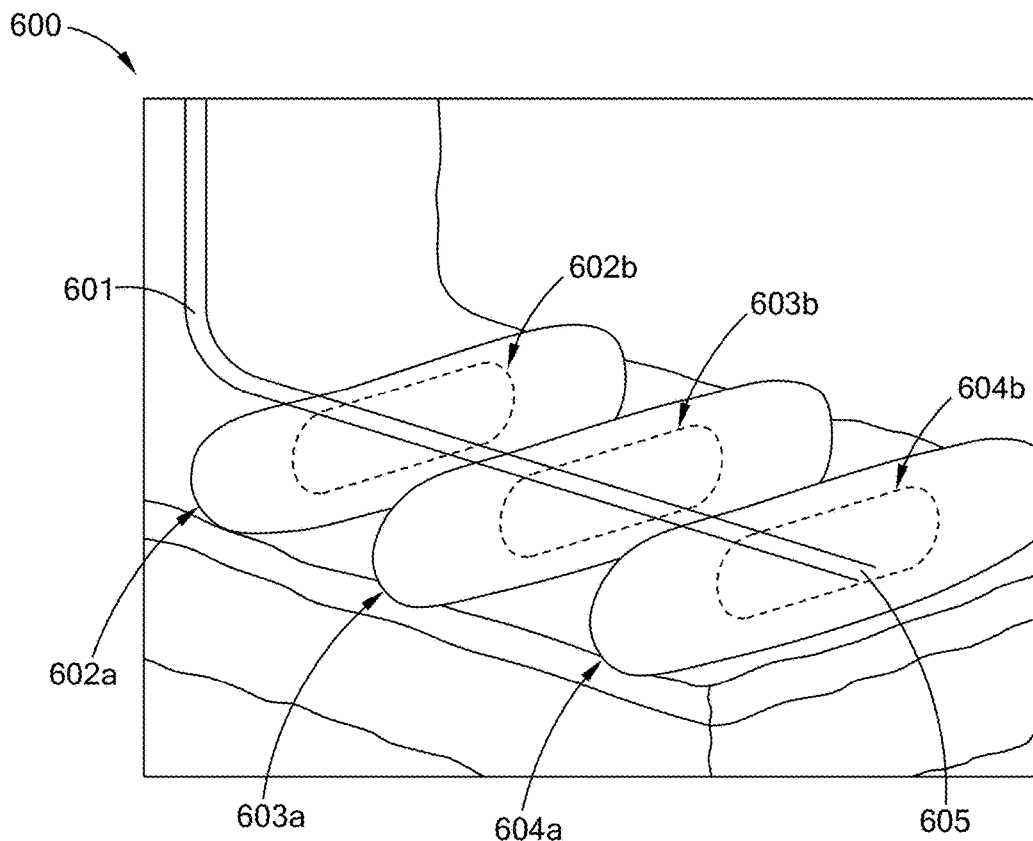
FIG. 6 is a perspective view of a formation showing increased propped area and geometry for an embodiment of a PsDC hydraulic fracture in accordance with the present invention.

Turning to FIG. 6, the increase in both PFHL, as well as PH that can be achieved from using the PsDC proppant of Example 2 is illustrated. A well 601 in a formation 600 has a lateral section 605. The lateral section 605 has three zones that are perforated and subjected to a PsDC hydraulic fracturing treatment. The propped area for the PsDC hydraulic fracturing treatments, 602*a*, 603*a*, 604*a*, is substantially larger than the maximum propped area, 602*b*, 603*b*, 604*b* that could be obtained with conventional proppants.

Figure 7:
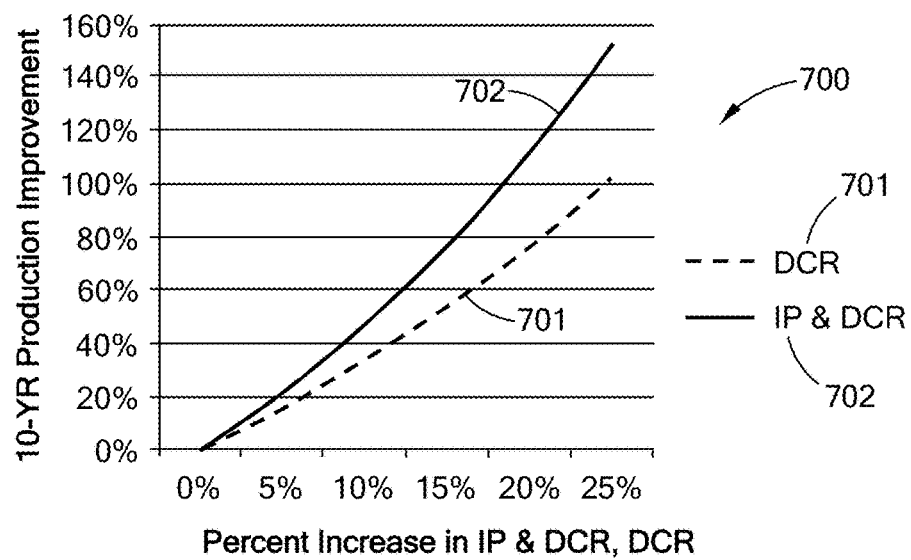
FIG. 7 is a chart showing the increase in initial production ("IP) and an increase in decline curve reduction ("DCR") for an embodiment of a PsDC hydraulic fracture treatment in accordance with the present invention.

Thus, the PsDC hydraulic fracturing treatments provide the ability to increase the Initial Product (IP) from the well (e.g., the amount of production that the well produces during an initial time period typically, about 90 days, about 180 days, and generally less than 1 year), to increase the Decline Curve Reduction (DCR) for the well (e.g., generally over time the amount of production from a well declines over time, slowing this decline in production is viewed as an increase in the DCR), and both. Turning to FIG. 7 there is shown a chart 700 showing the effect on total production that can be obtained from PsDC hydraulic fracturing treatments. In FIG. 7 there is shown a chart 700 showing potential increases in DCR 701 and IP & DCR 702, and the effect these increases have on total production from the well over a 10 year period. Thus, embodiments of the PsDC hydraulic fracturing treatments have the ability to increase the 10 year production of a well by at least about 20%, at least about 30% at least about 60%, at least about 100% and more.

In general, unless specifically stated otherwise, the percentage increases, improved performance, and other comparisons that are made in this specification to current and prior art proppants, fracturing technologies, and treatments, are based upon modeling, predictions, data and calculations known to those of skill in the art for providing the production and performance features for a well that is treated with such current or prior art technologies.

The processes and the formulations used to make the synthetic proppants, e.g., PDC proppants, e.g., PsDC proppants, provide the ability to make proppants having a very narrow particle size distribution. Thus, embodiments of these processes produce proppants that are within at least 90% of the targeted size, at least 95% of the targeted size, and at least 99% of the targeted size. For example, the process can produce spherical proppant, spherical type proppants, essentially perfect spherical proppant, and substantially perfect spherical proppant, each of which can have at least about 90% of their size within a 10 mesh range, at least about 95% of their size within a 10 mesh range, at least about 98% of their size within a 10 mesh range, and at least about 99% of their size within a 10 mesh range. Further, and for example, the process can produce spherical proppant, spherical type proppants, essentially perfect spherical proppant, and substantially perfect spherical proppant, each of which can have at least about 90% of their size within a 5 mesh range, at least about 95% of their size within a 5 mesh range, at least about 98% of their size within a 5 mesh range, and at least about 99% of their size within a 5 mesh range. Preferably, these levels of uniformity in the production of the synthetic proppants, e.g., PDC proppants, e.g., PsDC proppants, is obtained without the need for filtering, sorting or screening the cured proppants, and without the need for filtering, sorting or screening the pyrolized proppants. In addition to having the ability to tightly control size distribution, embodiments of the present processes and formulations provide the ability to make a large number of highly uniform predetermined shapes, e.g., at least about 90%, at least about 95% and at least about 99% of the proppants have a predetermined sphericity and/or roundness. For example, at least about 98% of the proppants made from a batch can be essentially spherical.

Figure 8:
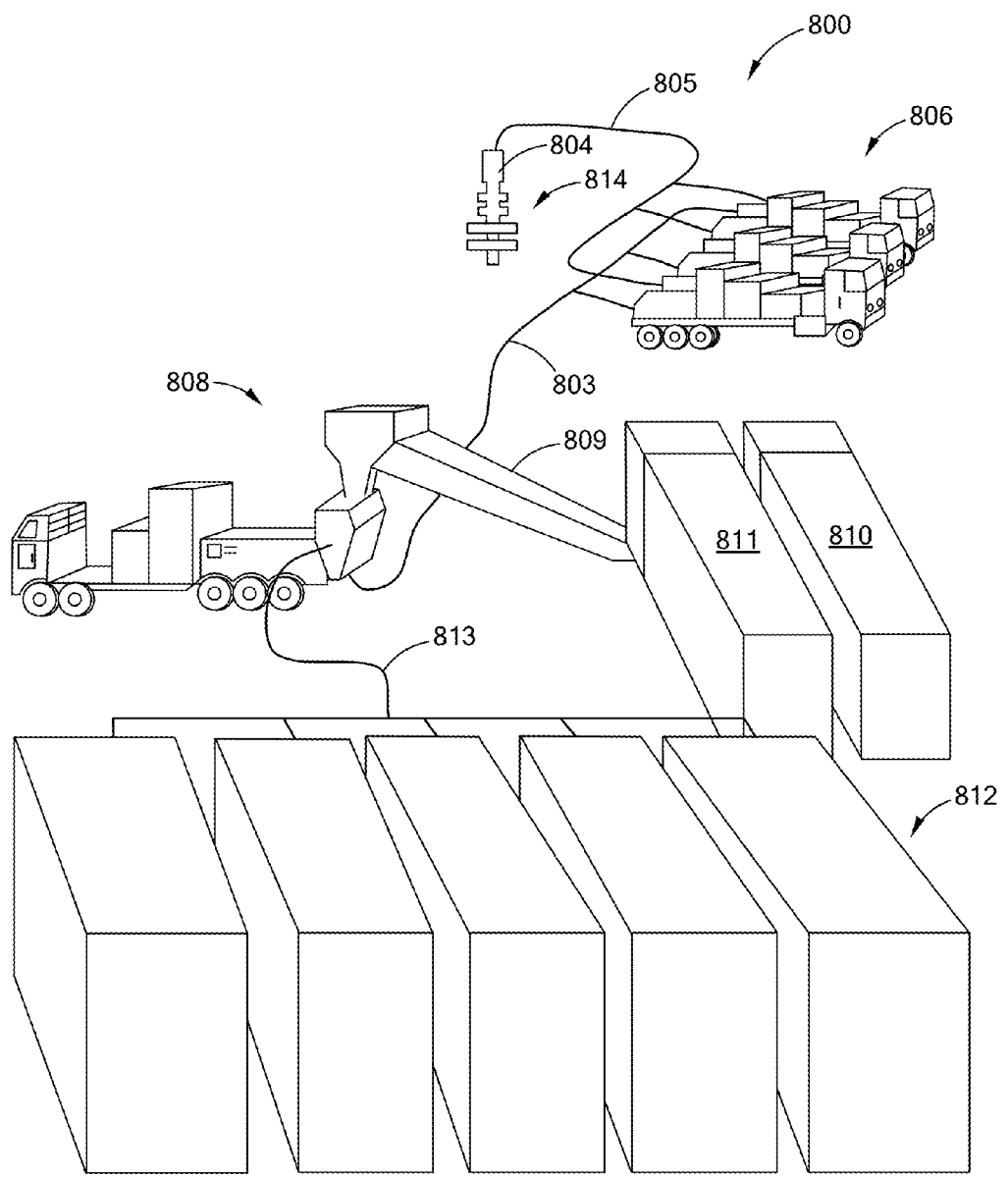
FIG. 8 is a perspective view of a hydraulic fracturing site in accordance with the present inventions.

In FIG. 8 there is shown a perspective view of a synthetic, e.g., PDC, e.g., PsDC hydraulic fracturing site 800. Thus, positioned near the well head 814 there are, pumping trucks 806, proppant, e.g., PsDc proppant, storage containers 810, 811, a proppant feeder assembly 809, a mixing truck 808, and fracturing fluid holding units 812. It is understood that FIG. 8 is an illustration and simplification of a fracturing site. Such sites may have more, different, and other pieces of equipment such as pumps, holding tanks, mixers, and chemical holding units, mixing and addition equipment, lines, valves and transferring equipment, as well as control and monitoring equipment.

A high-pressure line 805 that transfers high pressure fracturing fluid from the pump trucks 806 into the well. The wellhead 804 may also have further well control devices associated with it, such as a BOP. Fracturing fluid from holding units 812 is transferred through lines 813 to mixing truck 808, where proppant from storage containers 810, 811 is feed, (metered in a controlled fashion) by assembly 809 and mixed with the fracturing fluid. The fracturing fluid and proppant mixture is then transferred to the pump trucks 806, by line 803, where the pump trucks 806 pump the fracturing fluid into the well by way of high pressure line 805.

In embodiments, the PsDCs are mixed with fracing fluids for down hole hydraulic fracturing operations to, for example, recover hydrocarbons, such as crude oil and natural gas. Typically, between about 0.1 and about 12 lbs/gal, between about 3 and about 10 lbs/gal, between about 0.1 and about 1 lbs/gal, between about 1.1 and about 2 lbs/gal, between about 2.1 and about 4 lbs/gal, and between about 3.1 and about 8 lbs/gal of PsDC are mixed into fracing fluid, greater and lesser amounts than about 12 lbs/gal and about 1 lbs/gal are also contemplated. Typically, at least about 10,000 gals, at least about 100,000 gals, at least about 1,000,000 gals and more of fracing fluid are used in a fracing operation. Thus, in general hundreds of thousands, if not millions of pounds of proppant, e.g., PsDC proppant, could be used in a single hydraulic fracturing operation.

The highly uniform nature of embodiments of the present proppants provides for many new and previously unavailable advantageous ways to meter and add in a controlled manner, the proppant to fracturing fluid, for a fracturing treatment. The proppant can be added using volumetric measurements, or metering systems, instead of weight based metering system of the prior art. Volumetric systems using embodiments of the present proppants provides the same or greater level of control because, among other things, the proppants of the present invention are highly uniform and thus volume of these proppants equates linearly, and with high predictability, to the weight of the proppants. This ability to meter, in a controlled manner, by volume, the proppants of the present inventions provides the ability to add these proppants in a controlled manner to the well head, to the high pressure line, and generally, after the high pressure, high volume pumps. Such addition will greatly reduce the wear on the pumps and increase their lives.

Because such large volumes of proppants are used in these operations, and because of the importance in understanding and knowing the characteristics of the proppant, both on a micro level (e.g., a single spherical type structure) and on the macro level (e.g., how the proppant pack behaves in the down hole environment) sampling methods have been developed and are well know in the art to obtain representative samples for testing and characterization of a larger volume of proppant, e.g., a lot, a load, a rail car, etc. These sampling methods are set forth in API RP 56, ISO 13503-2:2006, and in ANSI/API Recommended Practice 19C, First Edition, May 2008. Unless expressly stated otherwise, or contrary to the context, as used herein, when PsDC characteristics, properties, or both are used they will refer to a representative sample of the proppant.

Generally, in the manufacture of PsDCs a polysilocarb batch is formed into a preform proppant. Depending upon the viscosity and other characteristics of the polysilocarb batch, and the intended shape of the proppant, the preform may be made by techniques such as extruding, molding, drawing, spinning, dripping, spraying, vibrating, polymer emulsion (emulsion polymerization, including micro-emulsion polymerization, capable of making a substantial range of sizes, e.g., from about 10 mesh to about 400 mesh, from about 20 mesh to about 200 mesh, from about 500 microns and less, from about 50 microns and less, from about 10 microns and less) and other techniques known to the arts to create small structures of a predetermined shape, and preferably in large volumes, preferably that are highly uniform and more preferably both. Further it is understood, that although it is presently preferred that the preform and the proppant be their approximate size and shape upon cure, or prior to pyrolysis, the polysilocarb batch can be cured into a puck like structure, e.g., roughly the size and shape of a hockey puck, a brick like structure or other larger volumetric shape. This larger shape can be cured, hard cured, and pyrolized, and broken down into smaller sizes (preferably after pyrolysis). This process of later breaking down, typically, although not necessarily, results in a proppant that is not of uniform or consistent shape, size and both.

The curing process may take place upon initial forming, if the preform is unrestrained, to make certain that the predetermined shape is locked, e.g., fixed or set, so that later handing of the preform will not change the shape. The curing process may be continuous, e.g., initial cure to hard cure occurs in one time period and process, or may take place in several stages, e.g., an initial cure for a set time period and temperature, a cure of a set time period and temperature, and a hard cure for a set time period and temperature. These cure stages may take place back-to-back with no intervening time periods or they may be staggered in time, with intervening time periods where the preform is maintained at ambient temperature, or where the preform is subjected to some other process. For example, an initial cure may be performed, a cure may then be performed, in which case the preform has the appearance of having a hard skin with gelatinous center, at which point the preform could be subjected to a shaping operation to get it into is final form, at which point the hard cure would be performed.

In general, and for example, for the purposes of making beads, or ball shaped proppants one or more of the process parameters and equipment set forth in table 3 can be used.

TABLE 3

| Nozzle | Thermal Heat Exchanger | Curing Process |
|---|---|---|
| Production of proppant beads thru the use of internal and external orifices, atomization mechanically, pressure, and gas to produce tight mesh distribution (within 1 to 5 mesh sizes of target size) beads ranging from 2000 micron to 75 micron. | Temperature range 0 to 1600 C. multi zone/range controlled | Temperature range 0 to 1600 C. multi zone/range controlled (manually or automated - local or remote) |
| Produced thru the use of a temperature compensated (liquid, air, gas, radiant, or mechanical) controllable one or more active orifices or filament, (vibration, heat, pressure, pulsation, 20 Hz to 20,000 Hz frequency) | Air, Steam, Electrical, Gas, Waste Heat, or Solar source of heat | Phased curing process in part or whole |
| Orifices or filament material; made from metal, composite, plastic, precious metal, jewel, or ceramic, | Material of Construction—metallic, composite, fire brick, or ceramic | Air or inert gas controlled atmosphere |
| Gravity or pressure compensated orifices or filament | Radiant, convection, direct heat, | Air, Steam, Electrical, Gas, Waste Heat, or Solar source of heat |
| Continuous operation and flow; or batch process | Vertical to horizontal orientations | Heat transferring media of air, inert gas, radiant, convection, condensing, vapor, o direct heat |
| Viscosity range 1 to 1000 | Up to and including Adiabatic enabled | Multi Chambered or portioned |
| Static and dynamic particle processing | 1' to 500' Structure Height Multi Chambered or portioned Heat transferring media of air, inert gas, radiant, convective, condensing, vapor or direct heat Static and dynamic particle processing | Continuous and batch Static and dynamic particle processing |

Figure 9:
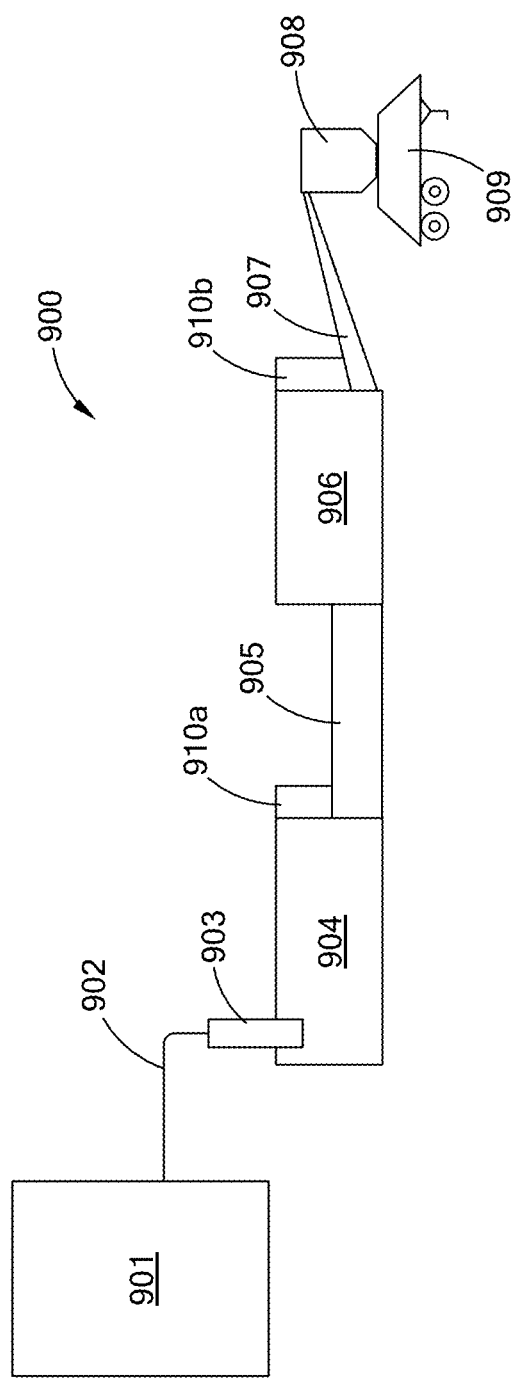
FIG. 9 is a schematic diagram and flow chart for an embodiment of a process for making embodiments of PsDC proppants in accordance with the present inventions.

Turning to FIG. 9 there is provided a schematic flow diagram of an embodiment of a proppant preform forming and curing system 900. The system 900 has a precursor batch preparation system 901, which is used to blend, mix, catalyze, or other preparation steps that may be performed to prepare the precursor batch for forming and curing. These preparation steps and systems are taught and disclosed in U.S. patent application Ser. No. 14/268,150, the entire disclosure of which is incorporated herein by reference. A transfer line 902 transfers the precursor batch to a formation device 903, which forms the precursor batch into a shape of the proppant. The shaped precursor is then cured in curing device 904 to a preform, or preform proppant. (It should be noted that preparation steps may occur along the transfer line 902, and at the formation device 903.) The cured preformed proppants are then transferred by transfer device 905 (which may not be present, could be a continuous system such as a conveyor system, or air pressure transfer system, a batch system, including hand pushed bins) to the pyrolysis device 906. In the pyrolysis device 906 the preform proppants are pyrolized to from a ceramic, e.g. the PsDC proppants. The pyrolysis may be continuous, semi-continuous, or batch. It may take place in an inert atmosphere, an inert reduced pressure atmosphere, a vacuum, air, a flowing inert atmosphere, a flowing reduced pressure atmosphere, and combinations and variations of these. Post cure processing station 910a and post pyrolysis processing station 910b may be used to perform steps such as sorting, filtering, sieving, inspecting, washing, drying, treating, coating, and combinations of these and other post processing steps. Transfer device 907 transfers the finished proppants to a storage and delivery station 908, where the finished proppant can be transferred into shipping devices 909, e.g. a truck, container, barge or rail car.

In general, preferred embodiments of the synthetic proppants of the present inventions are made from unique and novel silicon (Si) based materials that are easy to manufacture, handle and have surprising and unexpected properties and applications. These silicon based materials go against the general trends of the art of silicon chemistry and uses. Generally, the art of silicon chemistry, and in particular organosilicon chemistry, has moved toward greater and greater complexity in the functional groups that are appended to, and a part of, a silicon based polymeric backbone. Similarly, in general, the processes that are utilized to make these polymers have moved toward greater and greater complexity. Embodiments of the present new material systems for use as proppants move away from this trend, by preferably functionalizing a silicon based polymeric backbone with simpler structures, such as phenyl, phenylethyl and smaller groups, and do so with processes that are simplified, e.g., solvent free, reduced solvent, lower cost starting materials, fewer steps, and reduction of reaction intermediates.

Further, and generally, the art views silicones as tacky, soft or liquid materials that are used with, on, or in conjunction with, other materials to enhance or provide a performance feature to those other materials. Silicon based materials generally are not viewed as stand alone products, primary products, or structural elements. The preferred silicon based materials for use as proppants, however, move away from this trend and understanding in the art. These silicon based materials provide materials that are exceptionally strong, and can function as stand alone products and composites, among other things.

Generally, preferred embodiments of the synthetic proppants of the present inventions are directed to polymer derived ceramics (PDC), and more preferably toward "polysilocarb" materials, e.g., material containing silicon (Si), oxygen (O) and carbon (C), and materials that have been pyrolized from such materials. Polysilocarb materials may also contain other elements. Polysilocarb materials are made from one or more polysilocarb precursor formulation or precursor formulation. The polysilocarb precursor formulation contains one or more functionalized silicon polymers, or monomers, as well as, potentially other ingredients, such as for example, inhibitors, catalysts, pore formers, fillers, reinforcers, fibers, particles, colorants, pigments, dies, polymer derived ceramics ("PDC"), ceramics, metals, metal complexes, and combinations and variations of these and other materials and additives.

The precursor batch may also contain non-silicon based cross linking agents, that are intended to, provide, the capability to cross-link during curing. For example, cross linking agents that can be used include DCPD—dicylcopentadiene, 1,4 butadiene, divnylbenzene, Isoprene, norbornadiene, propadiene, 4-vinylcyclohexene, 2-3 heptadiene 1, 3 butadiene and cyclooctadiene. Generally, any hydrocarbon that contains two (or more) unsaturated, C=C bonds that can react with a Si—H, Si—OH, or other Si bond in a precursor, can be used as a cross linking agent. Some organic materials containing oxygen, nitrogen, and sulphur may also function as cross linking moieties.

The polysilocarb precursor formulation is then cured to form a solid or semi-sold material, e.g., a plastic. The polysilocarb precursor formulation may be processed through an initial cure, to provide a partially cured material, which may also be referred to, for example, as a preform, green material, or green cure (not implying anything about the material's color). The green material may then be further cured. Thus, one or more curing steps may be used. The material may be "end cured," i.e., being cured to that point at which the material has the necessary physical strength and other properties for its intended purpose. The amount of curing may be to a final cure (or "hard cure"), i.e., that point at which all, or essentially all, of the chemical reaction has stopped (as measured, for example, by the absence of reactive groups in the material, or the leveling off of the decrease in reactive groups over time). Thus, the material may be cured to varying degrees, depending upon its intended use and purpose. For example, in some situations the end cure and the hard cure may be the same.

The curing may be done at standard ambient temperature and pressure ("SATP", 1 atmosphere, 25° C.), at temperatures above or below that temperature, at pressures above or below that pressure, and over varying time periods (both continuous and cycled, e.g., heating followed by cooling and reheating), from less than a minute, to minutes, to hours, to days (or potentially longer), and in air, in liquid, or in a preselected atmosphere, e.g., Argon (Ar) or nitrogen ($N_2$).

The polysilocarb precursor formulations can be made into non-reinforced, non-filled, composite, reinforced, and filled structures, intermediates and end products, and combinations and variations of these and other types of materials. Further, these structures, intermediates and end products can be cured (e.g., green cured, end cured, or hard cured), uncured, pyrolized to a ceramic, and combinations and variations of these (e.g., a cured material may be filled with pyrolized beads derived from the same polysilocarb as the cured material).

The precursor formulations may be used to form "neat" materials, (by "neat" material it is meant that all, and essentially all of the structure is made from the precursor material or unfilled formulation; and thus, there are no fillers or reinforcements). They may be used to form composite materials, e.g., reinforced products. They may be used to form non-reinforced materials, which are materials that are made of primarily, essentially, and preferably only from the precursor materials.

In making the polysilocarb precursor formulation into a volumetric shape or structure, the polysilocarb formulation can be, for example, sprayed, spray dried, emulsified, polymer emulsification, polymer micro-emulsification, thermally sprayed, molded, flowed, formed, extruded, spun, dropped, injected or otherwise manipulated into essentially any volumetric shape, including the shapes for the proppant, and combinations and variations of these. These volumetric shapes would include, for example, spheres, pellets, rings, lenses, disks, panels, cones, frustoconical shapes, squares, rectangles, trusses, angles, channels, hollow sealed chambers, hollow spheres, blocks, sheets, coatings, films, skins, particulates, beams, rods, angles, columns, fibers, staple fibers, tubes, cups, pipes, and combinations and various of these and other more complex shapes, both engineering and architectural. Additionally, they may be shaped into preforms, or preliminary shapes that correspond to, or with, a final product, such as for example use in or with, a break pad, a clutch plate, a break shoe, a motor, high temperature parts of a motor, a diesel motor, rocket components, turbine components, air plane components, space vehicle components, building materials, shipping container components, and other structures or components.

The polysilocarb precursor formulations may be used with reinforcing materials to form a composite material. Thus, for example, the formulation may be flowed into, impregnated into, absorbed by or otherwise combined with a reinforcing material, such as carbon fibers, glass fiber, woven fabric, non-woven fabric, copped fibers, fibers, rope, braided structures, ceramic powders, glass powders, carbon powders, graphite powders, ceramic fibers, metal powders, carbide pellets or components, staple fibers, tow, nanostructures of the above, PDCs, any other material that meets the temperature requirements of the process and end product, and combinations and variations of these. Thus, for example, the reinforcing materials may be any of the high temperature resistant reinforcing materials currently used, or capable of being used with, existing plastics and ceramic composite materials. Additionally, because the polysilocarb precursor formulation may be formulated for a lower temperature cure (e.g., SATP) or a cure temperature of for example about 100° F. to about 400° F., the reinforcing material may be polymers, organic polymers, such as nylons, polypropylene, and polyethylene, as well as aramid fibers, such as NOMEX or KEVLAR.

The reinforcing material may also be made from, or derived from the same material as the formulation that has been formed into a fiber and pyrolized into a ceramic, or it may be made from a different precursor formulation material, which has been formed into a fiber and pyrolized into a ceramic. In addition to ceramic fibers derived from the precursor formulation materials that may be used as reinforcing material, other porous, substantially porous, and non-porous ceramic structures derived from a precursor formulation material may be used.

The polysilocarb precursor formulation may be used to form a filled material. A filled material would be any material having other solid, or semi-solid, materials added to the polysilocarb precursor formulation. The filler material may be selected to provide certain features to the cured product, the ceramic product or both. These features may relate to or be aesthetic, tactile, thermal, density, radiation, chemical, magnetic, electric, and combinations and variations of these and other features. These features may be in addition to strength. Thus, the filler material may not affect the strength of the cured or ceramic material, it may add strength, or could even reduce strength in some situations. The filler material could impart color, magnetic capabilities, fire resistances, flame retardance, heat resistance, electrical conductivity, anti-static, optical properties (e.g., reflectivity, refractivity and iridescence), aesthetic properties (such as stone like appearance in building products), chemical resistivity, corrosion resistance, wear resistance, abrasions resistance, thermal insulation, UV stability, UV protective, and other features that may be desirable, necessary, and both, in the end product or material. Thus, filler materials could include copper lead wires, thermal conductive fillers, electrically conductive fillers, lead, optical fibers, ceramic colorants, pigments, oxides, dyes, powders, ceramic fines, PDC particles, pore-formers, carbosilanes, silanes, silazanes, silicon carbide, carbosilazanes, siloxane, powders, ceramic powders, metals, metal complexes, carbon, tow, fibers, staple fibers, boron containing materials, milled fibers, glass, glass fiber, fiber glass, and nanostructures (including nanostructures of the forgoing) to name a few.

The fill material may also be made from, or derived from the same material as the formulation that has been formed into a cured or pyrolized solid, or it may be made from a different precursor formulation material, which has been formed into a cured solid or semi-solid, or pyrolized solid.

The polysilocarb formulation and products derived or made from that formulation may have metals and metal complexes. Thus, metals as oxides, carbides or silicides can be introduced into precursor formulations, and thus into a silica matrix in a controlled fashion. Thus, using organometallic, metal halide (chloride, bromide, iodide), metal alkoxide and metal amide compounds of transition metals and then copolymerizing in the silica matrix, through incorporation into a precursor formulation is contemplated.

For example, Cyclopentadienyl compounds of the transition metals can be utilized. Cyclopentadienyl compounds of the transition metals can be organized into two classes: Bis-cyclopentadienyl complexes; and Mono-cyclopentadienyl complexes. Cyclopentadienyl complexes can include $C_5H_5$, $C_5Me_5$, $C_5H_4Me$, $CH_5R_5$ (where R=Me, Et, Propyl, i-Propyl, butyl, Isobutyl, Sec-butyl). In either of these cases Si can be directly bonded to the Cyclopentadienyl ligand or the Si center can be attached to an alkyl chain, which in turn is attached to the Cyclopentadienyl ligand.

Cyclopentadienyl complexes, that can be utilized with precursor formulations and in products, can include: bis-cyclopentadienyl metal complexes of first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum); Lanthanide series (La, Ce, Pr, Nd, Pm, Sm, Eu, Gd, Tb, Dy, Ho); Actinide series (Ac, Th, Pa, U, Np).

Monocyclopentadienyl complexes may also be utilized to provide metal functionality to precursor formulations and would include monocyclopentadienyl complexes of: first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum) when preferably stabilized with proper ligands, (for instance Chloride or Carbonyl).

Alky complexes of metals may also be used to provide metal functionality to precursor formulations and products. In these alkyl complexes the Si center has an alkyl group (ethyl, propyl, butyl, vinyl, propenyl, butenyl) which can bond to transition metal direct through a sigma bond. Further, this would be more common with later transition metals such as Pd, Rh, Pt, Ir.

Coordination complexes of metals may also be used to provide metal functionality to precursor formulations and products. In these coordination complexes the Si center has an unsaturated alkyl group (vinyl, propenyl, butenyl, acetylene, butadienyl) which can bond to carbonyl complexes or ene complexes of Cr, Mo, W, Mn, Re, Fe, Ru, Os, Co, Rh, Ir, Ni. The Si center may also be attached to a phenyl, substituted phenyl or other aryl compound (pyridine, pyrimidine) and the phenyl or aryl group can displace carbonyls on the metal centers.

Metal alkoxides may also be used to provide metal functionality to precursor formulations and products. Metal alkoxide compounds can be mixed with the Silicon precursor compounds and then treated with water to form the oxides at the same time as the polymer, copolymerize. This can also be done with metal halides and metal amides. Preferably, this may be done using early transition metals along with Aluminum, Gallium and Indium, later transition metals: Fe, Mn, Cu, and alkaline earth metals: Ca, Sr, Ba, Mg.

Compounds where Si is directly bonded to a metal center which is stabilized by halide or organic groups may also be utilized to provide metal functionality to precursor formulations and products.

Additionally, it should be understood that the metal and metal complexes may be the continuous phase after pyrolysis, or subsequent heat treatment. Formulations can be specifically designed to react with selected metals to in situ form metal carbides, oxides and other metal compounds, generally known as cermets (e.g., ceramic metallic compounds). The formulations can be reacted with selected metals to form in situ compounds such as mullite, alumino silicate, and others. The amount of metal relative to the amount of silica in the formulation or end product can be from about 0.1 mole % to 99.9 mole %, about 1 mole % or greater, about 10 mole % or greater, about 20 mole percent or greater % and greater. The forgoing use of metals with the present precursor formulas can be used to control and provide predetermined stoichiometries.

Filled materials would include reinforced materials. In many cases, cured, as well as pyrolized polysilocarb filled materials can be viewed as composite materials. Generally, under this view, the polysilocarb would constitute the bulk or matrix phase, (e.g., a continuous, or substantially continuous phase), and the filler would constitute the dispersed (e.g., non-continuous), phase.

It should be noted, however, that by referring to a material as "filled" or "reinforced" it does not imply that the majority (either by weight, volume, or both) of that material is the polysilcocarb. Thus, generally, the ratio (either weight or volume) of polysilocarb to filler material could be from about 0.1:99.9 to 99.9:0.1. Smaller amounts of filler material or polysilocarb could also be present or utilized, but would more typically be viewed as an additive or referred to in other manners. Thus, the terms composite, filled material, polysilocarb filled materials, reinforced materials, polysilocarb reinforced materials, polysilocarb filled materials, polysilocarb reinforced materials and similar such terms should be viewed as non-limiting as to amounts and ratios of the material's constitutes, and thus in this context, be given their broadest possible meaning.

The polysilocarb precursor formulation may be specifically formulated to cure under conditions (e.g., temperature, and perhaps time) that match, e.g., are predetermined to match, the properties of the reinforcing material, filler material or substrate. These materials may also be made from, or derived from, the same material as the polysilocarb precursor formulation that is used as the matrix, or it may be made from a different polysilocarb precursor formulation. In addition to ceramic fibers derived from the polysilocarb precursor formulation materials, porous, substantially porous, and non-porous ceramic structures derived from a polysilocarb precursor formulation material may be used as filler or reinforcing material.

The polysilocarb precursor formulations may be used to coat or impregnate a woven or non-woven fabric, made from for example carbon fiber, glass fibers or fibers made from a polysilocarb precursor formulation (the same or different formulation), to from a prepreg material. Further, a polysilocarb precursor formulation may be used as an interface coating on the reinforcing material, for use either with a polysilocarb precursor formulation as the matrix material. Further, carbon fiber may be heat treated to about 1,400° to about 1,800° or higher, which creates a surface feature that eliminates the need for a separate interface coating, for use with polysilocarb precursor formulations.

Fillers can reduce the amount of shrinkage that occurs during the processing of the formulation into a ceramic, they can be used to provide a predetermined density of the product, either reducing or increasing density, and can be used to provide other customized and predetermined product and processing features. Fillers, at larger amounts, e.g., greater than 10%, can have the effect of reducing shrinkage during cure.

Depending upon the particular application, product or end use, the filler can be evenly distributed in the precursor formulation, unevenly distributed, a predetermined rate of settling, and can have different amounts in different formulations, which can then be formed into a product having a predetermined amounts of filler in predetermined areas, e.g., striated layers having different filler concentration.

Preferably, for a typical filled product, the filler is substantially evenly distributed and more preferably evenly distributed within the end product. In this manner localize stresses or weak points can be avoided. Generally, for a non-reinforced material each filler particle may have a volume that is less than about 0.3%, less than about 0.2%, less than about 0.1%, and less than about 0.05% of the volume of a product, intermediate or proppant. For example, if the product is spherical in shape and the filler is spherical in shape the diameter of the filler should preferable be about 1/10 to about 1/20 of the diameter of the proppant particle, and more preferably the filler diameter should be less than about 1/20 of the diameter of the proppant particle. Generally, the relative amount of filler used in a material should preferable be about 30% to about 65% of the volume of the sphere, e.g., volume %.

Generally, when a small particulate filler, e.g., fines, beads, pellets, is used for the purposes of increasing strength, without the presence of fibers, fabric, etc., generally at least about 2% to at least about 5 volume %, can show an increase in the strength, although this may be greater or smaller depending upon other factors, such as the shape and volume of the product, later processing conditions, e.g., cure time, temperature, number of pyrolysis reinfiltrations. Generally, as the filler level increases from about above 5 volume % no further strength benefits may be realized. Such small particulate filled products, in which appreciable strength benefits are obtained from the filler, and in particular an increase in strength of at least about 5%, at last about 10% and preferably at least about 20% would be considered to be reinforced products and materials.

At various points during the manufacturing process, the polysilocarb structures, intermediates and end products, and combinations and variations of these, may be machined, milled, molded, shaped, broken, drilled or otherwise mechanically processed and shaped.

The precursor formulations are preferably clear or are essentially colorless and generally transmissive to light in the visible wavelengths. They may, depending upon the formulation have a turbid, milky or clouding appearance. They may also have color bodies, pigments or colorants, as well as color filler (which can survive pyrolysis, for ceramic end products, such as those used in ceramic pottery glazes). The precursor may also have a yellow or amber color or tint, without the need of the addition of a colorant.

The precursor formulations may be packaged, shipped and stored for later use in forming products, e.g., proppants, or they may be used directly in these processes, e.g., continuous process to make a proppant. Thus, a precursor formulation may be stored in 55 gallon drums, tank trucks, rail tack cars, onsite storage tanks having the capable of holding hundreds of gals, and shipping totes holding 1,000 liters, by way of example. Additionally, in manufacturing process the formulations may be made and used in a continuous, and semi-continuous processes.

The present inventions, among other things, provide substantial flexibility in designing processes, systems, ceramics, having processing properties and end product performance features to meet predetermined and specific performance criteria. Thus, for example the viscosity of the precursor formulation may be predetermined by the formulation to match a particular morphology of the reinforcing material, the cure temperature of the precursor formulation may be predetermined by the formulation to enable a prepreg to have an extended shelf life. The viscosity of the of the precursor formulation may be established so that the precursor readily flows into the processing head, e.g., a sonic nozzle. The formulation of the precursor formulation may also, for example, be such that the strength of a cured preform is sufficient to allow rough or initial processing of the preform, prior to pyrolysis, e.g., breaking up of a puck to provide small, e.g., about 10 mm diameters to about 10 micron diameters, and potentially smaller to the micron and submicron diameter size.

Custom and predetermined control of when chemical reactions occur in the various stages of the process from raw material to final end product can provide for reduced costs, increased process control, increased reliability, increased efficiency, enhanced product features, and combinations and variation of these and other benefits. The sequencing of when chemical reactions take place can be based primarily upon the processing or making of precursors, and the processing or making of precursor formulations; and may also be based upon cure and pyrolysis conditions. Further, the custom and predetermined selection of these steps, formulations and conditions, can provide enhanced product and processing features through chemical reactions, molecular arrangements and rearrangements, and microstructure arrangements and rearrangements, that preferably have been predetermined and controlled.

It should be understood that the use of headings in this specification is for the purpose of clarity, and are not limiting in any way. Thus, the processes and disclosures described under a heading should be read in context with the entirely of this specification, including the various examples. The use of headings in this specification should not limit the scope of protection afford the present inventions.

Generally, the process form making the present polysilocarb materials involves one or more steps. The starting materials are obtained, made or derived. Precursors are obtained or can be made from starting materials. The precursors are combined to form a precursor formulation. The precursor formulation is then shaped, dropped, extruded, sprayed, formed, molded, etc. into a desired form, which form is then cured, which among other things transforms the precursor formulation into a plastic like material. This cured plastic like material can then be pyrolyzed into a ceramic. It being understood, that these steps may not all be used, that some of these steps may be repeated, once, twice or several times, and that combinations and variations of these general steps may be utilized to obtain a desired product or result.

Processes for Obtaining a Polysilocarb Precursor Formulation

Polysilocarb precursor formulations can generally be made using two types of processes, although other processes and variations of these types of processes may be utilized. These processes generally involve combining precursors to form a polysilocarb precursor formulation. One type of process generally involves the mixing together of precursor materials in preferably a solvent free process with essentially no chemical reactions taking place, e.g., "the mixing process." The other type of process generally involves chemical reactions to form specific, e.g., custom, polysilocarb precursor formulations, which could be monomers, dimers, trimers and polymers. Generally, in the mixing process essentially all, and preferably all, of the chemical reactions take place during subsequent processing, such as during curing, pyrolysis and both. It should be understood that these terms—reaction type process and the mixing type process—are used for convenience, e.g., a short hand reference, and should not be viewed as limiting. Further, it should be understood that combinations and variations of these two processes may be used in reaching a precursor formulation, and in reaching intermediate, end and final products. Depending upon the specific process and desired features of the product the precursors and starting materials for one process type can be used in the other. These processes provide great flexibility to create custom features for intermediate, end and final products, and thus, typically, either process type, and combinations of them, can provide a specific predetermined product. In selecting which type of process is preferable factors such as cost, controllability, shelf life, scale up, manufacturing ease, etc., can be considered.

The two process types are described in this specification, among other places, under their respective headings. It should be understood that the teachings for one process, under one heading, and the teachings for the other process, under the other heading, can be applicable to each other, as well as, being applicable to other sections and teachings in this specification, and vice versa. The starting or precursor materials for one type of process may be used in the other type of process. Further, it should be understood that the processes described under these headings should be read in context with the entirely of this specification, including the various examples. Thus, the use of headings in this specification should not limit the scope of protection afford the present inventions.

Additionally, the formulations from the mixing type process may be used as a precursor, or component in the reaction type process. Similarly, a formulation from the reaction type process may be used in the mixing type process. Thus, and preferably, the optimum performance and features from either process can be combined and utilized to provide a cost effective and efficient process and end product.

In addition to being commercially available the precursors may be made by way of an alkoxylation type, e.g., ethoxylation process. In this process chlorosilanes are reacted with ethanol in the presences of a catalysis, e.g., HCl, to provide the precursor materials, which materials may further be reacted to provide longer chain precursors. Other alcohols, e.g., Methanol may also be used. Thus, the compounds the formulas of FIGS. 60A to 60F are reacted with ethanol (C—C—OH) to form the precursors of FIGS. 46-59. In some of these reactions phenols may be the source of the phenyl group, which is substitute for a hydride group that has been placed on the silicon. One, two or more step reaction may need to take place.

The Mixing Type Process

Precursor materials may be methyl hydrogen, and substituted and modified methyl hydrogens, siloxane backbone additives, reactive monomers, reaction products of a siloxane backbone additive with a silane modifier or an organic modifier, and other similar types of materials, such as silane based materials, silazane based materials, carbosilane based materials, phenol/formaldehyde based materials, and combinations and variations of these. The precursors are preferably liquids at room temperature, although they may be solids that are melted, or that are soluble in one of the other precursors. (In this situation, however, it should be understood that when one precursor dissolves another, it is nevertheless not considered to be a "solvent" as that term is used with respect to the prior art processes that employ non-constituent solvents, e.g., solvents that do not form a part or component of the end product, are treated as waste products, and both.)

The precursors are mixed together in a vessel, preferably at room temperature. Preferably, little, and more preferably no solvents, e.g., water, organic solvents, polar solvents, non-polar solvents, hexane, THF, toluene, are added to this mixture of precursor materials. Preferably, each precursor material is miscible with the others, e.g., they can be mixed at any relative amounts, or in any proportions, and will not separate or precipitate. At this point the "precursor mixture" or "polysilocarb precursor formulation" is compete (noting that if only a single precursor is used the material would simply be a "polysilocarb precursor" or a "polysilocarb precursor formulation"). Although complete, fillers and reinforcers may be added to the formulation. In preferred embodiments of the formulation, essentially no, and more preferably no chemical reactions, e.g., crosslinking or polymerization, takes place within the formulation, when the formulation is mixed, or when the formulation is being held in a vessel, on a prepreg, or other time period, prior to being cured.

Additionally, inhibitors such as cyclohexane, 1-Ethynyl-1-cyclohexanol (which may be obtained from ALDRICH), Octamethylcyclotetrasiloxane, tetramethyltetravinylcyclotetrasiloxane (which may act, depending upon amount and temperature as a reactant or a reactant retardant (i.e., slows down a reaction to increase pot life), e.g., at room temperature it is a retardant and at elevated temperatures it is a reactant), may be added to the polysilocarb precursor formulation, e.g., an inhibited polysilocarb precursor formulation. Other materials, as well, may be added to the polysilocarb precursor formulation, e.g., a filled polysilocarb precursor formulation, at this point in processing, including fillers such as SiC powder, PDC particles, pigments, particles, nano-tubes, whiskers, or other materials, discussed in this specification or otherwise known to the arts. Further, a formulation with both inhibitors and fillers would be considered an inhibited, filled polysilocarb precursor formulation.

Depending upon the particular precursors and their relative amounts in the polysilocarb precursor formulation, polysilocarb precursor formulations may have shelf lives at room temperature of greater than 12 hours, greater than 1 day, greater than 1 week, greater than 1 month, and for years or more. These precursor formulations may have shelf lives at high temperatures, for example, at about 90° F., of greater than 12 hours, greater than 1 day, greater than 1 week, greater than 1 month, and for years or more. The use of inhibitors may further extend the shelf life in time, for higher temperatures, and combinations and variations of these. As used herein the term "shelf life" should be given its broadest possible meaning unless specified otherwise, and would include the formulation being capable of being used for its intended purpose, or performing, e.g., functioning, for its intended use, at 100% percent as well as a freshly made formulation, at least about 90% as well as a freshly made formulation, at least about 80% as well as a freshly made formulation, and at about 70% as well as a freshly made formulation.

Precursors and precursor formulations are preferably nonhazardous materials. They have flash points that are preferably above about 70° C., above about 80° C., above about 100° C. and above about 300° C., and above. They may be noncorrosive. They may have as low vapor pressure, may have low or no odor, and may be non- or mildly irritating to the skin.

A catalyst may be used, and can be added at the time of, prior to, shortly before, or at an earlier time before the precursor formulation is formed or made into a structure, prior to curing. The catalysis assists in, advances, promotes the curing of the precursor formulation to form a preform.

The time period where the precursor formulation remains useful for curing after the catalysis is added is referred to as "pot life", e.g., how long can the catalyzed formulation remain in its holding vessel before it should be used. Depending upon the particular formulation, whether an inhibitor is being used, and if so the amount being used, storage conditions, e.g., temperature, and potentially other factors, precursor formulations can have pot lives, for example of from about 5 minutes to about 10 days, about 1 day to about 6 days, about 4 to 5 days, about 1 hour to about 24 hours, and about 12 hours to about 24 hours.

The catalysis can be any platinum (Pt) based catalyst, which can for example be diluted to a range from: 1 part per million Pt to 200 parts per million (ppm) and preferably in the 5 ppm to 50 ppm range. It can be a peroxide based catalyst with a 10 hour half life above 90 C at a concentration of between 0.5% and 2%. It can be an organic based peroxide. It can be any organometallic catalyst capable of reacting with Si—H bond, Si—OH bonds, or unsaturated carbon bonds, these catalyst may include: dibutyltin dilaurate, zinc octoate, and titanium organometallic compounds. Combinations and variations of these and other catalysts may be used. Such catalysts may be obtained from ARKEMA under the trade name LUPEROX, e.g., LUPEROX 231.

Further, custom and specific combinations of these and other catalysts may be used, such that they are matched to specific formulation formulations, and in this way selectively and specifically catalyze the reaction of specific constituents. Custom and specific combinations of catalysts may be used, such that they are matched to specific formulation formulations, and in this way selectively and specifically catalyze the reaction of specific constituents at specific temperatures. Moreover, the use of these types of matched catalyst—formulations systems may be used to provide predetermined product features, such as for example, pore structures, porosity, densities, density profiles, and other morphologies of cured structures and ceramics.

In this mixing type process for making a precursor formulation, preferably chemical reactions or molecular rearrangements only take place during the making of the precursors, the curing process of the preform, and in the pyrolizing process. Thus, chemical reactions, e.g., polymerizations, reductions, condensations, substitutions, take place or are utilized in the making of a precursor. In making a polysilocarb precursor formulation preferably no and essentially no, chemical reactions and molecular rearrangements take place. These embodiments of the present mixing type process, which avoid the need to, and do not, utilize a polymerization or other reaction during the making of a precursor formulation, provides significant advantages over prior methods of making polymer derived ceramics. Preferably, in the embodiments of these mixing type of formulations and processes, polymerization, crosslinking or other chemical reactions take place primarily, preferably essentially, and more preferably solely in the preform during the curing process.

Figure 10:
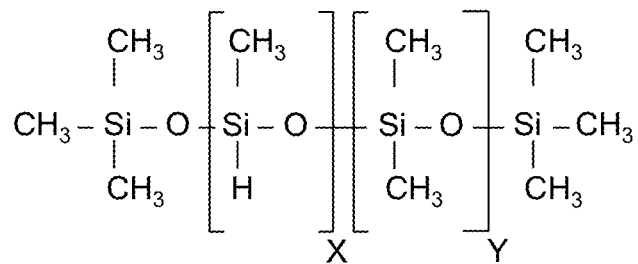
FIG. 10 is a chemical formula for an embodiment of a methyl terminated hydride substituted polysiloxane precursor material in accordance with the present inventions.

The precursor may be methyl hydrogen (MH), which formula is shown in FIG. 10. The MH may have a molecular weight (mw) may be from about 400 mw to about 10,000 mw, from about 600 mw to about 1,000 mw, and may have a viscosity preferably from about 20 cps to about 40 cps. The percentage of methylsiloxane units "X" may be from 1% to 100%. The percentage of the dimethylsiloxane units "Y" may be from 0% to 99%. This precursor may be used to provide the backbone of the cross-linked structures, as well as, other features and characteristics to the cured preform and ceramic material. Typically, methyl hydrogen fluid (MHF) has minimal amounts of "Y", and more preferably "Y" is for all practical purposes zero.

Figure 11:
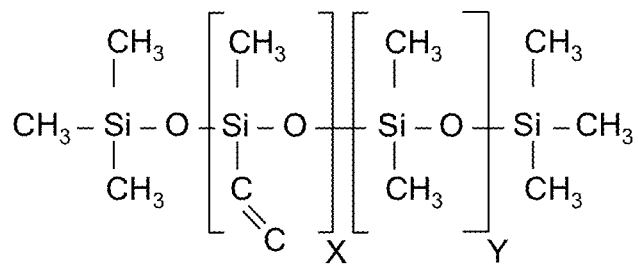
FIG. 11 is a chemical formula for an embodiment of a methyl terminated vinyl polysiloxane precursor material in accordance with the present inventions.

The precursor may be a siloxane backbone additive, such as vinyl substituted polydimethyl siloxane, which formula is shown in FIG. 11. This precursor may have a molecular weight (mw) may be from about 400 mw to about 10,000 mw, and may have a viscosity preferably from about 50 cps to about 2,000 cps. The percentage of methylvinylsiloxane units "X" may be from 1% to 100%. The percentage of the dimethylsiloxane units "Y" may be from 0% to 99%. Preferably, X is 100%. This precursor may be used to decrease cross-link density and improve toughness, as well as, other features and characteristics to the cured preform and ceramic material.

Figure 12:
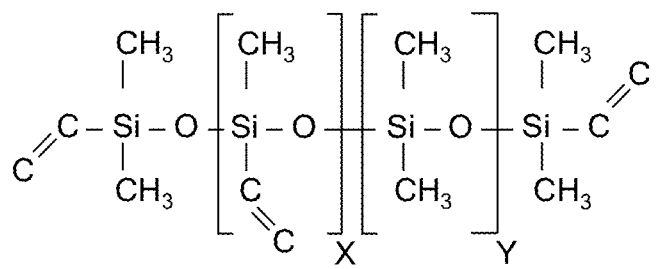
FIG. 12 is a chemical formula for an embodiment of a vinyl terminated vinyl polysiloxane precursor material in accordance with the present inventions.

The precursor may be a siloxane backbone additive, such as vinyl substituted and vinyl terminated polydimethyl siloxane, which formula is shown in FIG. 12. This precursor may have a molecular weight (mw) may be from about 500 mw to about 15,000 mw, and may preferably have a molecular weight from about 500 mw to 1,000 mw, and may have a viscosity preferably from about 10 cps to about 200 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

Figure 13:
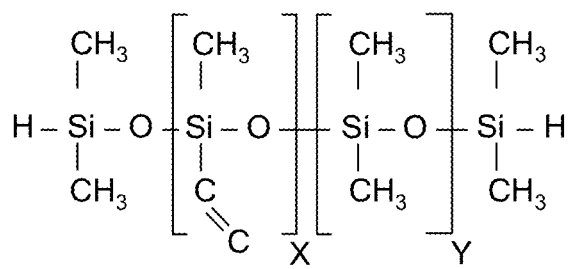
FIG. 13 is a chemical formula for an embodiment of a hydride terminated vinyl polysiloxane precursor material in accordance with the present inventions.

The precursor may be a siloxane backbone additive, such as vinyl substituted and hydrogen terminated polydimethyl siloxane, which formula is shown in FIG. 13. This precursor may have a molecular weight (mw) may be from about 300 mw to about 10,000 mw, and may preferably have a molecular weight from about 400 mw to 800 mw, and may have a viscosity preferably from about 20 cps to about 300 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

Figure 14:
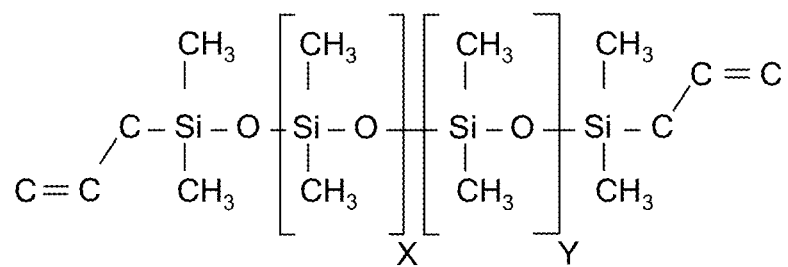
FIG. 14 is a chemical formula for an embodiment of an allyl terminated dimethyl polysiloxane precursor material in accordance with the present inventions.

The precursor may be a siloxane backbone additive, such as allyl terminated polydimethyl siloxane, which formula is shown in FIG. 14. This precursor may have a molecular weight (mw) may be from about 400 mw to about 10,000 mw, and may have a viscosity preferably from about 40 cps to about 400 cps. The repeating units are the same. This precursor may be used to provide UV curability and to extend the polymeric chain, as well as, other features and characteristics to the cured preform and ceramic material.

Figure 15:
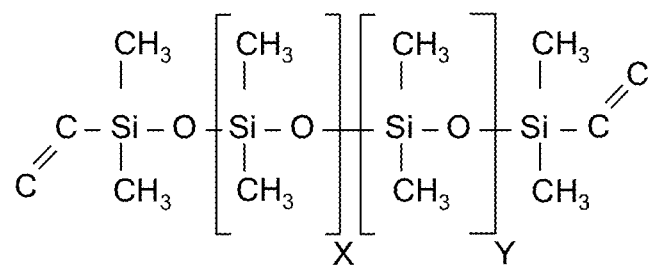
FIG. 15 is a chemical formula for an embodiment of a vinyl terminated dimethyl polysiloxane precursor material in accordance with the present inventions.

The precursor may be a siloxane backbone additive, such as vinyl terminated polydimethyl siloxane, which formula is shown in FIG. 15. This precursor may have a molecular weight (mw) may be from about 200 mw to about 5,000 mw, and may preferably have a molecular weight from about 400 mw to 1,500 mw, and may have a viscosity preferably from about 10 cps to about 400 cps. The repeating units are the same. This precursor may be used to provide a polymeric chain extender, improve toughness and to lower cure temperature down to for example room temperature curing, as well as, other features and characteristics to the cured preform and ceramic material.

Figure 16:
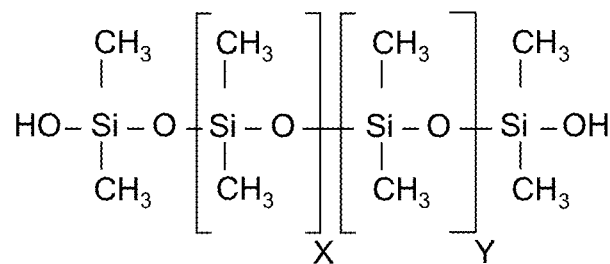
FIG. 16 is a chemical formula for an embodiment of a hydroxy terminated dimethyl polysiloxane precursor material in accordance with the present inventions.

The precursor may be a siloxane backbone additive, such as silanol (hydroxy) terminated polydimethyl siloxane, which formula is shown in FIG. 16. This precursor may have a molecular weight (mw) may be from about 400 mw to about 10,000 mw, and may preferably have a molecular weight from about 600 mw to 1,000 mw, and may have a viscosity preferably from about 30 cps to about 400 cps. The repeating units are the same. This precursor may be used to provide a polymeric chain extender, a toughening mechanism, can generate nano- and micro-scale porosity, and allows curing at room temperature, as well as other features and characteristics to the cured preform and ceramic material.

Figure 18:
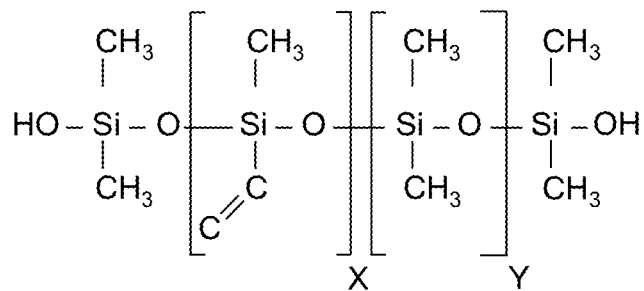
FIG. 18 is a chemical formula for an embodiment of a hydroxy terminated vinyl polysiloxane precursor material in accordance with the present inventions.

The precursor may be a siloxane backbone additive, such as silanol (hydroxy) terminated vinyl substituted dimethyl siloxane, which formula is shown in FIG. 18. This precursor may have a molecular weight (mw) may be from about 400 mw to about 10,000 mw, and may preferably have a molecular weight from about 600 mw to 1,000 mw, and may have a viscosity preferably from about 30 cps to about 400 cps. The percentage of methylvinylsiloxane units "X" may be from 1% to 100%. The percentage of the dimethylsiloxane units "Y" may be from 0% to 99%.

Figure 17:
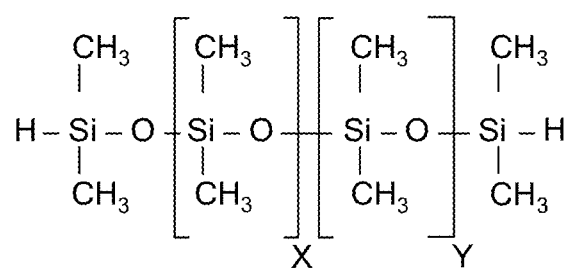
FIG. 17 is a chemical formula for an embodiment of a hydride terminated dimethyl polysiloxane precursor material in accordance with the present inventions.

The precursor may be a siloxane backbone additive, such as hydrogen (hydride) terminated polydimethyl siloxane, which formula is shown in FIG. 17. This precursor may have a molecular weight (mw) may be from about 200 mw to about 10,000 mw, and may preferably have a molecular weight from about 500 mw to 1,500 mw, and may have a viscosity preferably from about 20 cps to about 400 cps. The repeating units are the same. This precursor may be used to provide a polymeric chain extender, as a toughening agent, and it allows lower temperature curing, e.g., room temperature, as well as, other features and characteristics to the cured preform and ceramic material.

Figure 19:
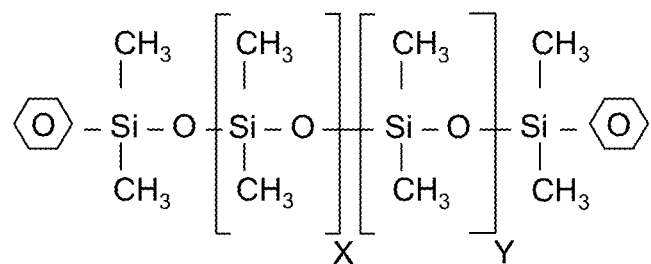
FIG. 19 is a chemical formula for an embodiment of a phenyl terminated dimethyl polysiloxane precursor material in accordance with the present inventions.

The precursor may be a siloxane backbone additive, such as phenyl terminated polydimethyl siloxane, which formula is shown in FIG. 19. This precursor may have a molecular weight (mw) may be from about 500 mw to about 2,000 mw, and may have a viscosity preferably from about 80 cps to about 300 cps. The repeating units are the same. This precursor may be used to provide a toughening agent, and to adjust the refractive index of the polymer to match the refractive index of various types of glass, to provide for example transparent fiberglass, as well as, other features and characteristics to the cured preform and ceramic material.

The precursor may be a siloxane backbone additive, such as methyl-phenyl terminated polydimethyl siloxane, which formula is shown in 20. This precursor may have a molecular weight (mw) may be from about 500 mw to about 2,000 mw, and may have a viscosity preferably from about 80 cps to about 300 cps. The repeating units are the same. This precursor may be used to provide a toughening agent and to adjust the refractive index of the polymer to match the refractive index of various types of glass, to provide for example transparent fiberglass, as well as other features and characteristics to the cured preform and ceramic material.

Figure 20:
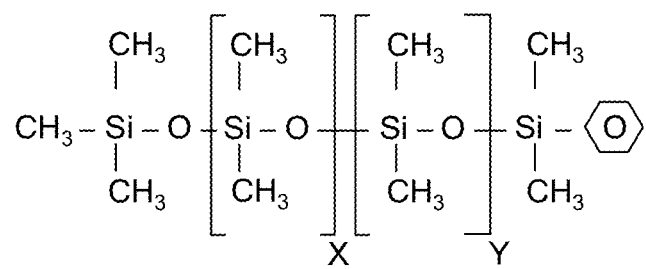
FIG. 20 is a chemical formula for an embodiment of a phenyl and methyl terminated dimethyl polysiloxane precursor material in accordance with the present inventions.
Figure 21:
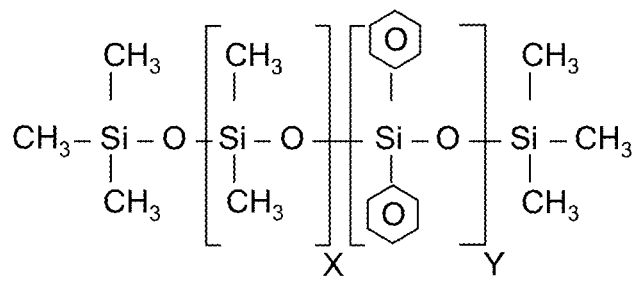
FIG. 21 is a chemical formula for an embodiment of a methyl terminated dimethyl diphenyl polysiloxane precursor material in accordance with the present inventions.

The precursor may be a siloxane backbone additive, such as diphenyl dimethyl polysiloxane, which formula is shown in FIG. 21. This precursor may have a molecular weight (mw) may be from about 500 mw to about 20,000 mw, and may have a molecular weight from about 800 to about 4,000, and may have a viscosity preferably from about 100 cps to about 800 cps. The percentage of dimethylsiloxane units "X" may be from 25% to 95%. The percentage of the diphenyl siloxane units "Y" may be from 5% to 75%. This precursor may be used to provide similar characteristics to the precursor of FIG. 20, as well as, other features and characteristics to the cured preform and ceramic material.

Figure 22:
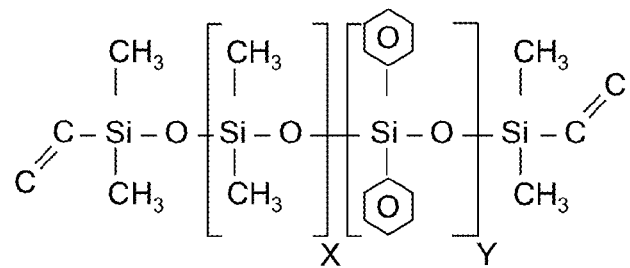
FIG. 22 is a chemical formula for an embodiment of a vinyl terminated dimethyl diphenyl polysiloxane precursor material in accordance with the present inventions.

The precursor may be a siloxane backbone additive, such as vinyl terminated diphenyl dimethyl polysiloxane, which formula is shown in FIG. 22. This precursor may have a molecular weight (mw) may be from about 400 mw to about 20,000 mw, and may have a molecular weight from about 800 to about 2,000, and may have a viscosity preferably from about 80 cps to about 600 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, as well as, other features and characteristics to the cured preform and ceramic material.

Figure 23:
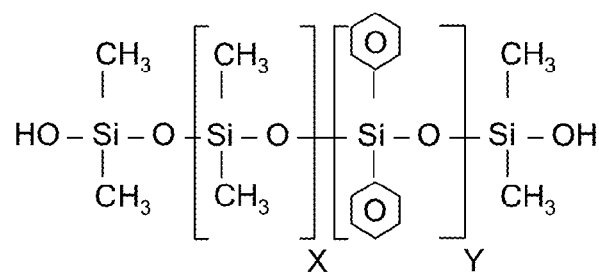
FIG. 23 is a chemical formula for an embodiment of a hydroxy terminated dimethyl diphenyl polysiloxane precursor material in accordance with the present inventions.

The precursor may be a siloxane backbone additive, such as hydroxy terminated diphenyl dimethyl polysiloxane, which formula is shown in FIG. 23. This precursor may have a molecular weight (mw) may be from about 400 mw to about 20,000 mw, and may have a molecular weight from about 800 to about 2,000, and may have a viscosity preferably from about 80 cps to about 400 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, can generate nano- and micro-scale porosity, as well as other features and characteristics to the cured preform and ceramic material.

Figure 24:
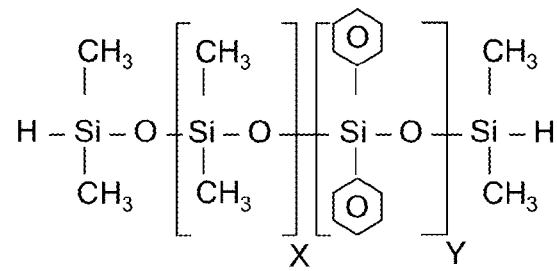
FIG. 24 is a chemical formula for an embodiment of a hydride terminated dimethyl diphenyl polysiloxane precursor material in accordance with the present inventions.

The precursor may be a siloxane backbone additive, such as hydride terminated diphenyl dimethyl polysiloxane, which formula is shown in FIG. 24. This precursor may have a molecular weight (mw) may be from about 400 mw to about 20,000 mw, and may have a molecular weight from about 800 to about 2,000, and may have a viscosity preferably from about 60 cps to about 300 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, as well as, other features and characteristics to the cured preform and ceramic material.

Figure 25:
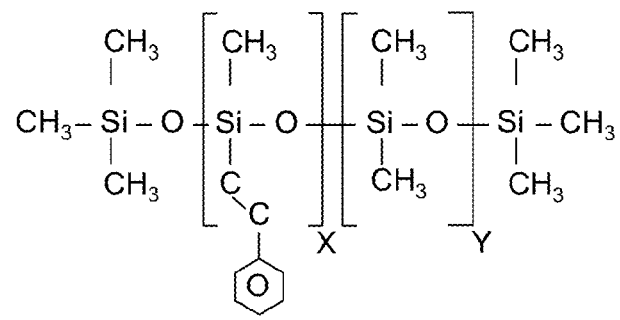
FIG. 25 is a chemical formula for an embodiment of a methyl terminated phenylethyl polysiloxane precursor material in accordance with the present inventions.

The precursor may be a siloxane backbone additive, such as styrene vinyl benzene dimethyl polysiloxane, which formula is shown in FIG. 25. This precursor may have a molecular weight (mw) may be from about 800 mw to at least about 10,000 mw to at least about 20,000 mw, and may have a viscosity preferably from about 50 cps to about 350 cps. The percentage of styrene vinyl benzene siloxane units "X" may be from 1% to 60%. The percentage of the dimethylsiloxane units "Y" may be from 40% to 99%. This precursor may be used to provide improved toughness, decreases reaction cure exotherm, may change or alter the refractive index, adjust the refractive index of the polymer to match the refractive index of various types of glass, to provide for example transparent fiberglass, as well as, other features and characteristics to the cured preform and ceramic material.

Figure 26:
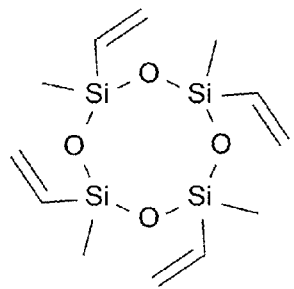
FIG. 26 is a chemical formula for an embodiment of a tetravinyl cyclosiloxane in accordance with the present inventions.

The precursor may be a reactive monomer, such as tetramethyltetravinylcyclotetrasiloxane ("TV"), which formula is shown in FIG. 26. This precursor may be used to provide a branching agent, a three-dimensional cross-linking agent, (and in certain formulations, e.g., above 2%, and certain temperatures (e.g., about from about room temperature to about 60° C., it acts as an inhibitor to cross-linking, e.g., in may inhibit the cross-linking of hydride and vinyl groups), as well as, other features and characteristics to the cured preform and ceramic material.

Figure 29:
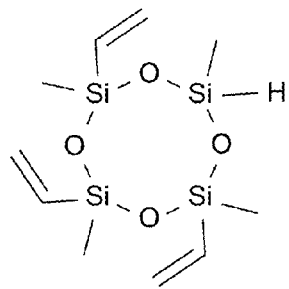
FIG. 29 is a chemical formula for an embodiment of a trivinyl hydride cyclosiloxane in accordance with the present inventions.
Figure 27:
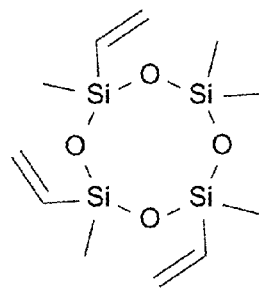
FIG. 27 is chemical formula for an embodiment of a trivinyl cyclosiloxane in accordance with the present inventions.
Figure 30:
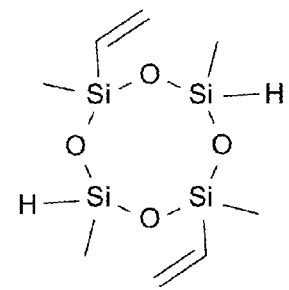
FIG. 30 is a chemical formula for an embodiment of a divinyl dihydride cyclosiloxane in accordance with the present inventions.
Figure 28:
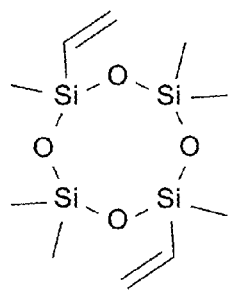
FIG. 28 is a chemical formula for an embodiment of a divinyl cyclosiloxane in accordance with the present inventions.
Figure 31:
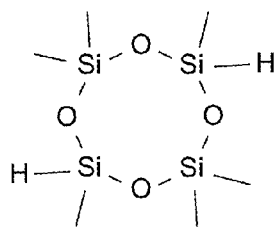
FIG. 31 is a chemical formula for an embodiment of a dihydride cyclosiloxane in accordance with the present inventions.
Figure 32:
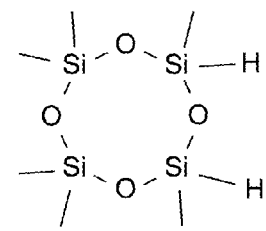
FIG. 32 is a chemical formula for an embodiment of a dihydride cyclosiloxane in accordance with the present inventions.

The precursor may be a reactive monomer, such as trivinyl cyclotetrasiloxane, which formula is shown in FIG. 27. The precursor may be a reactive monomer, such as divinyl cyclotetrasiloxane, which formula is shown in FIG. 28. The precursor may be a reactive monomer, such as monohydride cyclotetrasiloxane, which formula is shown in FIG. 29. The precursor may be a reactive monomer, such as dihydride cyclotetrasiloxane, which formula is shown in FIG. 30. The precursor may be a reactive monomer, such as hexamethyl cyclotetrasiloxane, which formula is shown in FIG. 31 and FIG. 32.

Figure 33:
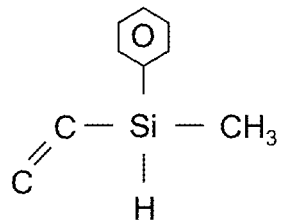
FIG. 33 is a chemical formula for an embodiment of a silane in accordance with the present inventions.
Figure 35:
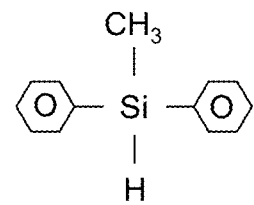
FIG. 35 is a chemical formula for an embodiment of a silane in accordance with the present inventions.
Figure 34:
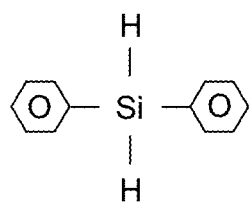
FIG. 34 is a chemical formula for an embodiment of a silane in accordance with the present inventions.

The precursor may be a silane modifier, such as vinyl phenyl methyl silane, which formula is shown in FIG. 33. The precursor may be a silane modifier, such as diphenyl silane, which formula is shown in FIG. 34. The precursor may be a silane modifier, such as diphenyl methyl silane, which formula is shown in FIG. 35 (which may be used as an end capper or end termination group). The precursor may be a silane modifier, such as phenyl methyl silane, which formula is shown in FIG. 36 (which may be used as an end capper or end termination group).

Figure 36:
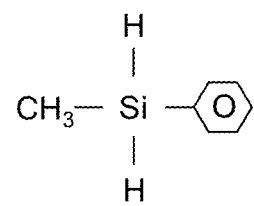
FIG. 36 is a chemical formula for an embodiment of a silane in accordance with the present inventions.
Figure 37:
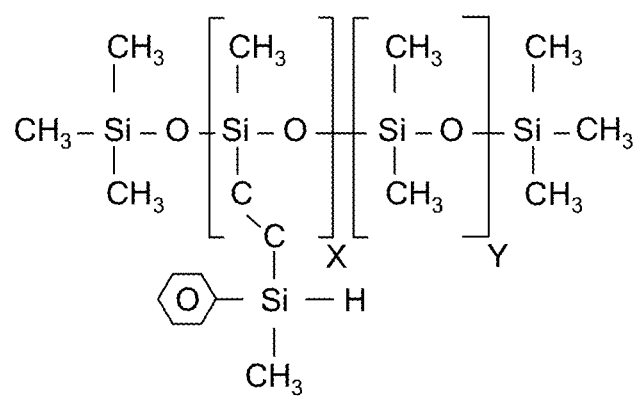
FIG. 37 is a chemical formula for an embodiment of a methyl terminated dimethyl ethyl methyl phenyl silyl silane polysiloxane precursor material in accordance with the present inventions.

The precursors of FIGS. 33, 34 and 36 can provide chain extenders and branching agents. They also improve toughness, alter refractive index, and improve high temperature cure stability of the cured material, as well as improving the strength of the cured material, among other things. The precursor of FIG. 35 may function as an end capping agent, that may also improve toughness, alter refractive index, and improve high temperature cure stability of the cured material, as well as improving the strength of the cured material, among other things.

The precursor may be a reaction product of a silane modifier with a siloxane backbone additive, such as phenyl methyl silane substituted MH, which formula is shown in FIG. 35.

Figure 38:
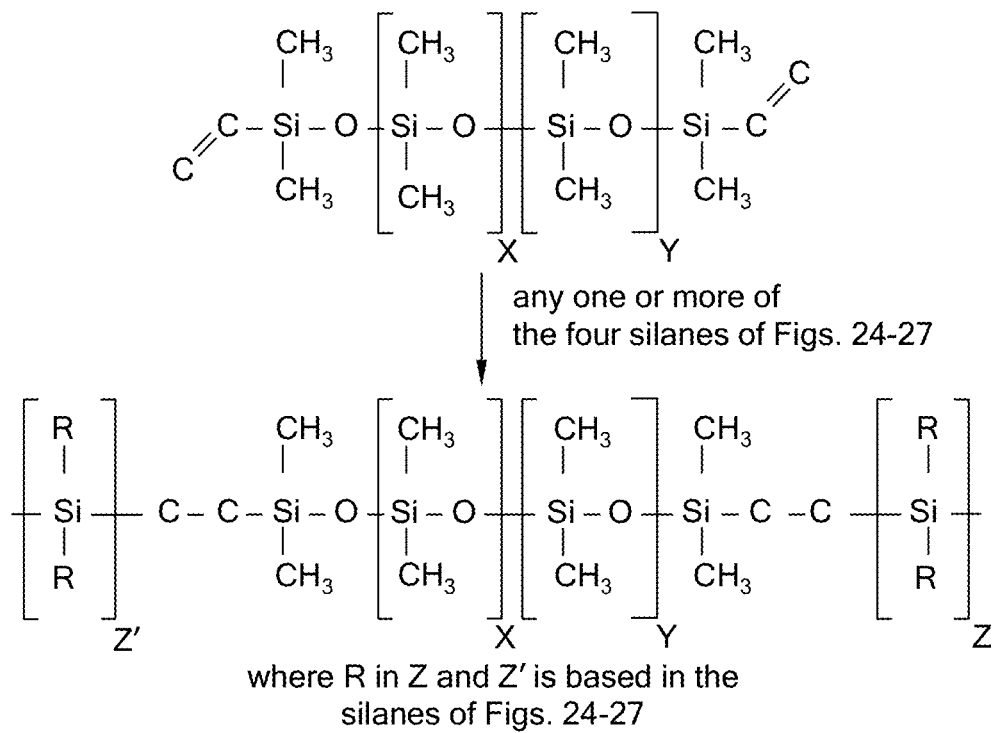
FIG. 38 is chemical formulas for an embodiment of a polysiloxane precursor material in accordance with the present inventions.

The precursor may be a reaction product of a silane modifier (e.g., FIGS. 33 to 36) with a vinyl terminated siloxane backbone additive (e.g., FIG. 15), which formula is shown in FIG. 38, where R may be the silane modifiers having the structures of FIGS. 33 to 36.

Figure 39:
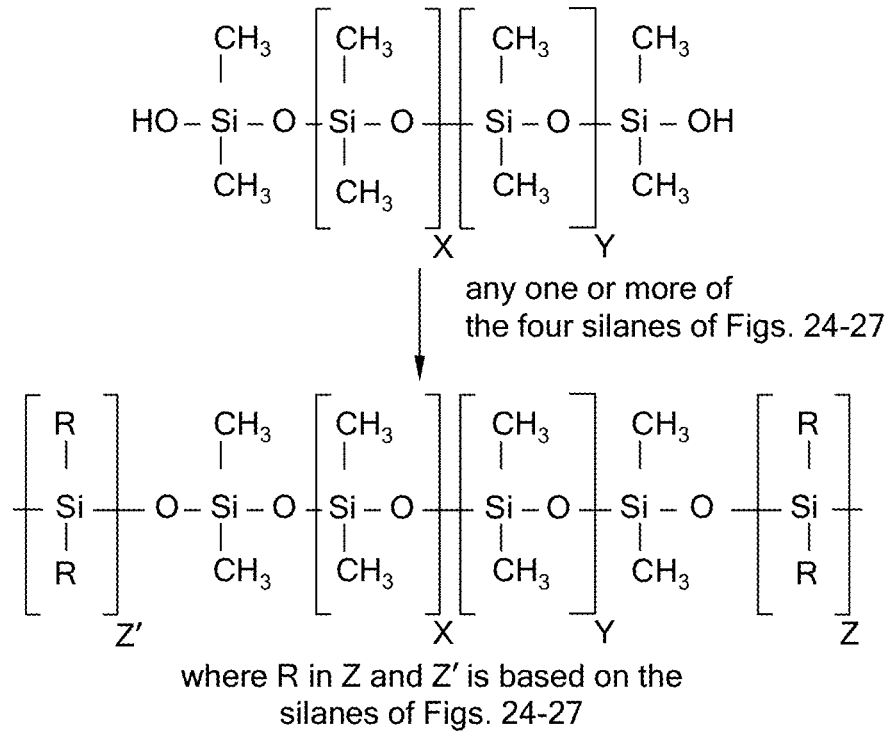
FIG. 39 is chemical formulas for an embodiment of a polysiloxane precursor material in accordance with the present inventions.

The precursor may be a reaction product of a silane modifier (e.g., FIGS. 33 to 36) with a hydroxy terminated siloxane backbone additive (e.g., FIG. 16), which formula is shown in FIG. 39, where R may be the silane modifiers having the structures of FIGS. 33 to 36.

Figure 40:
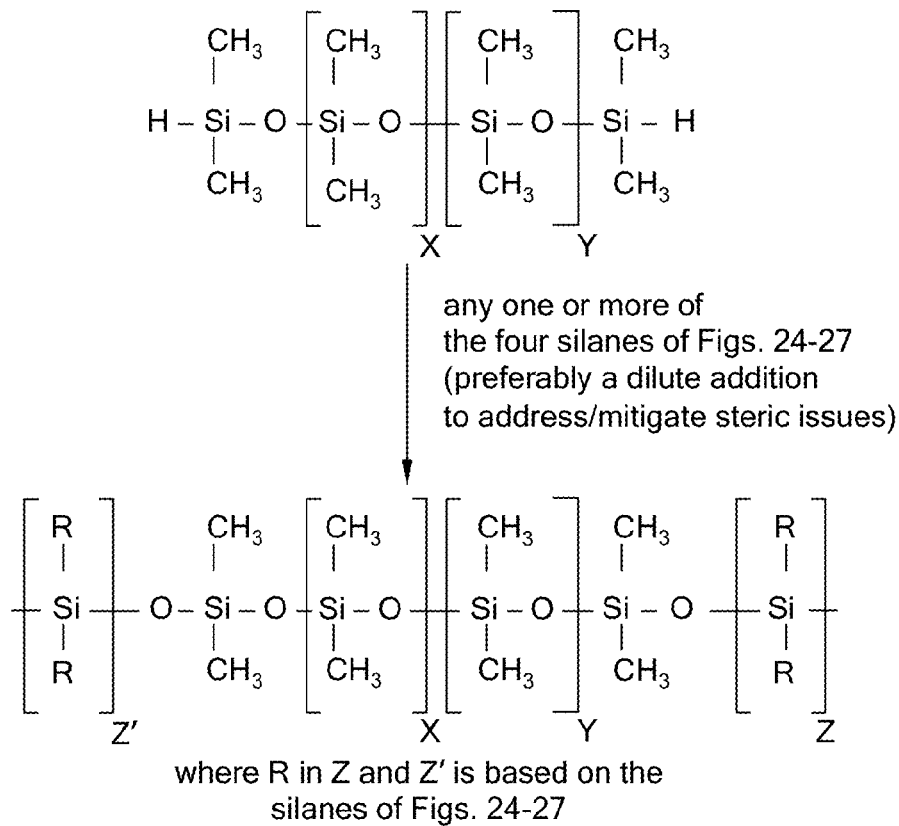
FIG. 40 is chemical formulas for an embodiment of a polysiloxane precursor material in accordance with the present inventions.

The precursor may be a reaction product of a silane modifier (e.g., FIGS. 33 to 36) with a hydride terminated siloxane backbone additive (e.g., FIG. 17), which formula is shown in FIG. 40, where R may be the silane modifiers having the structures of FIGS. 33 to 36.

Figure 41:
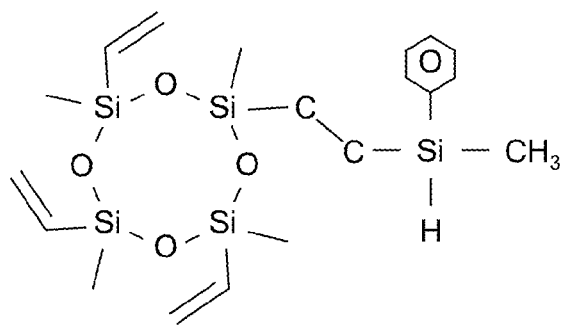
FIG. 41 is a chemical formula for an embodiment of an ethyl methyl phenyl silyl-cyclosiloxane in accordance with the present inventions.
Figure 42:
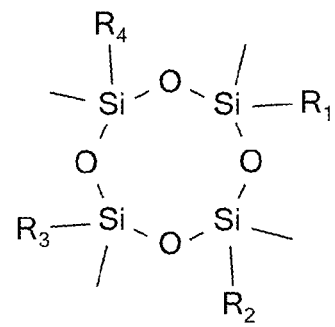
FIG. 42 is a chemical formula for an embodiment of a cyclosiloxane in accordance with the present inventions.

The precursor may be a reaction product of a silane modifier (e.g., FIGS. 33 to 36) with a cyclosiloxane, examples of which formulas are shown in FIG. 26 (TV), FIG. 41, and in FIG. 42, where $R_1$, $R_2$, $R_3$, and $R_4$ may be a methyl or the silane modifiers having the structures of FIGS. 33 to 36, taking into consideration steric hindrances.

Figure 44:
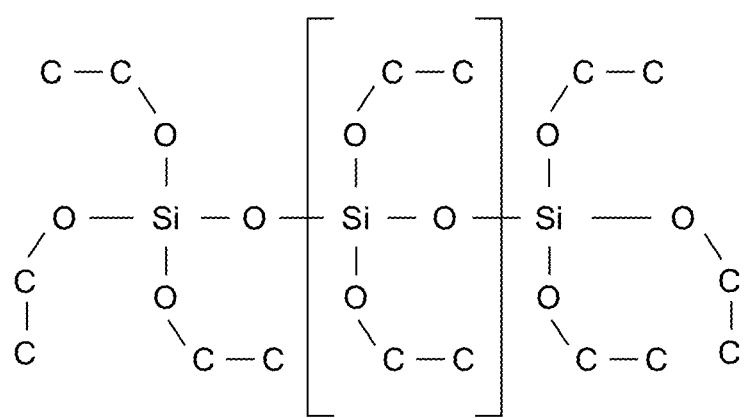
FIG. 44 is a chemical formula for an embodiment of an orthosilicate in accordance with the present inventions.

The precursor may be a partially hydrolyzed tertraethyl orthosilicate, which formula is shown in FIG. 44, such as TES 40 or Silbond 40.

The precursor may also be a methylsesquisilioxane such as SR-350 available from General Electric Company, Wilton, Conn. The precursor may also be a phenyl methyl siloxane such as 604 from Wacker Chemie AG. The precursor may also be a methylphenylvinylsiloxane, such as H62 C from Wacker Chemie AG.

The precursors may also be selected from the following: SiSiB® HF2020, TRIMETHYLSILYL TERMINATED METHYL HYDROGEN SILICONE FLUID 63148-57-2; SiSiB® HF2050 TRIMETHYLSILYL TERMINATED METHYLHYDROSILOXANE DIMETHYLSILOXANE COPOLYMER 68037-59-2; SiSiB® HF2060 HYDRIDE TERMINATED METHYLHYDROSILOXANE DIMETHYLSILOXANE COPOLYMER 69013-23-6; SiSiB® HF2038 HYDROGEN TERMINATED POLYDIPHENYL SILOXANE; SiSiB® HF2068 HYDRIDE TERMINATED METHYLHYDROSILOXANE DIMETHYLSILOXANE COPOLYMER 115487-49-5; SiSiB® HF2078 HYDRIDE TERMINATED POLY(PHENYLDIMETHYLSILOXY) SILOXANE PHENYL SILSESQUIOXANE, HYDROGEN-TERMINATED 68952-30-7; SiSiB® VF6060 VINYLDIMETHYL TERMINATED VINYLMETHYL DIMETHYL POLYSILOXANE COPOLYMERS 68083-18-1; SiSiB® VF6862 VINYLDIMETHYL TERMINATED DIMETHYL DIPHENYL POLYSILOXANE COPOLYMER 68951-96-2; SiSiB® VF6872 VINYLDIMETHYL TERMINATED DIMETHYL-METHYLVINYL-DIPHENYL POLYSILOXANE COPOLYMER; SiSiB® PC9401 1,1,3,3-TETRAMETHYL-1,3-DIVINYLDISILOXANE 2627-95-4; SiSiB® PF1070 SILANOL TERMINATED POLYDIMETHYLSILOXANE (OF1070) 70131-67-8; SiSiB@ OF1070 SILANOL TERMINATED POLYDIMETHYSILOXANE 70131-67-8; OH-ENDCAPPED POLYDIMETHYLSILOXANE HYDROXY TERMINATED OLYDIMETHYLSILOXANE 73138-87-1; SiSiB® VF6030 VINYL TERMINATED POLYDIMETHYL SILOXANE 68083-19-2; and, SiSiB® HF2030 HYDROGEN TERMINATED POLYDIMETHYLSILOXANE FLUID 70900-21-9.

Figure 43:
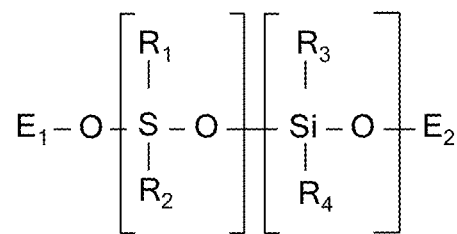
FIG. 43 is a chemical formula for an embodiment of a siloxane precursor in accordance with the present inventions.
Figure 43A:
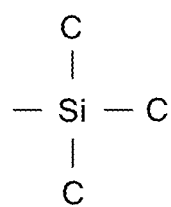
FIGS. 43A to 43D are chemical formula for embodiments of the $E_1$ and $E_2$ groups in the formula of FIG. 43.
Figure 43B:
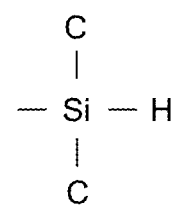
Figure 43C:
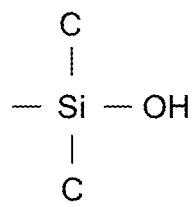
Figure 43D:
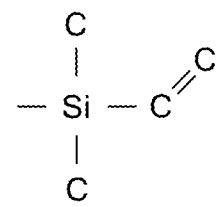

Thus, in additional to the forgoing specific precursors, it is contemplated that a precursor may be compound of the general formula of FIG. 43, wherein end cappers $E_1$ and $E_2$ are chosen from groups such as trimethyl silicon ($SiC_3H_9$) FIG. 43A, dimethyl silicon hydroxy ($SiC_2OH_7$) FIG. 43C, dimethyl silicon hydride ($SiC_2H_7$) FIG. 43B and dimethyl vinyl silicon ($SiC_4H_9$) FIG. 43D. The R groups $R_1$, $R_2$, $R_3$, and $R_4$ may all be different, or one or more may be the same, thus R2 is the same as R3 is the same as $R_4$, $R_1$ and R2 are different with $R_3$ and $R_4$ being the same, etc. The R groups are chosen from groups such as phenyl, vinyl, hydride, methyl, ethyl, allyl, phenylethyl, methoxy, and alkoxy.

In general, embodiments of formulations for polysilocarb formulations may for example have from about 20% to about 99% MH, about 0% to about 30% siloxane backbone additives, about 1% to about 60% reactive monomers, and, about 0% to about 90% reaction products of a siloxane backbone additives with a silane modifier or an organic modifier reaction products.

In mixing the formulations a sufficient time to permit the precursors to become effectively mixed and dispersed. Generally, mixing of about 15 minutes to an hour is sufficient.

Typically, the precursor formulations are relatively, and essentially, shear insensitive, and thus the type of pumps or mixing are not critical. It is further noted that in higher viscosity formulations additional mixing time may be required. The temperature of the formulations, during mixing should be kept below about 45 degrees C., and preferably about 10 degrees C. (It is noted that these mixing conditions are for the pre-catalyzed formulations)

The Reaction Type Process

In the reaction type process, in general, a chemical reaction is used to combine one, two or more precursors, typically in the presence of a solvent, to form a precursor formulation that is essentially made up of a single polymer that can then be cured and if need be pyrolized. This process provides the ability to build custom precursor formulations that when cured can provide plastics having unique and desirable features such as high temperature, flame resistance and retardation, strength and other features. The cured materials can also be pyrolized to form ceramics having unique features. The reaction type process allows for the predetermined balancing of different types of functionality in the end product by selecting function groups for incorporation into the polymer that makes up the precursor formulation, e.g., phenyls which typically are not used for ceramics but have benefits for providing high temperature capabilities for plastics, and styrene which typically does not provide high temperature features for plastics but provides benefits for ceramics.

Figure 45:
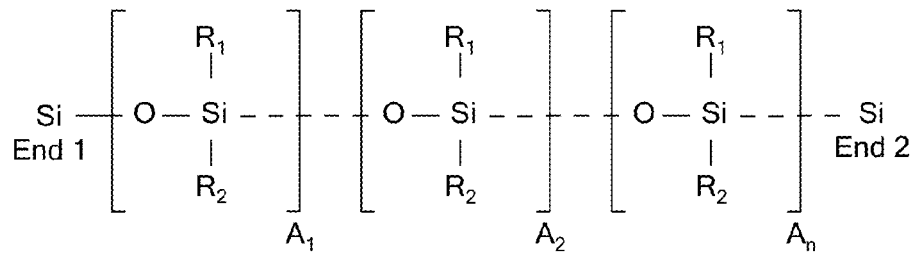
FIG. 45 is a chemical formula for an embodiment of a polysiloxane in accordance with the present inventions.
Figure 46:
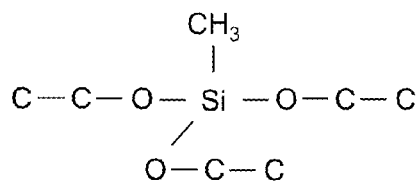
FIG. 46 is a chemical formula for an embodiment of a triethoxy methyl silane in accordance with the present inventions.
Figure 47:
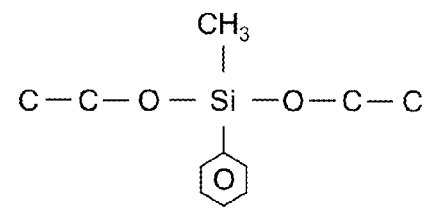
FIG. 47 is a chemical formula for an embodiment of a diethoxy methyl phenyl silane in accordance with the present inventions.
Figure 48:
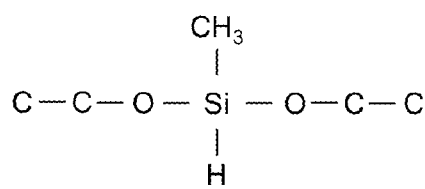
FIG. 48 is a chemical formula for an embodiment of a diethoxy methyl hydride silane in accordance with the present inventions.
Figure 49:
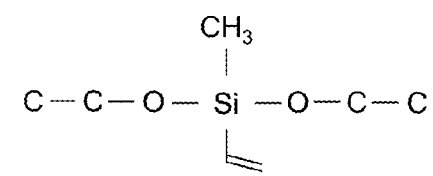
FIG. 49 is a chemical formula for an embodiment of a diethoxy methyl vinyl silane in accordance with the present inventions.
Figure 50:
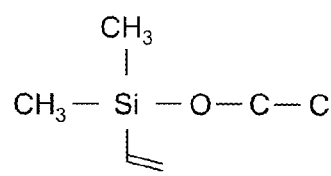
FIG. 50 is a chemical formula for an embodiment of a dimethyl ethoxy vinyl silane in accordance with the present inventions.
Figure 51:
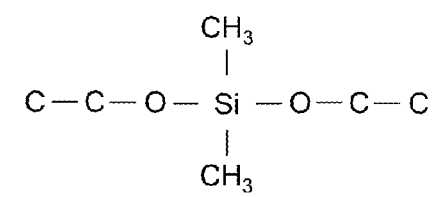
FIG. 51 is a chemical formula for an embodiment of a diethoxy dimethyl silane in accordance with the present inventions.
Figure 52:
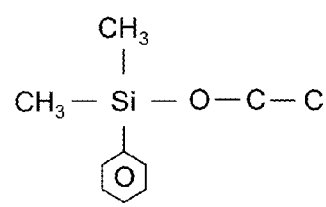
FIG. 52 is a chemical formula for an embodiment of an ethoxy dimethyl phenyl silane in accordance with the present inventions.
Figure 53:
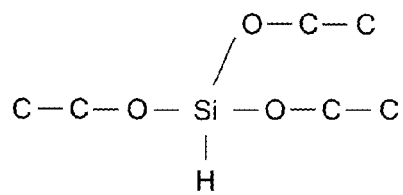
FIG. 53 is a chemical formula for an embodiment of a diethoxy dihydride silane in accordance with the present inventions.
Figure 54:
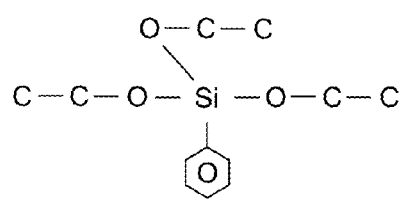
FIG. 54 is a chemical formula for an embodiment of a triethoxy phenyl silane in accordance with the present inventions.
Figure 55:
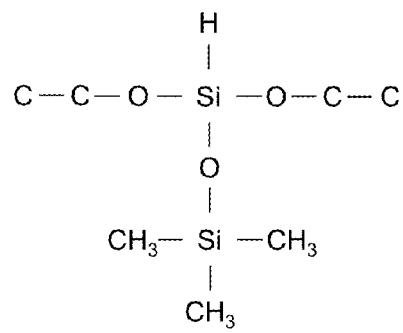
FIG. 55 is a chemical formula for an embodiment of a diethoxy hydride trimethyl siloxane in accordance with the present inventions.
Figure 56:
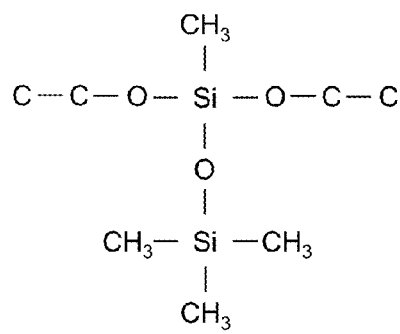
FIG. 56 is a chemical formula for an embodiment of a diethoxy methyl trimethyl siloxane in accordance with the present inventions.
Figure 57:
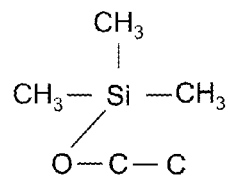
FIG. 57 is a chemical formula for an embodiment of a trimethyl ethoxy silane in accordance with the present inventions.
Figure 58:
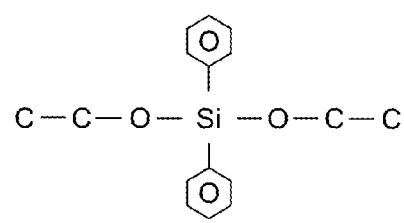
FIG. 58 is a chemical formula for an embodiment of a diphenyl diethoxy silane in accordance with the present inventions.
Figure 59:
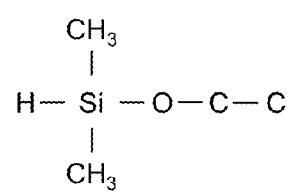
FIG. 59 is a chemical formula for an embodiment of a dimethyl ethoxy hydride siloxane in accordance with the present invention.
Figure 60A:
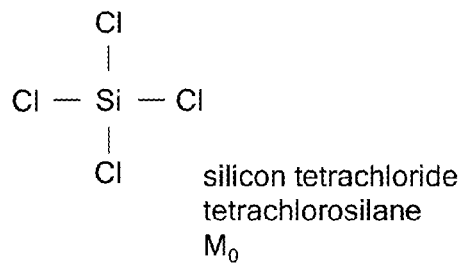
FIGS. 60A to 60F are chemical formulas for starting materials in accordance with the present inventions.
Figure 60B:
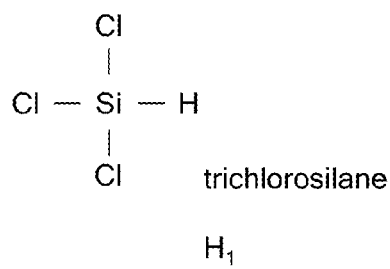
Figure 60C:
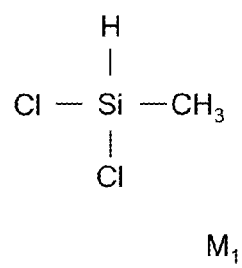
Figure 60D:
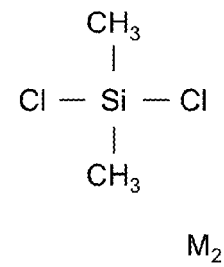
Figure 60E:
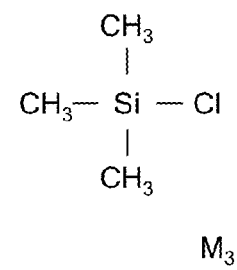
Figure 60F:
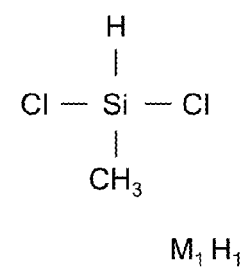

In general a custom polymer for use as a precursor formulation is made by reacting precursors in a condensation reaction to form the polymer precursor formulation. This precursor formulation is then cured into a preform through a hydrolysis reaction. The condensation reaction forms a polymer of the type shown in FIG. 45, where $R_1$ and $R_2$ in the polymeric units can be a H, a Methyl (Me)(—C), a vinyl (—C═C), alkyl (—R), a phenyl (Ph)(—$C_6H_5$), an ethoxy (—O—C—C), a siloxy, methoxy (—O—C), alkoxy, (—O—R), hydroxy, (—O—H), and phenylethyll (—C—C—$C_6H_5$). $R_1$ and $R_2$ may be the same or different. The custom precursor polymers can have several different polymeric units, e.g., $A_1$, $A_2$, $A_n$, and may include as many as 10, 20 or more units, or it may contain only a single unit. (For example, if methyl hydrogen fluid is made by the reaction process). The end units, Si End 1 and Si End 2, can come from the precursors of FIGS. 50, 52, 57, and 49. Additionally, if the polymerization process is properly controlled a hydroxy end cap can be obtained from the precursors used to provide the repeating units of the polymer.

In general, the precursors, e.g., FIGS. 46 to 59 are added to a vessel with ethanol (or other material to absorb heat, e.g., to provide thermal mass), an excess of water, and hydrochloric acid (or other proton source). This mixture is heated until it reaches its activation energy, after which the reaction is exothermic. In this reaction the water reacts with an ethoxy group of the silicon of the precursor monomer, forming a hydroxy (with ethanol as the byproduct). Once formed this hydroxy becomes subject to reaction with an ethoxy group on the silicon of another precursor monomer, resulting in a polymerization reaction. This polymerization reaction is continued until the desired chain length(s) is built.

Control factors for determining chain length are: the monomers chosen (generally, the smaller the monomers the more that can be added before they begin to coil around and bond to themselves); the amount and point in the reaction where end cappers are introduced; and the amount of water and the rate of addition. Thus, the chain lengths can be from about 180 mw (viscosity about 5 cps) to about 65,000 mw (viscosity of about 10,000 cps), greater than about 1000 mw, greater than about 10,000 mw, greater than about 50,000 mw and greater. Further, the polymerized precursor formulation may, and typically does, have polymers of different molecular weights, which can be predetermined to provide formulation, cured, and ceramic product performance features.

Upon completion of the polymerization reaction the material is transferred into a separation apparatus, e.g., a separation funnel, which has an amount of deionized water that is from about 1.2× to about 1.5× the mass of the material. This mixture is vigorously stirred for about less than 1 minute and preferably from about 5 to 30 sections. Once stirred the material is allowed to settle and separate, which may take from about 1 to 2 hours. The polymer is the higher density material and is removed from the vessel. This removed polymer is then dried by either warming in a shallow tray at 90 C for about two hours; or, preferably, is passed through a wiped film distillation apparatus, to remove any residual water and ethanol. Alternatively, sodium bicarbonate sufficient to buffer the aqueous layer to a pH of about 4 to about 7 is added. It is further understood that other, and commercial, manners of separating the polymer from the material may be employed.

Preferably a catalyst is used in the curing process of the polymer pressure formulations from the reaction type process. The same polymers as used for curing the formulation from the mixing type process can be used. It is noted that unlike the mixing type formulations, a catalyst is not necessarily required. However, if not used, reaction time and rates will be slower. The pyrolysis of the cured material is essentially the same as the cured material from the mixing process.

Curing and Pyrolysis

The preform can be cured in a controlled atmosphere, such as an inert gas, or it can be cured in the atmosphere. The curing can be conducted in reduce pressure, e.g., vacuum, or in reduced pressure flowing gas (e.g., inert) streams. The cure conditions, e.g., temperature, time, rate, can be predetermined by the formulation to match, for example the size of the preform, the shape of the preform, or the mold holding the preform to prevent stress cracking, off gassing, or other problems associated with the curing process. Further, the curing conditions may be such as to take advantage of, in a controlled manner, what may have been previously perceived as problems associated with the curing process. Thus, for example, off gassing may be used to create a foam material having either open or closed structure. Further, the porosity of the material may be predetermined such that, for example, a particular pore size may be obtained, and in this manner a filter or ceramic screen having predetermined pore sizes, flow characteristic may be made.

The preforms, either unreinforced, neat, or reinforced, may be used as a stand alone product, an end product, a final product, or a preliminary product for which later machining or processing may be performed on. The preforms may also be subject to pyrolysis, which converts the preform material into a ceramic.

During the curing process some formulations may exhibit an exotherm, i.e., a self heating reaction, that can produce a small amount of heat to assist or drive the curing reaction, or they may produce a large amount of heat that may need to be managed and removed in order to avoid problems, such as stress fractures. During the cure off gassing typically occurs and results in a loss of material, which loss is defined generally by the amount of material remaining, e.g., cure yield. The formulations and polysilocarb precursor formulations of embodiments of the present inventions can have cure yields of at least about 90%, about 92%, about 100%. In fact, with air cures the materials may have cure yields above 100%, e.g., about 101-105%, as a result of oxygen being absorbed from the air. Additionally, during curing the material shrinks, this shrinkage may be, depending upon the formulation and the nature of the preform shape, and whether the preform is reinforce, neat or unreinforced, from about 20%, less than 20%, less than about 15%, less than about 5%, less than about 1%, less than about 0.5%, less than about 0.25% and smaller.

In pyrolizing the preform, or cured structure or cured material, it is heated to above about 650° C. to about 1,200° C. At these temperatures typically all organic structures are either removed or combined with the inorganic constituents to form a ceramic. Typically at temperatures in the 650° C. to 1,200° C. range the material is an amorphous glassy ceramic. When heated above 1,200° C. the material may from nano crystalline structures, or micro crystalline structures, such as SiC, $Si3N_4$, SiCN, β SiC, and above 1,900° C. an α SiC structure may form.

During pyrolysis material is loss through off gassing. The amount of material remaining at the end of a pyrolysis set is referred to as char yield (or pyrolysis yield). The formulations and polysilocarb precursor formulations of embodiments of the present inventions can have char yields of at least about 60%, about 70%, about 80%, and at least about 90%, at least about 91% and greater. In fact, with air pyrolysis the materials may have cure yields well above 91%, which can approach 100%. In order to avoid the degradation of the material in an air pyrolysis (noting that typically pyrolysis is conducted in an inert atmospheres) specifically tailored formulations must be used, such as for example, formulations high in phenyl content (at least about 11%, and preferably at least about 20% by weight phenyls), formulations high in allyl content (at least about 15% to about 60%). Thus, there is provided formulations and polysilocarb precursor formulations that are capable of being air pyrolized to form a ceramic and to preferably do so at char yield in excess of at least about 80% and above 88%.

The initial or first pyrolysis step generally yields a structure that is not very dense, and for example, has not reached the density required for its intended use. However, in some examples, such as the use of light weight spheres, the first pyrolysis may be sufficient. Thus, typically a reinfiltration process may be performed on the pyrolyzed material, to add in additional polysilocarb precursor formulation material, to fill in, or fill the voids and spaces in the structure. This reinfiltrated material is they repyrolized. This process of pyrolization, reinfiltration may be repeated, through one, two, three, and up to 10 or more times to obtain the desired density of the final product. Additionally, with formulations of embodiments of the present inventions, the viscosity of the formulation may be tailored to provide more efficient reinfiltrations, and thus, a different formulation may be used at later reinfiltration steps, as the voids or pores become smaller and more difficult to get the formulation material into it. The high char yields, and other features of embodiments of the present invention, enable the manufacture of completely closed structures, e.g., "helium tight" materials, with less than twelve reinfiltration steps, less than about 10 reinfiltrations steps and less than five reinfiltrations steps. Thus, by way of example, an initial inert gas pyrolysis may be performed with a high char yield formulation followed by four reinfiltration air pyrolysis steps.

Upon curing the polysilocarb precursor formulation a cross linking reaction takes place that provides a cross linked structure having, among other things, an —$R_1$—Si—C—C—Si—O—Si—C—C—Si—$R_2$— where $R_1$ and $R_2$ vary depending upon, and are based upon, the precursors used in the formulation.

Embodiments of the present inventions have the ability to utilize precursors that have impurities, high-level impurities and significant impurities. Thus, the precursors may have more than about 0.1% impurities, more than about 0.5%, more than about 1% impurities, more than about 5% impurities, more than about 10% impurities, and more than about 50% impurities. In using materials with impurities, the amounts of these impurities, or at least the relative amounts, so that the amount of actual precursor is known, should preferably be determined by for example GPC (Gel Permeation Chromatography) or other methods of analysis. In this manner the formulation of the polysilocarb precursor formulation may be adjusted for the amount of impurities present. The ability of embodiments of the present invention to utilize lower level impurity materials, and essentially impure materials, and highly impure materials, provides significant advantages over other method of making polymer derived ceramics. This provides two significant advantages, among other things. First, the ability to use impure, lower purity, materials in embodiments of the present inventions, provides the ability to greatly reduce the cost of the formulations and end products, e.g., cured preforms, cured parts, and ceramic parts or structures. Second, the ability to use impure, lower purity, materials in embodiments of the present inventions, provides the ability to have end products, e.g., cured preforms, cured parts, and ceramic parts or structures, that have a substantially greater consistence from part to part, because variations in starting materials can be adjusted for during the formulation of each polysilocarb precursor formulation.

Figure 61:
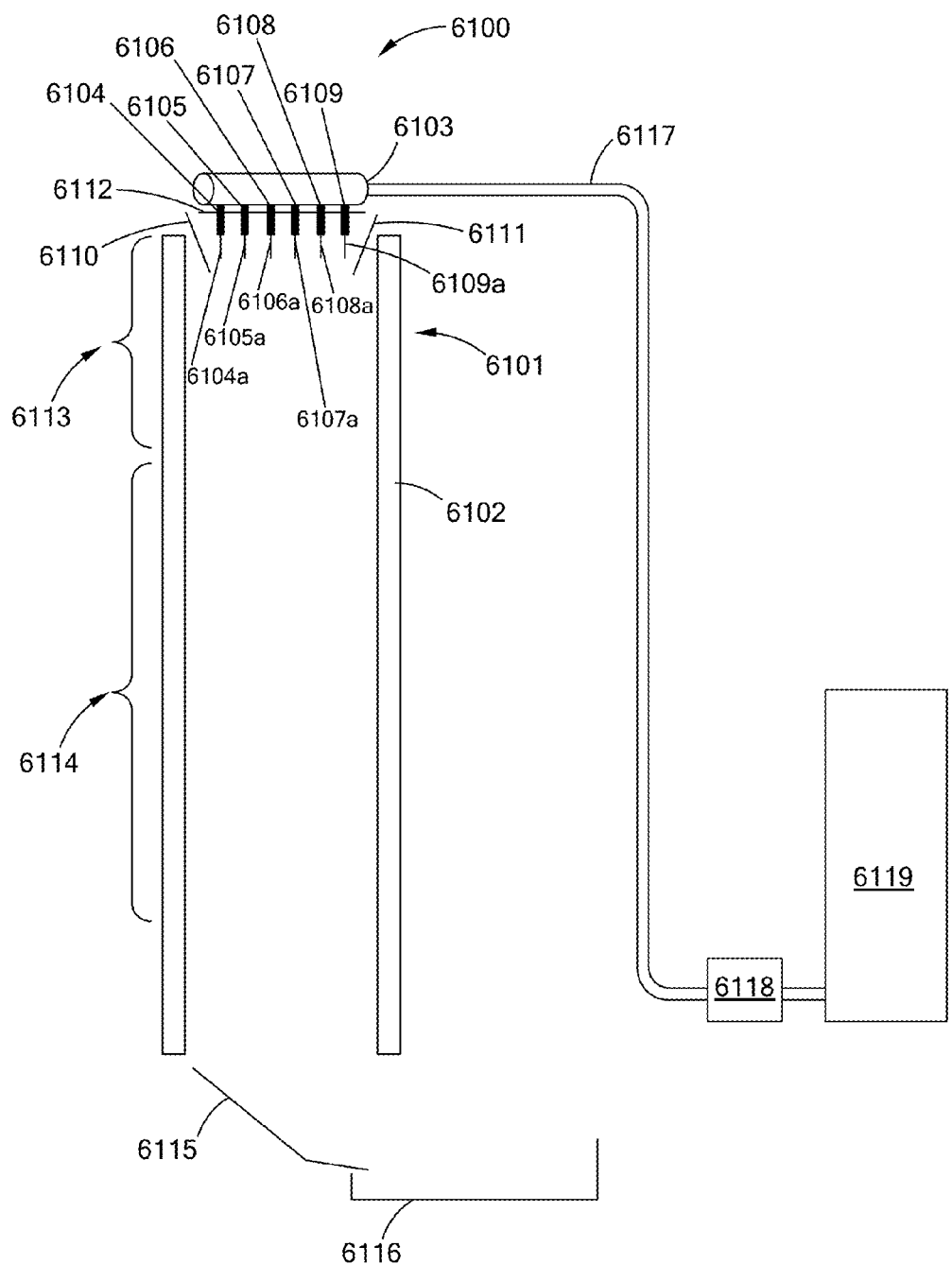
FIG. 61 is an embodiment of a proppant preform forming and curing system in accordance with the present invention.

Turning to FIG. 61 there is provided an embodiment of a proppant preform forming and curing system 6100. The system 6100 has a curing tower 6101, a tank 6119 for holding the polysiloxane precursor batch, a metering device 6118 for transferring the batch along feed line 6117 to a distribution header 6103. Mixing, agitating, commingling, pumping, flow control, reactor, and regulating devices may also be utilized in transferring, handling and metering of the precursor batch. The distribution header 6103 has nozzle assemblies 6104, 6105, 6106, 6107, 6108, 6109 having nozzles 6104a, 6105a, 6106a, 6107a, 6108a, 6109a respectively. Heat shields 6110, 6111, 6112 protect the nozzle assemblies and distribution header from being damaged by the heat of the tower 6101, or from overheating or otherwise adversely affecting the temperature of the nozzle assemblies and distribution header. For example, they prevent the temperature to rise to the point where the batch would cure in the distribution header or nozzle assembly thus clogging them. The heat shields may utilize air, such as with an air knife, metallic, ceramic, gas, oil, fluid, chemical, heat exchangers, reflectors, water, and others.

The tower 6101 has wall 6102 containing heating units, as well as, insolation and control devices for the heating units. In the embodiment of FIG. 61 the tower is configured to have two zones: a first or forming zone 6113; and a second or curing zone 6114. Depending upon the size of the beads, balls or spherical being formed the forming zone 6113 should have sufficient height, and a temperature selected for that height, that allows the drops of precursor material leaving a nozzle to form a predetermined shape, for example, as perfect a sphere as is possible, before or when the drop transitions (e.g., falls from zone 6113 to zone 6114) into curing zone 6114. Curing zone 6114 should have sufficient height, and a temperature selected for that height, to cure the preform proppants into hard enough structures that their striking the diverter 6115 and being collected and held in the pan 6116 does not adversely affect their shape. Additional curing, e.g., a hard cure can take place in the pan 6116, in another furnace, or in a third zone in the tower.

Although two temperature zones and six nozzles are utilized in the embodiment of FIG. 61, more or less zones and nozzles may be used. Thus, there may be a single zone or nozzle, two zones or nozzles, a dozen zones or nozzles, or more, and combinations and variations of these. If is further understood that in addition to nozzles these types of devices may be used at the top of the tower to initially form or shape the drop of precursor material that becomes the preform proppant. Thus, filaments, vibrating filaments that drip the precursor at a controlled rate and under controlled conditions may be used, as well as, various spraying, dispensing, and forming techniques. Other apparatus may also be employed to form the precursor batch into a spherical type structure and then cure that structure with minimal or no adverse consequences to the shape of the preform.

The following examples are provided to illustrate various embodiments of oil field treatments, hydraulic fracturing treatments, processes, precursors, batches, cured preform proppants, synthetic proppants, PDC proppants, and PsDC proppants of the present inventions. These examples are for illustrative purposes, and should not be viewed as, and do not otherwise limit the scope of the present inventions. The percentages used in the examples, unless specified otherwise, are weight percents of the total batch, preform or structure.

EXAMPLES

Example 1

Using a tower forming and cure system, a polysilocarb batch having 75% MH, 15% TV, 10% VT and 1% catalyst (10 ppm platinum and 0.5% Luprox 231 peroxide) is formed from a sonic nozzle having an internal diameter of 0.180 inches into droplets that fall from the nozzle into and through an 8 foot curing tower. The temperature at the top of the tower is from 495-505° C. the temperature at the bottom of the tower is 650° C. There are no discrete temperature zones in the tower. Airflow up the tower is by convection. A collection pan at the bottom of the tower is maintained at 110° C. The forming and curing are done in air. The preform proppants are removed from the pan and post (hard) cured at 200° C. in air for 2 hours. The hard cured preform proppants are pyrolized at 1000° C. in an argon atmosphere for 2 hours. The cure yield is from 99% to 101%. The char yield is 86%.

Example 2

Using a tower forming and cure system, a polysilocarb batch having 70% MH, 20% TV, 10% VT and 1% catalyst (10 ppm platinum and 0.5% Luprox 231 peroxide) is formed from a sonic nozzle having an internal diameter of 0.180 inches into droplets that fall from the nozzle into and through an 8 foot curing tower. The temperature at the top of the tower is from 495-505° C. the temperature at the bottom of the tower is 650° C. There are no discrete temperature zones in the tower. Airflow up the tower is by convection. A collection pan at the bottom of the tower is maintained at 110° C. The forming and curing are done in air. The preform proppants are removed from the pan and post (hard) cured at 200° C. in air for 2 hours. The hard cured preform proppants are pyrolized at 1000° C. in an argon atmosphere for 2 hours. The cure yield is from 99% to 101%. The char yield is 86%.

Example 2a

Figure 66:
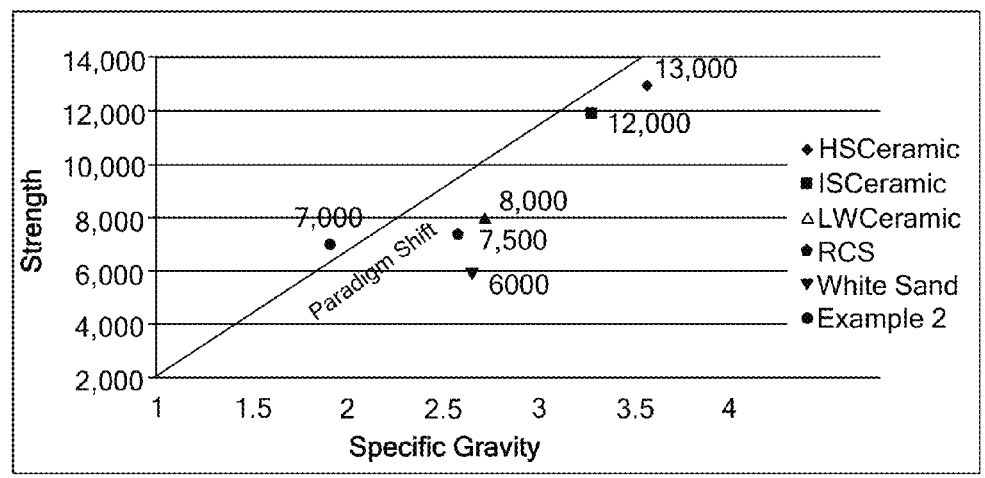
FIG. 66 is a chart comparing the specific gravity and strength of an embodiment of a PsDC proppants in accordance with the present invention with conventional proppants (having specific gravities greater than 2.5).

Turning to FIG. 66, there is provided a chart comparing the strength and density of an embodiment of the proppant of Example 2 with prior art proppants.

Example 2b

Figure 67:
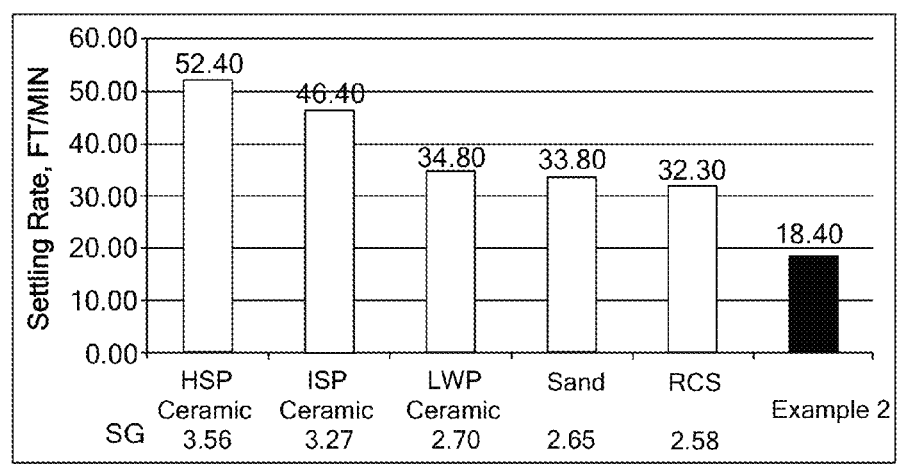
FIG. 67 is a chart comparing the settling rate of an embodiment of a PsDC proppants in accordance with the present invention with conventional proppants.

Turning to FIG. 67, there is provided a chart comparing the setting rate of an embodiment of the proppant of Example 2 with prior art proppants. The lower the settling rate the greater the likelihood that the proppant will remain suspended in the fracturing fluid and travel out further away from the borehole, and into the fracture area, during the fracture treatment.

Example 2c

Figure 68:
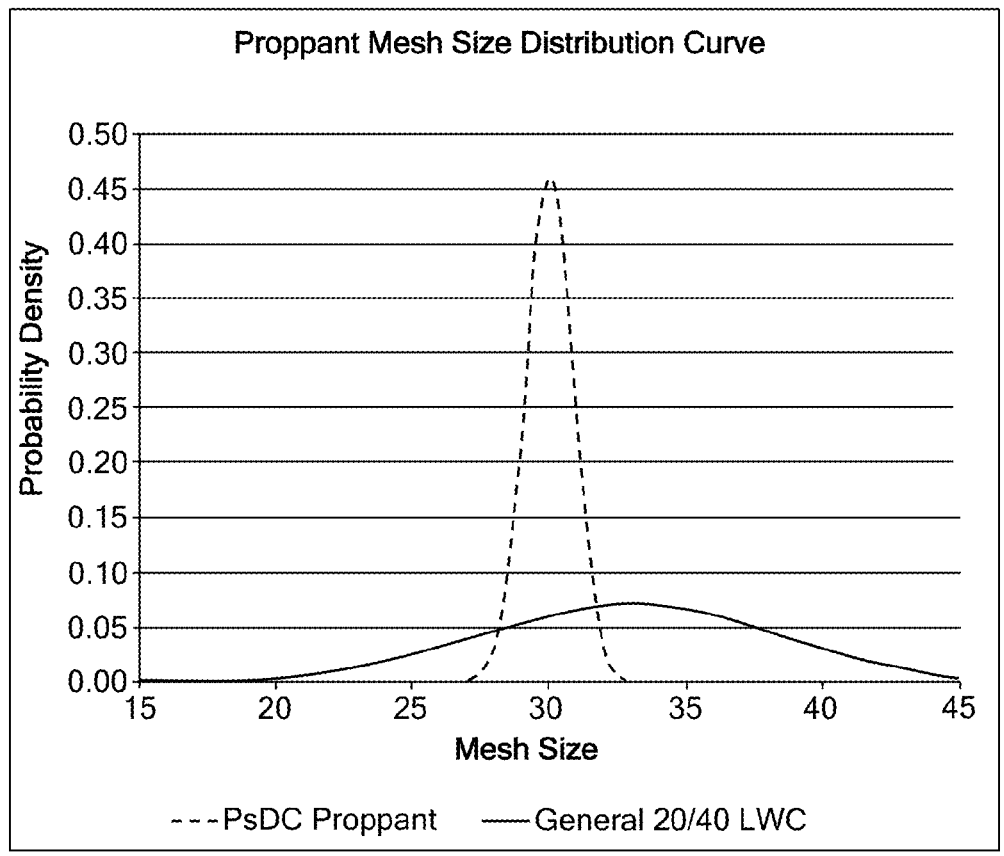
FIG. 68 is a chart comparing the particle size distribution for a batch of an embodiment of a PsDC proppant in accordance with the present invention with a batch of a conventional proppant.

Turning to FIG. 68, there is provided a chart comparing the very narrow particle size distribution of an embodiment of Example 2 with prior art proppants; illustrating the significantly narrower distribution than is found in the prior art.

Example 3

Using a tower forming and cure system, a polysilocarb batch having 70% MH, 20% TV, 10% VT and 1% catalyst (10 ppm platinum and 0.5% Luprox 231 peroxide) is formed from a sonic nozzle having an internal diameter of 0.180 inches into droplets that fall from the nozzle into and through an 8 foot curing tower. The temperature at the top of the tower is from 345° C. the temperature at the bottom of the tower is 550° C. There are no discrete temperature zones in the tower. Airflow up the tower is by convection. The collection pan is maintained at 110° C. The forming and curing are done in air. The preform proppants are removed from the pan and post (hard) cured at 200° C. in air for 3 hours. The hard cured preform proppants are pyrolized at 1000° C. in an argon atmosphere for 2 hours. The cure yield is from 99% to 101%. The char yield is 86%.

Example 4

PsDC proppants are made using a tower cure system. 50% by volume fly ash is added to a polysilocarb batch having 70% MH, 20% TV, 10% VT and 1% catalyst (10 ppm platinum and 0.5% Luprox 231 peroxide). This batch is formed from a sonic nozzle having an internal diameter of 0.180 inches into droplets that fall from the nozzle into and through an 18 foot curing tower. The temperature at the top of the tower is from 200-500° C. the temperature at the bottom of the tower is from 200-600° C. There are no discrete temperature zones in the tower. Airflow up the tower is by convection. The collection pan is maintained at 110° C. The forming and curing are done in air. The preform proppants are removed from the pan and post (hard) cured at 200° C. in air for 3 hours. The hard cured preform proppants are pyrolized at 1000° C. in an argon atmosphere for 2 hours. The cure yield is from 99% to 101%. The char yield is 86%.

Example 5

40% by volume AL$_2$O$_3$ having a diameter of 0.5 μm is added to a polysilocarb batch having 70% MH, 20% TV, 10% VT and 1% catalyst (10 ppm platinum and 0.5% Luprox 231 peroxide). Using a tower cure system, this batch is formed from a sonic nozzle having an internal diameter of 0.180 inches into droplets that fall from the nozzle into and through an 18 foot curing tower. The temperature at the top of the tower is from 200-500° C. the temperature at the bottom of the tower is from 200-600° C. There are no discrete temperature zones in the tower. Airflow up the tower is by convection. The collection pan is maintained at 110° C. The forming and curing are done in air. The preform proppants are removed from the pan and post (hard) cured at 200° C. in air for 3 hours. The hard cured preform proppants are pyrolized at 1000° C. in an argon atmosphere for 2 hours. The cure yield is from 99% to 101%. The char yield is 86%.

Example 6

A polysilocarb batch having 70% of the MH precursor (molecular weight of about 800) and 30% of the TV precursor are mixed together in a vessel and put in storage for later use. The polysilocarb batch has good shelf life and room temperature and the precursors have not, and do not react with each other. The polysilocarb batch has a viscosity of about 15 cps. 28% of an about 80 micron to about 325 mesh SiC filler is added to the batch to make a filled polysilocarb batch, which can be kept for later use. Just prior to forming and curing 10 ppm of a platinum catalyst is added to each of the polysilocarb batches and this catalyzed batch is dropped on a tray to form droplets which are cured in an air oven at about 125° C. for about 30 minutes. The cured drop structures are spherical type structures with densities of about 1.1-1.7 g/cc, diameters of about 200 microns to about 2 mm, and crush strengths of about 3-7 ksi.

Example 7

A polysilocarb batch having 70% of the MH precursor (molecular weight of about 800) and 30% of the TV precursor are mixed together in a vessel and put in storage for later use. The polysilocarb batch has good shelf life and room temperature and the precursors have not, and do not react with each other. The polysilocarb batch has a viscosity of about 15 cps. 21% of a silica fume (about 325 mesh) are added to the batch to make a filled polysilocarb batch, which can be kept for later use. Just prior to forming into preform proppants, 10 ppm of a platinum catalyst is added to the polysilocarb batch and these catalyzed batches are dropped into the curing tower and air cured. The cured drop structures are spherical type structures with densities of about 1.1-1.7 g/cc, diameters of about 200 microns, and (API/ISO) crush strengths of about 7 k psi.

Example 8

A polysilocarb batch having 75% of the MH precursor (molecular weight of about 800) and 25% of the TV precursor are mixed together in a vessel and put in storage for later use. The polysilocarb batch has good shelf life and room temperature and the precursors have not, and do not react with each other. The polysilocarb batch has a viscosity of about 18 cps. 40% of a silica fume to about 325 mesh silica filler is added to the batch to make a filled polysilocarb batch, which can be kept for later use. Prior to forming and curing 10 ppm of a platinum catalyst is added to each of the polysilocarb batch and this batch is formed into spherical proppants under similar forming and curing conditions to those of the forming and curing tower in Example 1.

Example 9

A polysilocarb batch having 10% of the MH precursor (molecular weight of about 800), 73% of the STY (FIG. 10 and having 10% X, molecular weight of about 1,000), and 16% of the TV precursor, and 1% of the OH terminated precursor of the formula of FIG. 5, having a molecular weight of about 1,000 are mixed together in a vessel and put in storage for later use. The polysilocarb batch has good shelf life and room temperature and the precursors have not, and do not react with each other. The polysilocarb batch has a viscosity of about 72 cps. 10 ppm of a platinum catalyst is added to the polysilocarb batch. Drops of the catalyzed batch are dripped into a hot air column having a temperature of about 375° C. and fall by gravity for about a distance of 8 ft in the air column. The cured spheres from the bottom of the air column are pyrolized in an inert atmosphere at 1,000° C. for about 120 minutes. The pyrolized round spheres have a very uniform size (e.g., monosize distribution), density of about 1.9-2.0 g/cc, a diameter of about 400-800 microns, and a (API/ISO) crush strength of about 5.5-7 k psi.

Example 10

A polysilocarb batch having about 70% MH, 20% TV precursor, 10% VT (molecular weight of about 6000), and 1% of the OH terminated precursor of the formula of FIG. 16, having a molecular weight of about 800 are mixed together in a vessel and put in storage for later use. The polysilocarb batch has good shelf life and room temperature and the precursors have not, and do not react with each other. The polysilocarb batch has a viscosity of about 55 cps. Prior to forming the preform proppants 10 ppm of a platinum and peroxide catalyst mixture is added to the polysilocarb batch. Drops of the catalyzed batch are dripped into a hot air column having a temperature of about 375° C. and fall by gravity for about a distance of 8 ft in the air column. The cured spheres from the bottom of the air column are pyrolized in an inert atmosphere at 1,000° C. for about 120 minutes. The pyrolized round spheres have a very uniform size (e.g., monosize distribution), density of about 2.0-2.1 g/cc, a diameter of about 400-800 microns, and a crush strength of about (API/ISO) 4-5.5 k psi.

Example 11

A polysilocarb batch has 75% MH, 15% TV, 10% VT and a viscosity of about 65 cps. 10 ppm of a platinum and peroxide catalyst mixture is added to this batch and drops of the catalyzed batch are dripped into a hot air column having a temperature of about 375° C. and fall by gravity for about a distance of 8 ft in the air column. The cured spheres from the bottom of the air column are pyrolized in an inert atmosphere at 1,000° C. for about 60 minutes. The pyrolized round spheres have a very uniform size (e.g., monosize distribution), density of about 2.0-2.1 g/cc, a diameter of about 400-800 microns, and a crush strength of about (API/ISO) 4-5.5 k psi.

Example 12

A polysilocarb batch having 70% of the MH and 30% of the VT having a molecular weight of about 500 and about 42% of a submicron and a 325 mesh silica are mixed together in a vessel and put in storage for later use. The polysilocarb batch has good shelf life and room temperature and the precursors have not, and do not react with each other. The polysilocarb batch has a viscosity of about 300 cps. PsDCs are are made from this batch following the methods of Example 1.

Example 13

PsDCs having the following characteristics:

| | |
|---|---|
| Sizes (mesh) | 200, 100, 70, 60, 40, 20, or 10 |
| Specific Gravity (w/in .05 g/cc) | 1.00 |
| Sphericity/Roundness | greater than .95 |
| Clusters (%) | 0 |
| Particle Distribution | 95% + within 5 mesh |
| Solubility in 12/3 HCl for 0.5 Hr@ 150 deg F. | <.3.5 |
| Solubility in 10% HCl for 0.5 Hr@ 150 deg F. | <.2 |
| Settling Rate | 2.39 |
| ISO Crush Analysis (>10% fines) | >5000 |

Example 14

PsDCs having the following characteristics.

| | |
|---|---|
| Sizes (mesh) | 200, 100, 70, 60, 40, 20, or 10 |
| Specific Gravity (w/in .05 g/cc) | 1.10 |
| Sphericity/Roundness | greater than .95 |
| Clusters (%) | 0 |
| Particle Distribution | 95% + within 5 mesh |
| Solubility in 12/3 HCl for 0.5 Hr@ 150 deg F. | <.3.5 |
| Solubility in 10% HCl for 0.5 Hr@ 150 deg F. | <.2 |
| Settling Rate | 2.89 |
| ISO Crush Analysis (>10% fines) | >5000 |

Example 15

PsDCs having the following characteristics.

| | |
|---|---|
| Sizes (mesh) | 200, 100, 70, 60, 40, 20, or 10 |
| Specific Gravity (w/in .05 g/cc) | 1.20 |
| Sphericity/Roundness | greater than .95 |
| Clusters (%) | 0 |
| Particle Distribution | 95% + within 5 mesh |
| Solubility in 12/3 HCl for 0.5 Hr@ 150 deg F. | <.3.5 |
| Solubility in 10% HCl for 0.5 Hr@ 150 deg F. | <.2 |
| Settling Rate | 3.47 |
| ISO Crush Analysis (>10% fines) | >5000 |

Example 16

PsDCs having the following characteristics.

| | |
|---|---|
| Sizes (mesh) | 200, 100, 70, 60, 40, 20, or 10 |
| Specific Gravity (w/in .05 g/cc) | 1.30 |
| Sphericity/Roundness | greater than .95 |
| Clusters (%) | 0 |
| Particle Distribution | 95% + within 5 mesh |
| Solubility in 12/3 HCl for 0.5 Hr@ 150 deg F. | <.3.5 |
| Solubility in 10% HCl for 0.5 Hr@ 150 deg F. | <.2 |
| Settling Rate | 4.14 |
| ISO Crush Analysis (>10% fines) | >5000 |

Example 17

PsDCs having the following characteristics.

| | |
|---|---|
| Sizes (mesh) | 200, 100, 70, 60, 40, 20, or 10 |
| Specific Gravity (w/in .05 g/cc) | 1.40 |
| Sphericity/Roundness | greater than .95 |
| Clusters (%) | 0 |
| Particle Distribution | 95% + within 5 mesh |
| Solubility in 12/3 HCl for 0.5 Hr@ 150 deg F. | <.3.5 |
| Solubility in 10% HCl for 0.5 Hr@ 150 deg F. | <.2 |
| Settling Rate | 4.90 |
| ISO Crush Analysis (>10% fines) | >5000 |

Example 18

PsDCs having the following characteristics.

| | |
|---|---|
| Sizes (mesh) | 200, 100, 70, 60, 40, 20, or 10 |
| Specific Gravity (w/in .05 g/cc) | 1.50 |
| Sphericity/Roundness | greater than .95 |
| Clusters (%) | 0 |
| Particle Distribution | 95% + within 5 mesh |
| Solubility in 12/3 HCl for 0.5 Hr@ 150 deg F. | <.3.5 |
| Solubility in 10% HCl for 0.5 Hr@ 150 deg F. | <.2 |
| Settling Rate | 5.78 |
| ISO Crush Analysis (>10% fines) | >5000 |

Example 19

PsDCs having the following characteristics.

| | |
|---|---|
| Sizes (mesh) | 200, 100, 70, 60, 40, 20, or 10 |
| Specific Gravity (w/in .05 g/cc) | 1.60 |
| Sphericity/Roundness | greater than .95 |
| Clusters (%) | 0 |
| Particle Distribution | 95% + within 5 mesh |
| Solubility in 12/3 HCl for 0.5 Hr@ 150 deg F. | <.3.5 |
| Solubility in 10% HCl for 0.5 Hr@ 150 deg F. | <.2 |
| Settling Rate | 6.78 |
| ISO Crush Analysis (>10% fines) | >5000 |

Example 20

PsDCs having the following characteristics.

| | |
|---|---|
| Sizes (mesh) | 200, 100, 70, 60, 40, 20, or 10 |
| Specific Gravity (w/in .05 g/cc) | 1.70 |
| Sphericity/Roundness | greater than .95 |
| Clusters (%) | 0 |

Example 21

PsDCs having the following characteristics.

| | |
|---|---|
| Sizes (mesh) | 200, 100, 70, 60, 40, 20, or 10 |
| Specific Gravity (w/in .05 g/cc) | 1.80 |
| Sphericity/Roundness | greater than .95 |
| Clusters (%) | 0 |
| Particle Distribution | 95% + within 5 mesh |
| Solubility in 12/3 HCl for 0.5 Hr@ 150 deg F. | <.3.5 |
| Solubility in 10% HCl for 0.5 Hr@ 150 deg F. | <.2 |
| Settling Rate | 9.22 |
| ISO Crush Analysis (>10% fines) | >10,000 |

Example 22

PsDCs having the following characteristics.

| | |
|---|---|
| Sizes (mesh) | 200, 100, 70, 60, 40, 20, or 10 |
| Specific Gravity (w/in .05 g/cc) | 1.90 |
| Sphericity/Roundness | greater than .95 |
| Clusters (%) | 0 |
| Particle Distribution | 95% + within 5 mesh |
| Solubility in 12/3 HCl for 0.5 Hr@ 150 deg F. | <.3.5 |
| Solubility in 10% HCl for 0.5 Hr@ 150 deg F. | <.2 |
| Settling Rate | 10.71 |
| ISO Crush Analysis (>10% fines) | >10,000 |

Example 23

PsDCs having the following characteristics.

| | |
|---|---|
| Sizes (mesh) | 200, 100, 70, 60, 40, 20, or 10 |
| Specific Gravity (w/in .05 g/cc) | 2.00 |
| Sphericity/Roundness | greater than .95 |
| Clusters (%) | 0 |
| Particle Distribution | 95% + within 5 mesh |
| Solubility in 12/3 HCl for 0.5 Hr@ 150 deg F. | <.3.5 |
| Solubility in 10% HCl for 0.5 Hr@ 150 deg F. | <.2 |
| Settling Rate | 12.40 |
| ISO Crush Analysis (>10% fines) | >10,000 |

Example 24

PsDCs having the following characteristics.

| | |
|---|---|
| Sizes (mesh) | 200, 100, 70, 60, 40, 20, or 10 |
| Specific Gravity (w/in .05 g/cc) | 2.10 |
| Sphericity/Roundness | greater than .95 |
| Clusters (%) | 0 |
| Particle Distribution | 95% + within 5 mesh |
| Solubility in 12/3 HCl for 0.5 Hr@ 150 deg F. | <.3.5 |
| Solubility in 10% HCl for 0.5 Hr@ 150 deg F. | <.2 |
| Settling Rate | 14.32 |
| ISO Crush Analysis (>10% fines) | >10,000 |

Example 25

The PsDCs of Example 24 are made having a predetermined mesh size of from about 8 to about 200, with 95% of the particle size distribution being within mesh of the predetermined value. 4,000,000 pounds of this proppant are mixed with 1 million gallons of slick water fracturing fluid for a fracturing treatment of an unconventional shale formation.

Example 26

The PsDCs of Example 24 are made having a predetermined mesh size of from about 8 to about 200, with 95% of the particle size distribution being within 8 mesh of the predetermined value. 7,000,000 pounds of this proppant are mixed with 2 million gallons of slick water fracturing fluid for a fracturing treatment of an unconventional shale formation.

Example 27

The PsDCs or Example 24 are made having a predetermined mesh size of greater than 200, with 95% of the particle size distribution being within 8 mesh of the predetermined value. 4,000,000 pounds of this proppant are mixed with 1 million gallons of fracturing fluid for a fracturing treatment of a conventional formation.

Example 28

The PsDCs or Example 24 are made having a predetermined mesh size of greater than 200, with 95% of the particle size distribution being within 5 mesh of the predetermined value. 7,000,000 pounds of this proppant are mixed with 2 million gallons of fracturing fluid for a fracturing treatment of an unconventional shale formation.

Example 29—Fracturing

Using embodiments of the PsDC of these examples, e.g., Example 2, 35, 42, 49, 53, 54, and 55 the following fracture plan is carried out on a formation.

Interval #1

| | | | |
|---|---|---|---|
| Fracture Half-Length (ft) | 263 | Propped Half-Length (ft) | 204 |
| Total Fracture Height (ft) | 307 | Total Propped Height (ft) | 238 |
| Depth to Fracture Top (ft) | 5449 | Depth to Propped Fracture Top (ft) | 5518 |
| Depth to Fracture Bottom (ft) | 5756 | Depth to Propped Fracture Bottom (ft) | 5756 |
| Equivalent Number of Multiple Fracs | 1.0 | Max. Fracture Width (in) | 0.71 |
| Fracture Slurry Efficiency** | 0.74 | Avg. Fracture Width (in) | 0.39 |
| | | Avg. Proppant Concentration (lb/ft$^2$) | 1.51 |

Fracture Geometry Summary*—Interval #2

| | | | |
|---|---|---|---|
| Fracture Half-Length (ft) | 244 | Propped Half-Length (ft) | 193 |
| Total Fracture Height (ft) | 308 | Total Propped Height (ft) | 244 |
| Depth to Fracture Top (ft) | 5638 | Depth to Propped Fracture Top (ft) | 5702 |
| Depth to Fracture Bottom (ft) | 5946 | Depth to Propped Fracture Bottom (ft) | 5946 |
| Equivalent Number of Multiple Fracs | 1.0 | Max. Fracture Width (in) | 0.68 |
| Fracture Slurry Efficiency** | 0.74 | Avg. Fracture Width (in) | 0.41 |
| | | Avg. Proppant Concentration (lb/ft$^2$) | 1.52 |

Fracture Geometry Summary*—Interval #3

| | | | |
|---|---|---|---|
| Fracture Half-Length (ft) | 252 | Propped Half-Length (ft) | 197 |
| Total Fracture Height (ft) | 305 | Total Propped Height (ft) | 238 |
| Depth to Fracture Top (ft) | 5882 | Depth to Propped Fracture Top (ft) | 5949 |
| Depth to Fracture Bottom (ft) | 6187 | Depth to Propped Fracture Bottom (ft) | 6186 |
| Equivalent Number of Multiple Fracs | 1.0 | Max. Fracture Width (in) | 0.69 |
| Fracture Slurry Efficiency** | 0.73 | Avg. Fracture Width (in) | 0.39 |
| | | Avg. Proppant Concentration (lb/ft$^2$) | 1.52 |

Fracture Conductivity Summary*—Interval #1

| | | | |
|---|---|---|---|
| Avg. Conductivity** (mD · ft) | 757.0 | Avg. Frac Width (Closed on prop) (in) | 0.104 |
| Dimensionless Conductivity** | 37.09 | Ref. Formation Permeability (mD) | 0.1 |
| Proppant Damage Factor | 0.50 | Undamaged Prop Perm at Stress (mD) | 164207 |
| Apparent Damage Factor*** | 0.00 | Prop Perm with Prop Damage (mD) | 82103 |
| Total Damage Factor | 0.50 | Prop Perm with Total Damage (mD) | 82103 |
| Effective Propped Length (ft) | 196 | Proppant Embedment (in) | 0.008 |

Fracture Conductivity Summary*—Interval #2

| | | | |
|---|---|---|---|
| Avg. Conductivity** (mD · ft) | 770.7 | Avg. Frac Width (Closed on prop) (in) | 0.104 |
| Dimensionless Conductivity** | 39.90 | Ref. Formation Permeability (mD) | 0.1 |
| Proppant Damage Factor | 0.50 | Undamaged Prop Perm at Stress (mD) | 164207 |
| Apparent Damage Factor*** | 0.00 | Prop Perm with Prop Damage (mD) | 82103 |
| Total Damage Factor | 0.50 | Prop Perm with Total Damage (mD) | 82103 |
| Effective Propped Length (ft) | 186 | Proppant Embedment (in) | 0.008 |

Fracture Conductivity Summary*—Interval #3

| | | | |
|---|---|---|---|
| Avg. Conductivity** (mD · ft) | 749.4 | Avg. Frac Width (Closed on prop) (in) | 0.104 |
| Dimensionless Conductivity** | 38.05 | Ref. Formation Permeability (mD) | 0.1 |
| Proppant Damage Factor | 0.50 | Undamaged Prop Perm at Stress (mD) | 164207 |
| Apparent Damage Factor*** | 0.00 | Prop Perm with Prop Damage (mD) | 82103 |
| Total Damage Factor | 0.50 | Prop Perm with Total Damage (mD) | 82103 |
| Effective Propped Length (ft) | 189 | Proppant Embedment (in) | 0.008 |

Fracture Pressure Summary*—Interval #1

| | | | |
|---|---|---|---|
| Model Net Pressure** (psi) | 727 | BH Fracture Closure Stress (psi) | 5050 |
| Observed Net Pressure** (psi) | 0 | Closure Stress Gradient (psi/ft) | 0.898 |
| Hydrostatic Head*** (psi) | 2670 | Avg. Surface Pressure (psi) | 4007 |
| Reservoir Pressure (psi) | 2635 | Max. Surface Pressure (psi) | 4852 |

Fracture Pressure Summary*—Interval #2

| | | | |
|---|---|---|---|
| Model Net Pressure** (psi) | 707 | BH Fracture Closure Stress (psi) | 5050 |
| Observed Net Pressure** (psi) | 0 | Closure Stress Gradient (psi/ft) | 0.867 |
| Hydrostatic Head*** (psi) | 2670 | Avg. Surface Pressure (psi) | 4007 |
| Reservoir Pressure (psi) | 2635 | Max. Surface Pressure (psi) | 4852 |

Fracture Pressure Summary*—Interval #3

| | | | |
|---|---|---|---|
| Model Net Pressure** (psi) | 694 | BH Fracture Closure Stress (psi) | 5050 |
| Observed Net Pressure** (psi) | 0 | Closure Stress Gradient (psi/ft) | 0.834 |
| Hydrostatic Head*** (psi) | 2670 | Avg. Surface Pressure (psi) | 4007 |
| Reservoir Pressure (psi) | 2635 | Max. Surface Pressure (psi) | 4852 |

Operations Summary*—Interval #1

| | | | |
|---|---|---|---|
| Total Clean Fluid Pumped (bbls) | 869.7 | Total Proppant Pumped (klbs) | 205,800 |
| Total Slurry Pumped (bbls) | 994.1 | Total Proppant in Fracture (klbs) | 69,500 |
| Pad Volume (bbls) | 1190.5 | Avg. Hydraulic Horsepower (hp) | 3923 |
| Pad Fraction (% of Slurry Vol)** | 42.9 | Max. Hydraulic Horsepower (hp) | 4751 |
| Pad Fraction (% of Clean Vol)** | 49.5 | Avg Btm Slurry Rate (bpm) | 13.6 |
| Primary Fluid Type | VIKING_D_3500 | Primary Proppant Type | Example 2 |
| Secondary Fluid Type | | Secondary Proppant Type | |

Operations Summary*—Interval #2

| | | | |
|---|---|---|---|
| Total Clean Fluid Pumped (bbls) | 849.0 | Total Proppant Pumped (klbs) | 205,800 |
| Total Slurry Pumped (bbls) | 971.6 | Total Proppant in Fracture (klbs) | 68,300 |
| Pad Volume (bbls) | 1190.5 | Avg. Hydraulic Horsepower (hp) | 3923 |
| Pad Fraction (% of Slurry Vol)** | 42.9 | Max. Hydraulic Horsepower (hp) | 4751 |
| Pad Fraction (% of Clean Vol)** | 49.5 | Avg Btm Slurry Rate (bpm) | 13.3 |
| Primary Fluid Type | VIKING_D_3500 | Primary Proppant Type | Example 2 |
| Secondary Fluid Type | | Secondary Proppant Type | |

Operations Summary*—Interval #3

| | | | |
|---|---|---|---|
| Total Clean Fluid Pumped (bbls) | 833.2 | Total Proppant Pumped (klbs) | 205,800 |
| Total Slurry Pumped (bbls) | 953.5 | Total Proppant in Fracture (klbs) | 67,000 |
| Pad Volume (bbls) | 1190.5 | Avg. Hydraulic Horsepower (hp) | 3923 |
| Pad Fraction (% of Slurry Vol)** | 42.9 | Max. Hydraulic Horsepower (hp) | 4751 |
| Pad Fraction (% of Clean Vol)** | 49.5 | Avg Btm Slurry Rate (bpm) | 13.1 |
| Primary Fluid Type | VIKING_D_3500 | Primary Proppant Type | Example 2 |
| Secondary Fluid Type | | Secondary Proppant Type | |

Model Calibration Summary

| | |
|---|---|
| Crack Opening Coefficient | 8.50e−01 |
| Width Decoupling Coefficient was calculated internally | 1.00e+00 |
| Tip Effects Coefficient | 1.00e−04 |
| Tip Radius Fraction | 1.00e−02 |
| Tip Effects Scale Volume (bbls) | 100.0 |

-continued

| | |
|---|---|
| Proppant Drag Effect Exponent | 8.0 |
| CLE Outside Payzone | 1.00 |
| Multiple fractures settings start (V/L/O) | 1.0/1.0/1.0 |
| Multiple fractures settings end (V/L/O) | 1.0/1.0/1.0 |

Hydraulic Fracture Growth History*—Interval #1

| End of Stage # | Stage Type | Time (mm:ss) | Fracture Half-Length (ft) | Fracture Height (ft) | Fracture Width at Well (in) | Avg. Fracture Width (in) | Model Net Pressure (psi) | Slurry Efficiency | Equivalent Number of Multifracs |
|---|---|---|---|---|---|---|---|---|---|
| 1 | Main frac pad | 29:45 | 223 | 220 | 0.498 | 0.251 | 645 | 0.70 | 1.0 |
| 2 | Main frac slurry | 31:42 | 228 | 228 | 0.506 | 0.253 | 646 | 0.70 | 1.0 |
| 3 | Main frac slurry | 33:49 | 234 | 236 | 0.513 | 0.255 | 646 | 0.70 | 1.0 |
| 4 | Main frac slurry | 41:23 | 251 | 260 | 0.537 | 0.267 | 650 | 0.71 | 1.0 |
| 5 | Main frac slurry | 53:09 | 257 | 283 | 0.593 | 0.311 | 678 | 0.72 | 1.0 |
| 6 | Main frac slurry | 69:22 | 262 | 303 | 0.691 | 0.379 | 718 | 0.74 | 1.0 |
| 7 | Main frac flush | 72:56 | 263 | 307 | 0.711 | 0.394 | 727 | 0.74 | 1.0 |

Hydraulic Fracture Growth History*—Interval #2

| End of Stage # | Stage Type | Time (mm:ss) | Fracture Half-Length (ft) | Fracture Height (ft) | Fracture Width at Well (in) | Avg. Fracture Width (in) | Model Net Pressure (psi) | Slurry Efficiency | Equivalent Number of Multifracs |
|---|---|---|---|---|---|---|---|---|---|
| 1 | Main frac pad | 29:45 | 214 | 219 | 0.485 | 0.254 | 634 | 0.69 | 1.0 |
| 2 | Main frac slurry | 31:42 | 218 | 226 | 0.492 | 0.257 | 635 | 0.70 | 1.0 |
| 3 | Main frac slurry | 33:49 | 221 | 233 | 0.505 | 0.265 | 640 | 0.70 | 1.0 |
| 4 | Main frac slurry | 41:23 | 227 | 255 | 0.542 | 0.291 | 656 | 0.71 | 1.0 |
| 5 | Main frac slurry | 53:09 | 234 | 285 | 0.595 | 0.331 | 676 | 0.73 | 1.0 |
| 6 | Main frac slurry | 69:22 | 242 | 304 | 0.668 | 0.400 | 703 | 0.74 | 1.0 |
| 7 | Main frac flush | 72:56 | 244 | 308 | 0.680 | 0.413 | 707 | 0.74 | 1.0 |

Hydraulic Fracture Growth History*—Interval #3

| End of Stage # | Stage Type | Time (mm:ss) | Fracture Half-Length (ft) | Fracture Height (ft) | Fracture Width at Well (in) | Avg. Fracture Width (in) | Model Net Pressure (psi) | Slurry Efficiency | Equivalent Number of Multifracs |
|---|---|---|---|---|---|---|---|---|---|
| 1 | Main frac pad | 29:45 | 211 | 216 | 0.474 | 0.245 | 613 | 0.68 | 1.0 |
| 2 | Main frac slurry | 31:42 | 216 | 224 | 0.481 | 0.247 | 614 | 0.68 | 1.0 |
| 3 | Main frac slurry | 33:49 | 221 | 231 | 0.489 | 0.250 | 614 | 0.68 | 1.0 |
| 4 | Main frac slurry | 41:23 | 238 | 256 | 0.516 | 0.263 | 619 | 0.69 | 1.0 |
| 5 | Main frac slurry | 53:09 | 246 | 280 | 0.572 | 0.306 | 645 | 0.71 | 1.0 |
| 6 | Main frac slurry | 69:22 | 251 | 301 | 0.669 | 0.375 | 685 | 0.73 | 1.0 |
| 7 | Main frac flush | 72:56 | 252 | 305 | 0.689 | 0.389 | 694 | 0.73 | 1.0 |

Propped Fracture Properties by Distance from the Well at Fracture Center at Depth of 5603 ft—Interval #1

| Distance from Well (ft) | Fracture System Width* (in) | Conductivity per Frac** (mD·ft) | Frac System Conductivity*** (mD·ft) | Prop Conc per Frac (lb/ft$^2$) | Frac System Prop Conc**** (lb/ft$^2$) |
|---|---|---|---|---|---|
| 20.4 | 0.617 | 1106.6 | 1106.6 | 1.55 | 1.55 |
| 40.8 | 0.611 | 1573.0 | 1573.0 | 2.18 | 2.18 |
| 61.2 | 0.601 | 1546.7 | 1546.7 | 2.15 | 2.15 |
| 81.6 | 0.588 | 1520.1 | 1520.1 | 2.11 | 2.11 |
| 102.0 | 0.570 | 1480.5 | 1480.5 | 2.06 | 2.06 |
| 122.5 | 0.547 | 1318.5 | 1318.5 | 1.85 | 1.85 |
| 142.9 | 0.519 | 1224.8 | 1224.8 | 1.73 | 1.73 |
| 163.3 | 0.485 | 1039.5 | 1039.5 | 1.49 | 1.49 |
| 183.7 | 0.442 | 616.9 | 616.9 | 0.93 | 0.93 |
| 204.1 | 0.390 | 0.0 | 0.0 | 0.00 | 0.00 |

Propped Fracture Properties by Distance from the Well at Fracture Center at Depth of 5792 ft—Interval #2

| Distance from Well (ft) | Fracture System Width* (in) | Conductivity per Frac** (mD · ft) | Frac System Conductivity*** (mD · ft) | Prop Conc per Frac (lb/ft²) | Frac System Prop Conc**** (lb/ft²) |
|---|---|---|---|---|---|
| 19.3 | 0.628 | 1566.0 | 1566.0 | 2.17 | 2.17 |
| 38.6 | 0.622 | 1580.7 | 1580.7 | 2.19 | 2.19 |
| 58.0 | 0.612 | 1553.1 | 1553.1 | 2.15 | 2.15 |
| 77.3 | 0.597 | 1521.9 | 1521.9 | 2.11 | 2.11 |
| 96.6 | 0.578 | 1474.4 | 1474.4 | 2.05 | 2.05 |
| 115.9 | 0.554 | 1304.3 | 1304.3 | 1.83 | 1.83 |
| 135.2 | 0.524 | 1222.6 | 1222.6 | 1.73 | 1.73 |
| 154.5 | 0.487 | 1051.9 | 1051.9 | 1.50 | 1.50 |
| 173.9 | 0.441 | 737.4 | 737.4 | 1.09 | 1.09 |
| 193.2 | 0.384 | 0.0 | 0.0 | 0.00 | 0.00 |

Propped Fracture Properties by Distance from the Well at Fracture Center at Death of 6034 ft—Interval #3

| Distance from Well (ft) | Fracture System Width* (in) | Conductivity per Frac** (mD · ft) | Frac System Conductivity*** (mD · ft) | Prop Conc per Frac (lb/ft²) | Frac System Prop Conc**** (lb/ft²) |
|---|---|---|---|---|---|
| 19.7 | 0.612 | 1569.8 | 1569.8 | 2.18 | 2.18 |
| 39.4 | 0.607 | 1556.2 | 1556.2 | 2.16 | 2.16 |
| 59.1 | 0.597 | 1529.8 | 1529.8 | 2.12 | 2.12 |
| 78.8 | 0.583 | 1507.9 | 1507.9 | 2.10 | 2.10 |
| 98.5 | 0.565 | 1465.3 | 1465.3 | 2.04 | 2.04 |
| 118.2 | 0.543 | 1302.1 | 1302.1 | 1.83 | 1.83 |
| 137.9 | 0.514 | 1219.2 | 1219.2 | 1.72 | 1.72 |
| 157.5 | 0.480 | 1039.7 | 1039.7 | 1.49 | 1.49 |
| 177.2 | 0.437 | 678.4 | 678.4 | 1.01 | 1.01 |
| 196.9 | 0.384 | 0.0 | 0.0 | 0.00 | 0.00 |

Treatment Schedule

| Stage # | Stage Type | Elapsed Time min:sec | Fluid Type | Clean Volume (gal) | Prop Conc (ppg) | Stage Prop. (klbs) | Slurry Rate (bpm) | Proppant Type |
|---|---|---|---|---|---|---|---|---|
|  | Wellbore Fluid |  | LINEAR_20_GW-32 | 6050 |  |  |  |  |
| 1 | Main frac pad | 29:45 | VIKING_D_3500 | 50000 | 0.00 | 0.0 | 40.00 |  |
| 2 | Main frac slurry | 31:42 | VIKING_D_3500 | 3000 | 1.2 | 3.6 | 40.00 | Example 2 |
| 3 | Main frac slurry | 33:49 | VIKING_D_3500 | 3000 | 2.0 | 2.2 | 40.00 | Example 2 |
| 4 | Main frac slurry | 41:23 | VIKING_D_3500 | 10000 | 3.6 | 36.0 | 40.00 | Example 2 |
| 5 | Main frac slurry | 53:09 | VIKING_D_3500 | 15000 | 4.2 | 63.0 | 40.00 | Example 2 |
| 6 | Main frac slurry | 69:22 | VIKING_D_3500 | 20000 | 4.8 | 96 | 40.00 | Example 2 |
| 7 | Main frac flush | 72:56 | LINEAR_20_GW-32 | 6000 | 0.00 | 0.0 | 40.00 |  |

Proppant and Fluid

| Material | Quantity | Units |
|---|---|---|
| VIKING_D_3500 | 2404.8 | bbls |
| LINEAR_20_GW-32 | 142.9 | bbls |
| Example 2 | 343.00 | klbs |

Leakoff Parameters

| | | | |
|---|---|---|---|
| Reservoir type | User Spec | Reservoir fluid compressibility (1/psi) | 3.80e−04 |
| Filtrate to pore fluid perm. ratio, Kp/Kl | 10.00 | Reservoir Viscosity (cp) | 0.03 |
| Reservoir pore pressure (psi) | 2635 | Porosity | 0.10 |
| Initial fracturing pressure (psi) | 5563 | Gas Leakoff Percentage (%) | 100.00 |

Reservoir Parameters

| | |
|---|---|
| Reservoir Temperature (° F.) | 176.00 |
| Perforated Interval and Initial Frac Depth are for Interval #1 | |
| Depth to center of Perfs (ft) | 5624 |
| Perforated interval (ft) | 7 |
| Initial frac depth (ft) | 5624 |

Layer Parameters

| Layer # | Top of zone (ft) | Stress (psi) | Stress Gradient (psi/ft) | Young's modulus (psi) | Poisson's ratio | Total Ct (ft/min$^{1/2}$) | Pore Fluid Perm. (mD) |
|---|---|---|---|---|---|---|---|
| 1 | 0.0 | 5238 | 0.932 | 2.0e+06 | 0.25 | 0.000e+00 | 0.00e+00 |
| 2 | 5620.0 | 4692 | 0.832 | 3.0e+06 | 0.20 | 2.208e−03 | 1.00e−01 |
| 3 | 5660.0 | 5350 | 0.932 | 2.0e+06 | 0.25 | 0.000e+00 | 0.00e+00 |
| 4 | 5820.0 | 4859 | 0.832 | 3.0e+06 | 0.20 | 2.208e−03 | 1.00e−01 |
| 5 | 5860.0 | 5550 | 0.932 | 2.0e+06 | 0.25 | 0.000e+00 | 0.00e+00 |
| 6 | 6050.0 | 5050 | 0.832 | 3.0e+06 | 0.20 | 2.208e−03 | 1.00e−01 |
| 7 | 6090.0 | 5676 | 0.932 | 2.0e+06 | 0.25 | 0.000e+00 | 0.00e+00 |

Lithology Parameters

| Layer # | Top of zone (ft) | Lithology | Fracture Toughness (psi·in$^{1/2}$) | Composite Layering Effect |
|---|---|---|---|---|
| 1 | 0.0 | Shale | 2000 | 1.00 |
| 2 | 5620.0 | Sandstone | 1000 | 1.00 |
| 3 | 5660.0 | Shale | 2000 | 1.00 |
| 4 | 5820.0 | Sandstone | 1000 | 1.00 |
| 5 | 5860.0 | Shale | 2000 | 1.00 |
| 6 | 6050.0 | Sandstone | 1000 | 1.00 |
| 7 | 6090.0 | Shale | 2000 | 1.00 |

Casino Configuration

| Length (ft) | Segment Type | Casing ID (in) | Casing OD (in) | Weight (lb/ft) | Grade |
|---|---|---|---|---|---|
| 6500 | Cemented Casing | 4.950 | 5.500 | 15.500 | K-55 |

Perforated Intervals

| | Interval #1 | Interval #2 | Interval #3 |
|---|---|---|---|
| Top of Perfs - TVD (ft) | 5620 | 5820 | 6052 |
| Bot of Perfs - TVD (ft) | 5627 | 5827 | 6059 |
| Top of Perfs - MD (ft) | 5620 | 5820 | 6052 |
| Bot of Perfs - MD (ft) | 5627 | 5827 | 6059 |
| Perforation Diameter (in) | 0.320 | 0.320 | 0.320 |
| # of Perforations | 7 | 7 | 7 |

Path Summary

| Segment Type | Length (ft) | MD (ft) | TVD (ft) | Dev (deg) | Ann OD (in) | Ann ID (in) | Pipe ID (in) |
|---|---|---|---|---|---|---|---|
| Casing | 6052 | 6052 | 6052 | 0.0 | 0.000 | 0.000 | 4.950 |

Model Input Parameters

| Fracture Model | 3D User-Defined | Reservoir Data Entry | Lithology-Based |
|---|---|---|---|
| Run From | Job-Design Data | Fracture Orientation | Vertical |
| Proppant Transport Model | Proppant Convection | | Run Fracture and Wellbore Models |
| Growth after Shut-in | Allow | | General Iteration |

-continued

| Fracture Model | 3D User-Defined | Reservoir Data Entry | Lithology-Based |
|---|---|---|---|
| Backstress | Ignore | Heat Transfer Effects | Ignore |
| Acid Fracturing Model | FracproPT (Default) | Leakoff Model | Lumped-Parameter (Default) |

Fracture Growth Parameters (3D User-Defined)

| Parameter | Value | Default |
|---|---|---|
| Crack Opening Coefficient | 8.50e−01 | 8.50e−01 |
| Tip Effects Coefficient | 1.00e−04 | 1.00e−04 |
| Channel Flow Coefficient | 1.00e+00 | 1.00e+00 |
| Tip Radius Fraction | 1.00e−02 | 1.00e−02 |
| Tip Effects Scale Volume (bbls) | 100.0 | 100.0 |
| Fluid Radial Weighting Exponent | 0.00e+00 | 0.00e+00 |
| Width Decoupling Coefficient was calculated internally | 1.00e+00 | 1.00e+00 |

Proppant Model Parameters

| Parameter | Value | Default |
|---|---|---|
| Minimum Proppant Concentration (lb/ft$^2$) | 0.20 | 0.20 |
| Minimum Proppant Diameter (in) | 0.0080 | 0.0080 |
| Minimum Detectable Proppant Concentration (ppg) | 0.20 | 0.20 |
| Proppant Drag Effect Exponent | 8.0 | 8.0 |
| Proppant Radial Weighting Exponent | 0.2500 | 0.2500 |
| Proppant Convection Coefficient | 10.00 | 10.00 |
| Proppant Settling Coefficient | 1.00 | 1.00 |
| Quadratic Backfill Model | ON | ON |
| Tip Screen-Out Backfill Coefficient | 0.50 | 0.50 |
| Stop Model on Screenout | ON | ON |
| Reset Proppant in Fracture after Closure | ON | ON |

Low Level Parameters

| Parameter | Value | Default |
|---|---|---|
| Perm. Contrast: Distance Effect | 3.0 | 1.0 |
| Perm. Contrast: Containment Effect | 3.0 | 1.0 |
| Perm. Contrast: Permeability Level | 1.00 | 1.00 |
| Perm. Contrast Model: FracproPT Default | YES | |
| Fluid <gel> Bulk Modulus (psi) | 3.000e+10 | 3.000e+10 |
| Proppant Bulk Modulus (psi) | 3.000e+06 | 3.000e+06 |
| Fluid (gel) Bulk Coefficient of Thermal Expansion (1/deg. F.) | 3.000e−04 | 3.000e−04 |
| Effect of Proppant on Length Growth | 1.00 | 1.00 |
| Fraction of BRACKET FRAC Proppant that is INVERTA-FRAC by Volume | 0.5 | 0.5 |
| Remember Position of Proppant Banks after closure on Proppant | NO | NO |

-continued

| Parameter | Value | Default |
|---|---|---|
| Allow Slippage | NO | NO |
| Reset Fluid Leakoff after Frac Closure | NO | NO |
| Minimum Volume Limit Value | 0.20 | 0.20 |
| Center Shifting Option: | | |
| Fracture Always Stays Connected to Perfs | | X |
| Stages can Move from Perfs after Shut-in | X | |
| Fracture can Move from Perfs after Shut-in | | |
| Fracture can Move from Perfs at any Time | | |
| Stage Splitting Volume Threshold (bbls) | 200.0 | 200.0 |
| Stage Splitting Leakoff Compensation (bbls) | 5.0 | 5.0 |

Initial Leakoff and Closure

| Parameter | Value | Default |
|---|---|---|
| Initial Leakoff Area Multiplier Coefficient | 1.000 | 1.000 |
| Initial Leakoff Area from Last Simulation (ft$^2$) | 4268.528 | n/a |
| Closure Leakoff Area Multiplier Coefficient | 0.025 | 0.025 |
| Default Shut-in Model | YES | YES |
| Shut-in Tip Weighting Coefficient for Leakoff | 1.00 | 1.00 |
| Shut-in Tip Weighting Exponent for Leakoff | 1.00 | 1.00 |
| Minimum Shut-in Volume (bbls) | 100.0 | 100.0 |
| Model Proppant in Flow-back | YES | YES |
| Model Wall-building Viscosity Effect | YES | NO |

Miscellaneous Growth Parameters

| Parameter | Value | Default |
|---|---|---|
| Set Minimum Fracture Height | NO | NO |
| Model Very Small Fractures | NO | NO |
| Model Head Effects in Fracture | NO | NO |
| Model Fracture Center Shifting | YES | NO |
| Near-Wellbore Friction Exponent | 0.50 | 0.50 |

Example 30

Enhanced Hydrocarbon Recovery Using PsDCs

Figure 62:
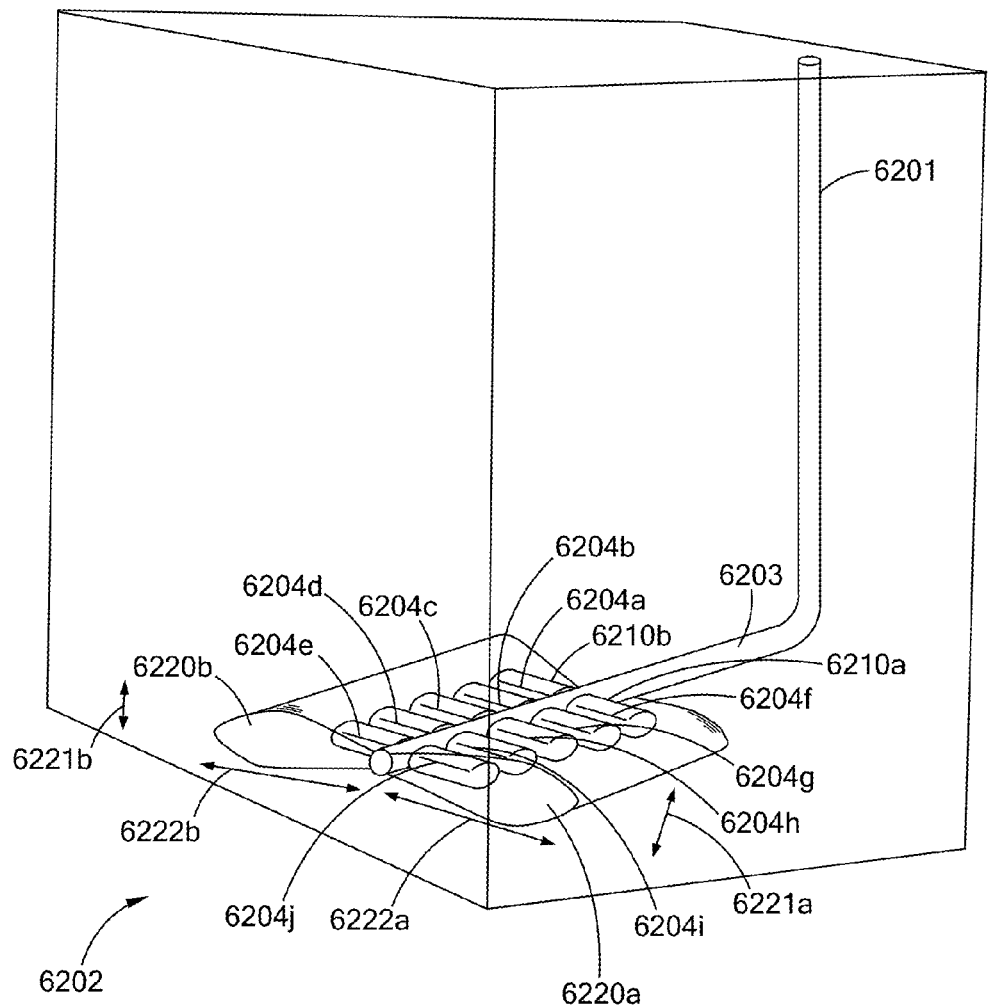
FIG. 62 is a perspective view of a formation showing increased propped area and geometry for an embodiment of a PsDC in accordance with the present invention.

Turning to FIG. 62, there is shown a schematic perspective view of a well 6201 in a portion of a formation 6202. The well 6201 has an essentially horizontal section 6203 that generally follows a reservoir of hydrocarbons in the formation. A perforating operation has been performed on the well 6201, leaving perforations, 6204a, 6204b, 6204c, 6204d, 6204e, 6204f, 6204g, 6204h, 6204i, 6204j extending from the horizontal section 6203 of well 6201 into the formation 6202. There is shown a fracture zone or area, e.g., 6210a, 6210b within the reservoir that is typical for prior proppant fracturing, using for example a sand as the proppant. And, there is shown a fracture zone or area 6220a, 6220b that is obtainable with a PsDC, such as an embodiment of the PsDC proppants of these examples, e.g., Example 2, 35, 42, 49, 53, 54, and 55. The PsDC fracture zone 6220a, 6220b is substantially higher (as shown by arrows 6221a, 6221b) and longer (as shown by arrows 6222a, 6222b each indicating a half-length of the fracture) than the prior art fracture zone 6210a, 6210b.

Example 30A

Still using FIG. 62 for illustrative purposes, the low density PsDCs of Example 2 extend out greater half-lengths 6222a, and 6222b away from the well 6203 and extend up and down greater heights 6221a, 6221b from the center line of the perforations, 6204a-6204j, providing for a substantially larger surface area from which the hydrocarbons can flow. These enlarged surface areas may be at least about 20% larger, at least about 50% larger, at least about 100% larger, at least about 200% larger and larger still.

This enlarged surface areas 6220a, 6220b result in increased initial flows of hydrocarbons by at least about 5%, at least about 10%, at least about 20%, at least about 40% and more over the smaller areas 6210a, 6210b that are obtained with prior proppants.

The PsDC fracture well may also maintain the increased flow, and experience less degradation of flow or production over time, when compared to a fractured using prior proppant. Thus, the PsDC fractured well may provide natural gas production of at least about 200 Mcf/day, at least about 800 Mcf/day, at least about 1,200 Mcf/day or more for at least about 12 months, at least about 18 months, at least about 24 months or more.

Figure 63:
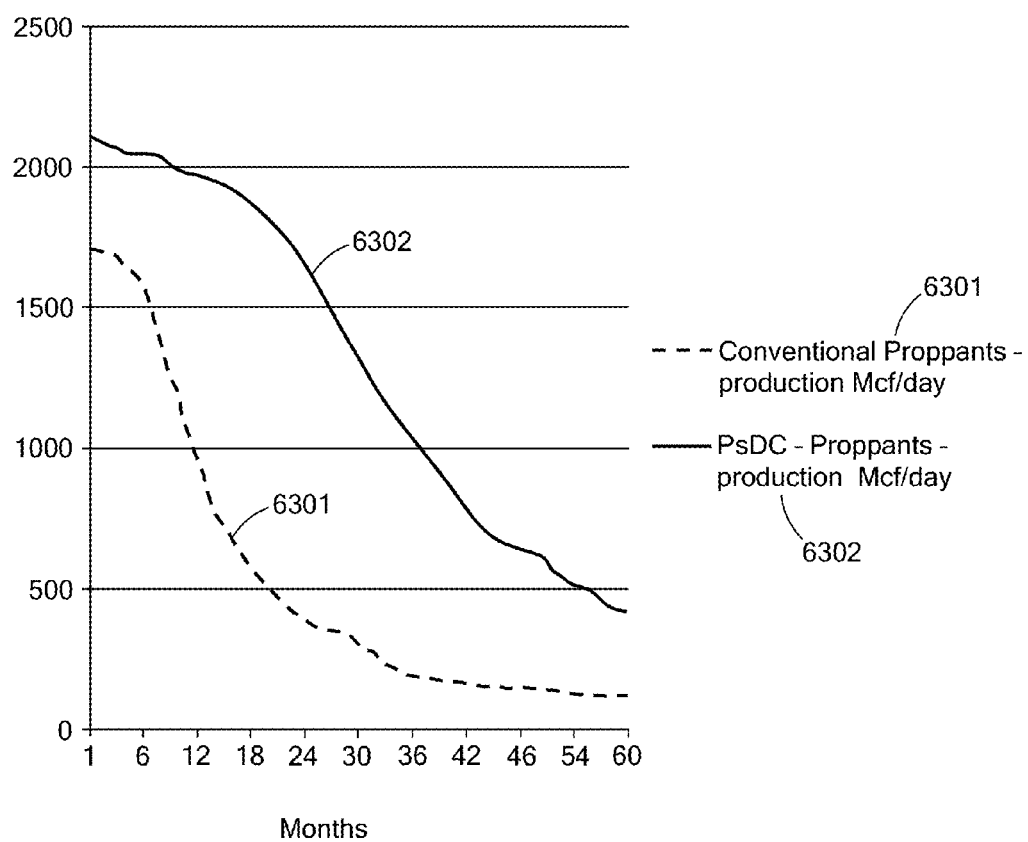
FIG. 63 is a chart showing the increase in natural gas production for an embodiment of a PsDC hydraulic fracture treatment in accordance with the present invention as compared to a conventional proppant.

Turning to FIG. 63 there is shown a graph comparing the production over time of a Marcellus shale gas well using conventional, i.e., prior proppant fracturing 6301, and using PsDC fracturing 6302.

Example 31

A proppant is made from the following precursor batch: 70% Methyl Hydrogen Fluid; 20% Tetravinyltetramethylcyclotetrasiloxane; and 10% Vinyl Terminated Polydimethylsiloxane (200 cps, ~9400 Mw, SiSiB® VF6030 VINYL TERMINATED POLYDIMETHYL SILOXANE 68083-19-2)

Using a tower system, this batch is formed from a sonic nozzle having an internal diameter of 0.180 inches into droplets that fall from the nozzle into and through an 18 foot curing tower. The temperature at the top of the tower is from 200-500° C. the temperature at the bottom of the tower is from 200-600° C. There are no discrete temperature zones in the tower. Airflow up the tower is by convection. The collection pan is maintained at 110° C. The forming and curing are done in air. The preform proppants are removed from the pan and post (hard) cured at 200° C. in air for 3 hours. The hard cured preform proppants are pyrolized at 1000° C. in an argon atmosphere for 2 hours. The cure yield is from 99% to 101%. The char yield is 86%.

Example 32

Studies by Coulter & Wells (e.g. SPE JPT, June 1972, pp. 643-650) have demonstrated that as little as 5% added fines, from prior art proppants, can reduce propped fracture conductivity by 50%. The API (ISO) test classifies a proppant according to the stress at which <10% fines is generated; for example an API (ISO) 7 k proppant would produce <10% fines at 7000 psi. Embodiments of PsDCs, however, exhibit surprising and exceptionally improved conductivities for materials having the same API (ISO) crush strength, when compared to prior art proppants.

Thus, and surprisingly, these embodiments of PsDCs have a substantially different behavior from prior art proppants. It is believed and theorized that the PsDCs have a different failure mechanism than prior art proppants.

Thus, it is presently theorized that embodiments of the PsDCs upon failure exhibit fines that are larger and more jagged than the fines that are produced upon the failure of prior art proppants. Additionally, it is presently theorized that charge, e.g., the electrostatic charge of the PsDCs, could be potentially providing the ability to hold the fines together, and thus may provide one of may explanations for the enhanced flow and flow back characteristics of embodiments of the PsDC proppants.

Figure 64:
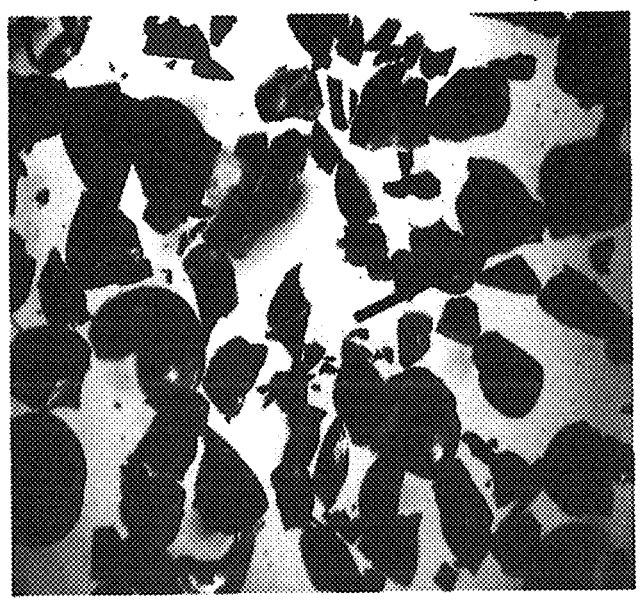
FIG. 64 is a photograph of the fines created at 4 k API (ISO) crush test of an embodiment of proppants in accordance with the present invention.
Figure 65:
FIG. 65 is a photograph of the fines created at 5 k API (ISO) crush test of an embodiment of proppants in accordance with the present invention.

Thus, for example, turning to FIG. 64 there is shown a photograph of the fines created at 4 k API (ISO) crush test of the proppants of Example 1; and in FIG. 65 there is shown a photograph of the fines created at 5 k API (ISO) crush test of the proppants of Example 1. This can be compared against the fines created from prior art proppants, which are smaller, finer, and more likely to plug, clog, or create a filter cake that adversely affects conductivity. It is theorized that, for this embodiment, this different failure mechanism, and different type of fines created, explains the increased conductivity values that PsDCs exhibit after failure.

Regardless of the failure mechanism, fluid flow, or hydraulic mechanisms taking place, the PsDCs exhibit surprising and exceptional improved conductivities over prior art proppants.

Example 33

A polysilocarb formulation has 40% MHF, 40% TV, and 20% VT and has a hydride to vinyl molar ratio of 1.12:1, and may be used as to form strong ceramic beads, e.g., proppants for use in hydraulically fracturing hydrocarbon producing formations.

Example 34

A polysilocarb formulation has 42% MHF, 38% TV, and 20% VT and has a hydride to vinyl molar ratio of 1.26:1, and may be used as to form strong ceramic beads, e.g., proppants for use in hydraulically fracturing hydrocarbon producing formations.

Example 35

A polysilocarb formulation has 46% MHF, 34% TV, and 20% VT and has a hydride to vinyl molar ratio of 1.50:1, and may be used as to form strong ceramic beads, e.g., proppants for use in hydraulically fracturing hydrocarbon producing formations.

Example 36

A polysilocarb formulation has 49% MHF, 31% TV, and 30% VT and has a hydride to vinyl molar ratio of 1.75:1, and may be used as to form strong ceramic beads, e.g., proppants for use in hydraulically fracturing hydrocarbon producing formations.

Example 37

A polysilocarb formulation has 51% MHF, 49% TV, and 0% VT and has a hydride to vinyl molar ratio of 1.26:1, and may be used as to form strong ceramic beads, e.g., proppants for use in hydraulically fracturing hydrocarbon producing formations.

Example 38

A polysilocarb formulation has 55% MHF, 35% TV, and 10% VT and has a hydride to vinyl molar ratio of 1.82:1, and may be used as to form strong ceramic beads, e.g., proppants for use in hydraulically fracturing hydrocarbon producing formations.

Example 39

A polysilocarb formulation has 52% MHF, 28% TV, and 20% VT and has a hydride to vinyl molar ratio of 2.02:1, and may be used as to form strong ceramic beads, e.g., proppants for use in hydraulically fracturing hydrocarbon producing formations.

Example 40

A polysilocarb formulation has 55% MHF, 25% TV, and 20% VT and has a hydride to vinyl molar ratio of 2.36:1, and may be used as to form strong ceramic beads, e.g., proppants for use in hydraulically fracturing hydrocarbon producing formations.

Example 41

A polysilocarb formulation has 65% MHF, 25% TV, and 10% VT and has a hydride to vinyl molar ratio of 2.96:1, and may be used as to form strong ceramic beads, e.g., proppants for use in hydraulically fracturing hydrocarbon producing formations.

Example 42

A polysilocarb formulation has 70% MHF, 20% TV, and 10% VT and has a hydride to vinyl molar ratio of 3:93:1, and may be used as to form strong ceramic beads, e.g., proppants for use in hydraulically fracturing hydrocarbon producing formations.

Example 43

A polysilocarb formulation has 72% MHF, 18% TV, and 10% VT and has a hydride to vinyl molar ratio of 4.45:1, and may be used as to form strong ceramic beads, e.g., proppants for use in hydraulically fracturing hydrocarbon producing formations.

Example 44

A polysilocarb formulation has 75% MHF, 17% TV, and 8% VT and has a hydride to vinyl molar ratio of 4.97:1, and may be used as to form strong ceramic beads, e.g., proppants for use in hydraulically fracturing hydrocarbon producing formations.

Example 45

A polysilocarb formulation has 95% MHF, 5% TV, and 0% VT and has a hydride to vinyl molar ratio of 23.02:1, and may be used as to form strong ceramic beads, e.g., proppants for use in hydraulically fracturing hydrocarbon producing formations.

Example 46

Using the reaction type process a precursor formulation was made using the following formulation. The temperature of the reaction was maintained at 72° C. for 21 hours. This precursor formulation may be used to make a strong synthetic proppant.

| Reactant or Solvent | Mass | % of Total | MW | Moles of Reactant/ solvent | % of Total Moles of Silane | Moles of Si | Moles of EtOH |
|---|---|---|---|---|---|---|---|
| Methyltriethoxysilane (FIG. 46) | 0.00 | 0.0% | 178.30 | — | 0.00% | — | — |
| Phenylmethyldiethoxysilane (FIG. 47) | 0.00 | 0.0% | 210.35 | — | 0.00% | — | — |
| Dimethyldiethoxysilane (FIG. 51) | 56 | 7.2% | 148.28 | 0.38 | 17.71% | 0.38 | 0.76 |
| Methyldiethoxysilane (FIG. 48) | 182 | 23.2% | 134.25 | 1.36 | 63.57% | 1.36 | 2.71 |
| Vinylmethyldiethoxysilane (FIG. 49) | 64 | 8.2% | 160.29 | 0.40 | 18.72% | 0.40 | 0.80 |
| Triethoxysilane (FIG. 53) | 0.00 | 0.0% | 164.27 | — | 0.00% | — | — |
| Hexane in hydrolyzer | 0.00 | 0.0% | 86.18 | — | | | |
| Acetone in hydrolyzer | 0.00 | 0.0% | 58.08 | — | | | |
| Ethanol in hydrolyzer | 400.00 | 51.1% | 46.07 | 8.68 | | | |
| Water in hydrolyzer | 80.00 | 10.2% | 18.00 | 4.44 | | | |
| HCl | 0.36 | 0.0% | 36.00 | 0.01 | | | |
| Sodium bicarbonate | 0.84 | 0.1% | 84.00 | 0.01 | | | |

Example 47

Using the reaction type process a precursor formulation was made using the following formulation. The temperature of the reaction was maintained at 61° C. for 21 hours. This precursor formulation may be used to make a strong synthetic proppant.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 54) | 145.00 | 18.5% | 240.37 | 0.60 | 34.58% | 0.60 | 1.81 |
| Phenylmethyldiethoxysilane (FIG. 47) | 0.00 | 0.0% | 210.35 | — | 0.00 | — | — |
| Dimethyldiethoxysilane (FIG. 51) | 0.00 | 0.0% | 148.28 | 0.57 | 32.88% | 0.57 | 1.55 |
| Methyldiethoxysilane (FIG. 48) | 77.00 | 9.8% | 134.25 | — | 0.00% | — | — |
| Vinylmethyldiethoxysilane (FIG. 49) | 91.00 | 11.6% | 160.29 | 0.57 | 32.54% | 0.57 | 1.14 |
| Trimethyethoxysilane (FIG. 57) | 0.00 | 0.0% | 118.25 | — | 0.00% | — | — |
| Acetone in hydrolyzer | 395.00 | 50.3% | 58.08 | 6.80 | | | |
| Ethanol in hydrolyzer | 0.00 | 0.0% | 46.07 | — | | | |
| Water in hydrolyzer | 76.00 | 9.7% | 18.00 | 4.22 | | | |
| HCl | 0.36 | 0.0% | 36.00 | 0.01 | | | |
| Sodium bicarbonate | 0.84 | 0.1% | 84.00 | 0.01 | | | |

Example 48

Using the reaction type process a precursor formulation was made using the following formulation. The temperature of the reaction was maintained at 61° C. for 21 hours. This precursor formulation may be used to make a strong synthetic proppant.

| Reactant or Solvent | Mass | % of Total | MW | Moles of Reactant/ solvent | % of Total Moles of Silane | Moles of Si | Moles of EtOH |
|---|---|---|---|---|---|---|---|
| ltriethoxysilane (FIG. 54) | 0.00 | 0.00% | 240.37 | — | 0.0% | — | — |
| Phenylmethyldiethoxysilane (FIG. 47) | 145.00 | 18.4% | 210.35 | 0.69 | 34.47% | 0.69 | 1.38 |
| Dimethyldiethoxysilane (FIG.51) | 0.00 | 0.00% | 148.28 | — | 0.00% | — | — |
| Methyldiethoxysilane (FIG. 48) | 88.00 | 11.2% | 134.25 | 0.66 | 32.78% | 0.66 | 1.31 |
| Vinylmethyldiethoxysilane (FIG. 49) | 105.00 | 13.3% | 160.29 | 0.66 | 32.76% | 0.66 | 1.31 |
| Trimethyethoxysilane (FIG. 57) | 0.00 | 0.0% | 118.25 | — | 0.00% | — | — |
| Acetone in hydrolyzer | 375.00 | 47.5% | 58.08 | 6.46 | | | |
| Ethanol in hydrolyzer | 0.00 | 0.0% | 46.07 | — | | | |
| Water in hydrolyzer | 75.00 | 9.5% | 18.00 | 4.17 | | | |
| HCl | 0.36 | 0.0% | 36.00 | 0.01 | | | |
| Sodium bicarbonate | 0.84 | 0.1% | 84.00 | 0.01 | | | |

Example 49

The treatment of pyrolized polysiloxane materials, such as for example, proppants and other volumetric shapes, with silanes, anti-static agents and combinations of these has the ability to increase, and significantly increase the strength of the pyrolized materials.

Thus, treating composition may optionally contain generally used, e.g., typical, additives such as rheology modifiers, fillers, coalescents such as glycols and glycol ethers to aid in proppant storage stability, antifoaming agents such as Drew L-139 (commercially available from Drew Industries, a division of Ashland Chemical), antistatic agents such as Emerstat 6660A (commercially available from Cognis) or Katex 6760 (from Pulcra Chemicals), dust suppression agents, and/or other generally used, e.g., typical, additives. Additives may be present in the coatings composition from trace amounts (such as <about 0.1% by weight the total composition) up to about 5.0% by weight of the total composition.

The preferable treating solution contains a silane, Silquest A1100 from Momentive and has the following chemical formula, $H_2NCH_2CH_2CH_2Si(OCH_2CH_3)_3$.

To treat proppant the following procedure may be utilized. Wash the Proppant in water (current procedure) to remove fines, Wash the Proppant in Silane/Antistat aqueous solution for 5 min (at 25 C). Remove Proppant and save all the excess Silane/Antistat solution for multiple use. Dry the Proppant at 105-110 C for 30 mins-1 hr (preferably it should be completely dry).

By way of example, 40 mesh proppant having a crush strength of 13,200 psi was treated using the above procedure and exhibited crush strengths that exceeded 17,600 psi, and more. The fine percentage for these silane treated proppants was less than 1.7%, and lower.

Example 50

Off Shore Hydrocarbon Recovery

In PsDC hydraulic fracturing treatments of offshore deep water wells is conducted using embodiments of the proppants of these examples, e.g., Example 2, 16, 17, 18, 21, 23, 35, 42, 49, 53, 54, and 55.

Existing proppants, and in particular generally used higher strength proppants, that typically have specific gravities of 2.5 and greater (e.g., FIG. 66) are failing to meet the needs of the deep water offshore hydrocarbon E&P. Such proppants increase the weight of the fracturing fluid to such an extent that pumps have great difficulty, and in many cases cannot reverse the flow of the fracturing fluid and pump the fluid from the well, if need be, during a fracturing treatment. This inability to reverse, back off, or have full control of the fracturing fluid, can result delays, cost increases, and in some cases in severe and costly damage to the well. For example, this problem can arise in water depths of 5,000 feet, and increases as the water depth, and thus the length of the riser, and column of fracturing fluid in the riser increases. Thus, the problem becomes more pronounced in water depths of 7,000 feet and greater, 8,000 feet and greater, and 10,000 feet and greater. The problem is further complicated by the MD of the wells, which further increases the total weight of the column of fracturing fluid that must be backed off, reverse flowed, or otherwise controlled. Thus, MDs of 10,000 feet and greater, 15,000 feet and greater, and 20,000 feet and greater provide significant addition weight, especially when combined with a 5,000 foot and greater column of fracture fluid in the riser.

The low specific gravity, e.g., less than 2.5, and more preferably less than 2.0, and low specific gravity to high strength ratio, provided by the synthetic proppants of the present inventions, greatly reduces the weight of the column of fracturing fluid providing the ability to back off, circulate, reverse flow, and otherwise control the movement of the fracturing fluid, and thus solves this developing, significant and potentially severe problem with prior proppants, as E&P activities move into deeper and deeper waters.

Example 50a

Figure 70:
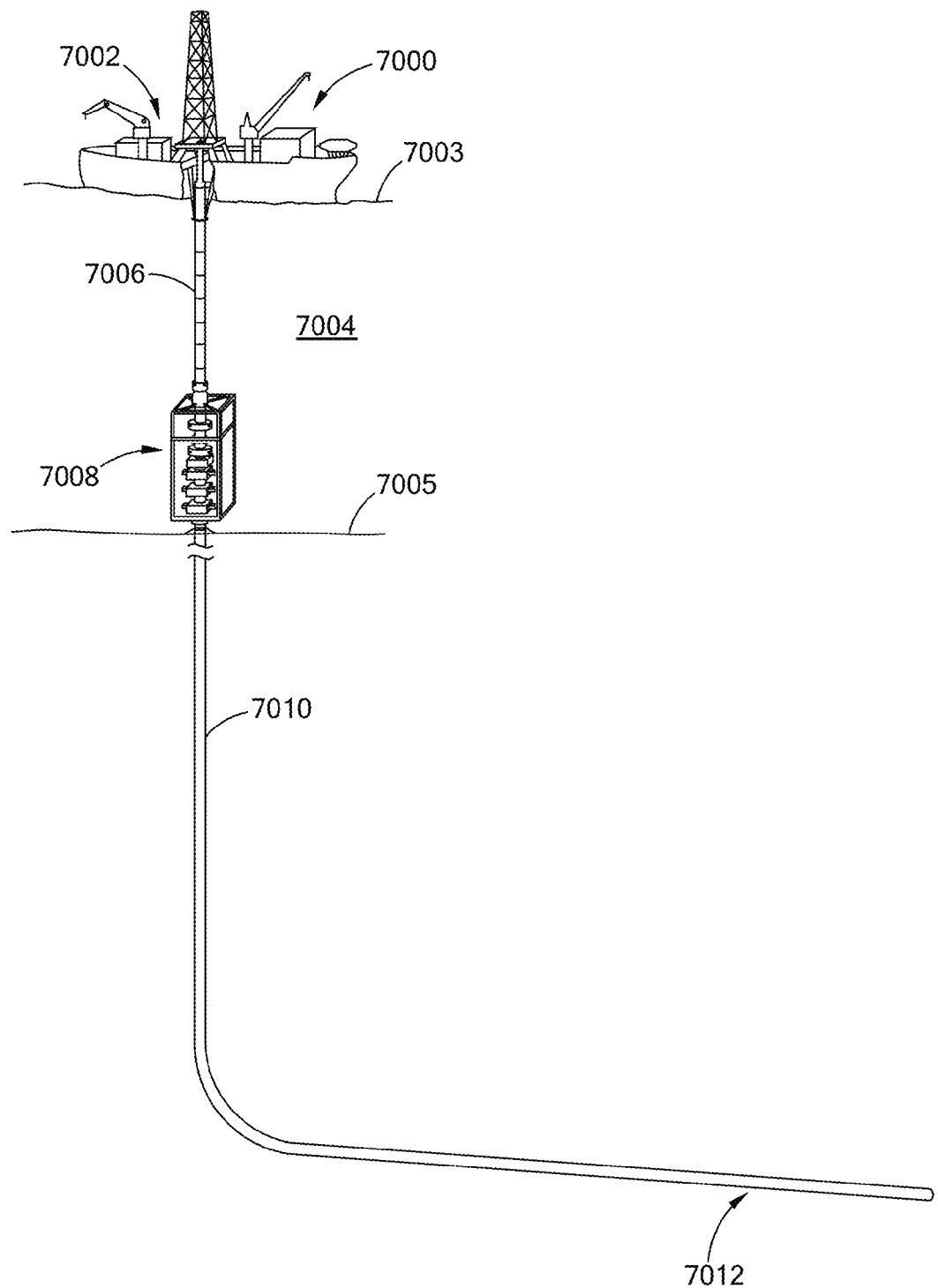
FIG. 70 is a perspective view of an off shore well.

Turning to FIG. 70 there is shown a perspective view of an off shore well. An off shore rig 7000, e.g., a dynamically positioned drill ship, has fracturing equipment 7002. The drill ship 7000 is located on the surface 7003 of a body of water 7004. A riser 7006 extends down from the drill ship 7000 to a BOP 7008 located on the sea floor 7005. The borehole 7101 extends below the sea floor 7005 to a fracture area 7012. The MD for the borehole from the sea floor to the fracture area 7012 is 10,000 feet (unless stated otherwise, in off shore wells MD is from the sea floor as the reference point). The sea floor is at a depth of about 8,000 feet and the riser has a length of about that same distance. The proppant of Example 54 is used to perform a hydraulic fracturing treatment on the fracturing area 7012.

Example 50b

Figure 71:
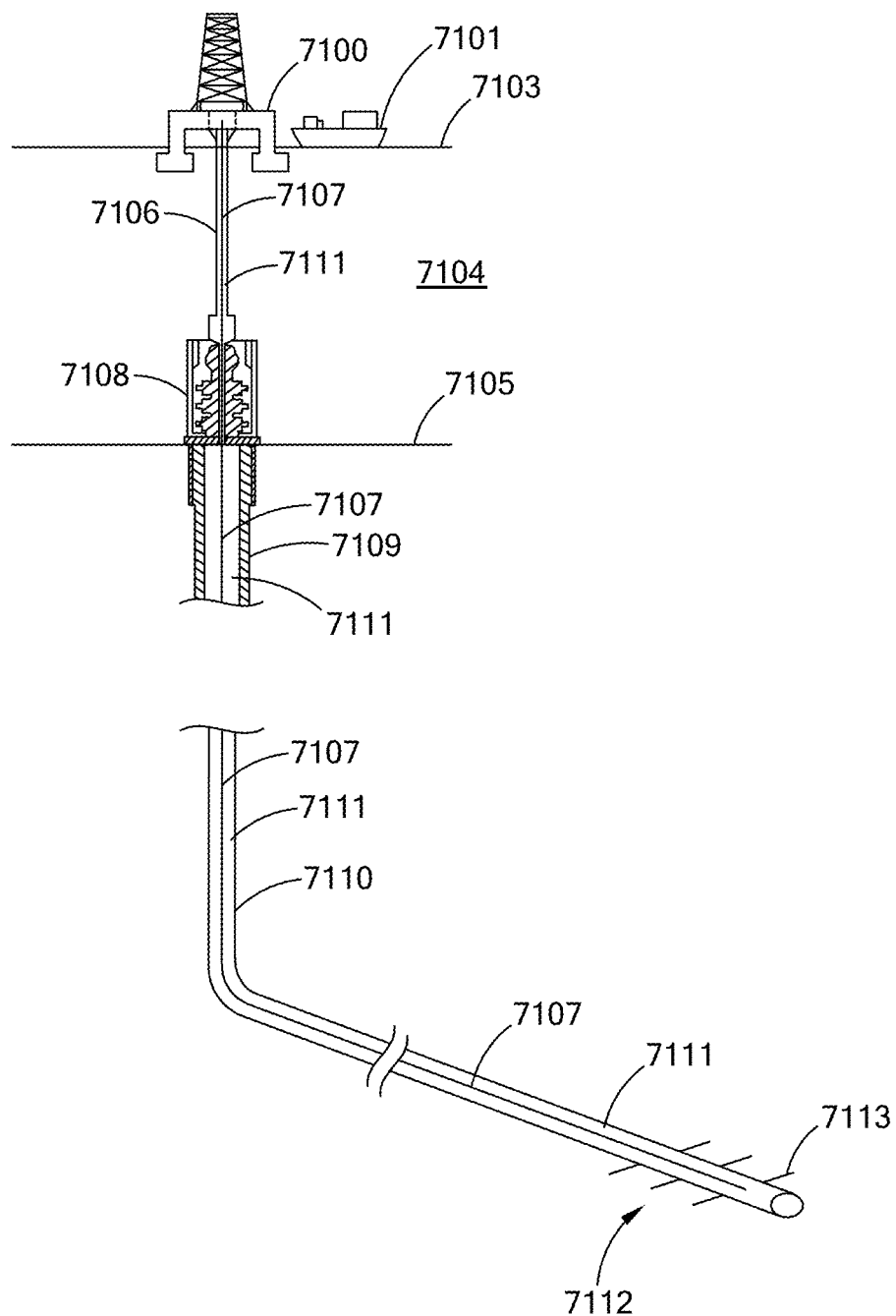
FIG. 71 is a cross sectional view of an off shore well.

Turning to FIG. 71 there is shown a cross sectional view of an off shore well. An off shore rig 7100, e.g., a dynamically positioned semi-submersible, has a vessel 7101 having fracturing equipment. The rig 7100 is located on the surface 7103 of a body of water 7104. A riser 7106 extends down from the drill ship 7100 to a BOP 7108 located on the sea floor 7105. The borehole extends below the sea floor 7105 to a fracture area 7112. The borehole has casings 7109, 7110. A pipe 7107 for transporting the fracturing fluid to the fracturing area 7112 extends from the rig 7100 to the fracture area 7112. Perforations, e.g., 7113 are present in the fracture area 7112. An annulus 7111 is located around the pipe 7107 and extends from the fracture area 7112 to the drill ship 7100 (during different stages, points of the fracturing treatment is understood that packers may be engaged, and disengaged, at strategic points in the annulus). The MD at the fracture area 7112 is about 15,000 feet. The sea floor is at a depth of about 9,000 feet and the riser has a length of about that same distance. The proppant of Example 55 is used to perform a hydraulic fracturing treatment on the fracturing area 7012.

Example 51

In a PsDC hydraulic fracturing treatment the PsDC proppants are added in a controlled manner, and at a controlled lbs/gal, using volumetric metering devices.

Example 52

In a PsDC hydraulic fracturing treatment the PsDC proppants are added using volumetric metering devices. The proppant is metered into the high pressure line, in a controlled manner. In this manner the pumps are not required to pump fracturing fluid containing proppant.

Example 53

A PsDC proppant of the type of Example 42 has the following features: high in strength resulting in less crushing, optimizing conductivity and minimizing fines generation; lower specific gravity enabling the proppant to travel further into the formation, creating longer propped fracture half-lengths and more propped surface area, resulting in greater access to reserves in place generating higher initial production (IP) and increased estimated ultimate recovery (EUR); performs well at temperatures to >2,000° F. (1,100° C.), enabling usage in virtually all O&G reservoirs; is round and has a uniform mesh distribution, maximizing conductivity and increasing the free flow of formation liquids; lowers total well costs per unit of production; not harmful to the environment and could reduce the number of wells producers must drill given its ability to access more of the reserves in place.

The proppant has a sieve analysis (% retained) of +35 Mesh/420 microns—0.1%; −35+40 mesh/354 microns—72.8%; −40+45 mesh/297 microns—27.1%; −45 mesh/250 microns—0%. The proppant has a roundness of about 1.0, a sphericity of about 1.0, a bulk density of 75.15 (lbs/ft$^3$) 1.20 (g/cc), a specific gravity of 1.98, an absolute volume of 0.61 (gal/lb), a solubility in 12/3 HCl/HF Acid (% weight loss) 5.7, API crush test, % of fines generated @ 15,000 psi 0.3.

The proppant has the long term conductivity data of Tables 4a and 4b

TABLE 4a

| Closure Stress (psi) 2 lbs/ft$^2$ 40 mesh | md-ft (millidarcy-feet) @ 250° F. |
|---|---|
| 2,000 | 2,743 |
| 4,000 | 2,510 |
| 6,000 | 2,228 |
| 8,000 | 1,697 |
| 10,000 | 1,607 |
| 12,000 | 1,544 |
| 14,000 | 1,366 |
| 15,000 | 1,228 |

TABLE 4b

| Closure stress (psi) 2 lbs/ft3 40 mesh | Darcies @ 250° F. |
|---|---|
| 2,000 | 133 |
| 4,000 | 124 |
| 6,000 | 113 |
| 8,000 | 86 |
| 10,000 | 84 |
| 12,000 | 82 |
| 14,000 | 74 |
| 15,000 | 67 |

Example 54

An embodiment of the proppant of Example 39 has a bulk density of 1.17 g/cc, a specific gravity of 1.93, a particle size distribution of 0.1% at 35 mesh, 75.2% at 40 mesh, 24.6% at 45 mesh, and 0.1% at 50 mesh, and an ISO Crush Analysis (% fines) 4 lb/ft$^2$ @ 15,000 psi of 0.6. The sample exhibits exceptional long term conductivity performance data as shown in Table 5.

TABLE 5

| Stress (psi) | Time (hrs) @ stress | Total test time (hrs) | Conductivity (md-ft) | Permeability (Darcy) | Pack Height (Test cell plate separation) (in) |
|---|---|---|---|---|---|
| 1,000 | 24 | 24 | 2263 | 111 | 0.246 |
| 2,000 | 50 | 74 | 1977 | 99 | 0.240 |
| 4,000 | 50 | 124 | 1841 | 93 | 0.237 |
| 6,000 | 50 | 174 | 1940 | 100 | 0.233 |
| 8,000 | 50 | 224 | 1769 | 93 | 0.229 |
| 10,000 | 50 | 274 | 1762 | 94 | 0.226 |
| 12,000 | 50 | 324 | 1638 | 89 | 0.221 |
| 14,000 | 50 | 374 | 1381 | 77 | 0.215 |
| 15,000 | 50 | 424 | 1187 | 68 | 0.209 |

Example 55

Figure 69:
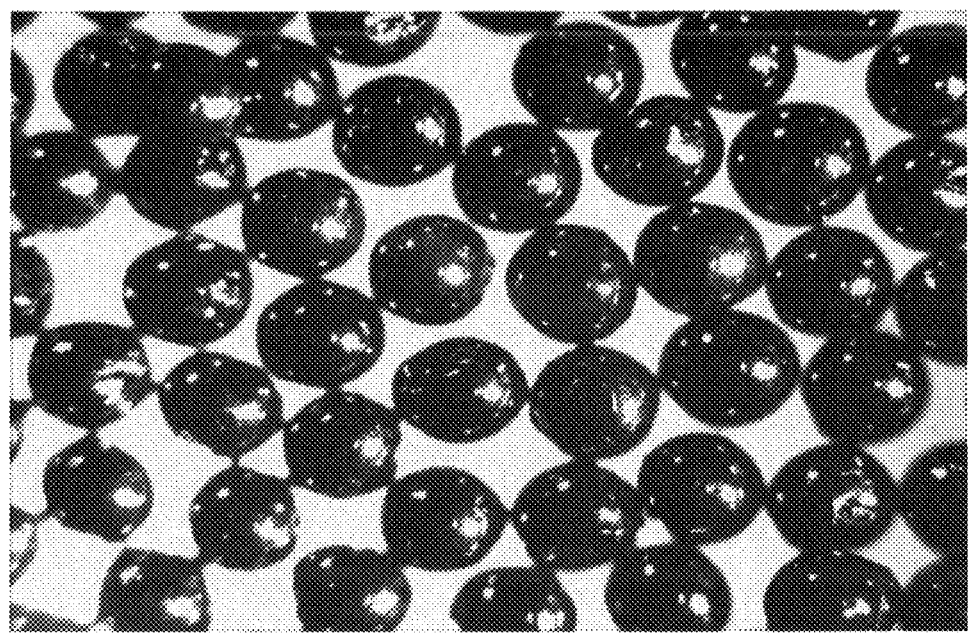
FIG. 69 is a 400× magnification of an embodiment of a PsDC proppant in accordance with the present inventions

An embodiment of the proppant of Example 35 has a bulk density of 1.24 g/cc, a specific gravity of 1.95, a particle size distribution of 0.1% at 35 mesh, 91.6% at 40 mesh, 8.2% at 45 mesh, and 0.1% at 50 mesh, and an ISO Crush Analysis (% fines) 4 lb/ft$^2$ @ 15,000 psi of 0.4. A 400× photograph of these proppants is shown in FIG. 69. The sample exhibits exceptional long term conductivity performance data as shown in Table 6.

TABLE 6

| Stress (psi) | Time (hrs) @ stress | Total test time (hrs) | Conductivity (md-ft) | Permeability (Darcy) | Pack Height (Test cell plate separation) (in) |
|---|---|---|---|---|---|
| 1,000 | 24 | 24 | 2777 | 127 | 0.262 |
| 2,000 | 50 | 74 | 2344 | 110 | 0.256 |
| 4,000 | 50 | 124 | 2051 | 98 | 0.251 |
| 6,000 | 50 | 174 | 1912 | 93 | 0.247 |
| 8,000 | 50 | 224 | 1681 | 82 | 0.245 |
| 10,000 | 50 | 274 | 1916 | 94 | 0.244 |
| 12,000 | 50 | 324 | 1717 | 86 | 0.240 |
| 14,000 | 50 | 374 | 1461 | 75 | 0.233 |
| 15,000 | 50 | 424 | 1247 | 65 | 0.229 |

Example 56

Embodiments of a PsDC formulations of Examples 35, 39 and 42 are formed into pucks. The pucks are cures and pyrolized to a ceramic. The ceramic pucks are broken apart, into small particles. The particles are sieved if need be, to have the majority of all particles smaller than 100 mesh. These particles are not spherical, are irregular and varied in shape, and have planar surfaces. These particles are PsDC proppants

Example 57

Embodiments of a PsDC formulations of Examples 35, 39 and 42 are formed into pucks. The pucks are cures and pyrolized to a ceramic. The ceramic pucks are broken apart, into small particles. The particles are sieved if need be, to have the majority of all particles smaller than 200 mesh. These particles are not spherical, are irregular and varied in shape, and have planar surfaces. These particles are PsDC proppants

Example 58

Embodiments of the proppants of these examples, e.g., Examples 56, 57, 59 and 60, are used in a hydraulic fracture treatment of an unconventional shale well. The fractures are propped with a monolayer or partial monolayer distribution of proppant. It is theorized that a self-bridging diverting phenomena takes place in situ. Prior proppants, now generally in use, do not get very far from the well bore due to settling because of their density. Embodiments of proppants of the present inventions can accomplish this due to, among other things, their size and lower density.

Example 59

Embodiments of a PsDC formulations of Examples 35, 39 and 42 are formed into small spheres using emulsion polymerization techniques. The precursor formulation is emulsified using water, alcohol, glycol, or any polar liquid having a low partition coefficient, and in which the precursor formulation is not soluble, as the emulsifier. Once formed the emulsion is broken and the small sphere are cured and pyrolized into PsDC proppants. The spheres are smaller than 100 mesh.

Example 60

Embodiments of a PsDC formulations are formed into small spheres using emulsion polymerization techniques. The precursor formulation is emulsified using water, alcohol, glycol, or any polar liquid having a low partition coefficient, and in which the precursor formulation is not soluble, as the emulsifier. Once formed the emulsion is broken and the small sphere are cured and pyrolized into PsDC proppants. The spheres are smaller than 100 mesh. In other embodiments the spheres are smaller than 150 mesh. In other embodiments the spheres are smaller than 200 mesh, and smaller.

Example 61

A jack-up off shore rig has fracturing equipment operationally associated with it. The rig is located above the surface of a body of water having a depth of 200 feet. A riser extends down from the rig to a BOP on the sea floor, and has a length of about 200 feet. A borehole extends below the sea floor into the earth to a fracture area at a MD of about 8,000 feet. The proppant of Example 55 is used to perform a hydraulic fracturing treatment on the fracturing area.

It is noted that there is no requirement to provide or address the theory underlying the novel and groundbreaking conductivities, performance or other beneficial features and properties that are the subject of, or associated with, embodiments of the present inventions. Nevertheless, various theories are provided in this specification to further advance the art in this important area, and in particular in the important area of hydrocarbon exploration and production. These theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the conductivities, fractures, drainages, resource production, and function-features of embodiments of the methods, articles, materials, devices and system of the present inventions; and such later developed theories shall not limit the scope of protection afforded the present inventions.

The various embodiments of formulations, batches, devices, systems, proppants, PsDCs, methods, hydraulic fracture treatments, hydrocarbon recovery, activities and operations set forth in this specification may be used for various oil field operations, other mineral and resource recovery fields, as well as other activities and in other fields. Additionally, these embodiments, for example, may be used with: oil field systems, operations or activities that may be developed in the future; and with existing oil field systems, operations or activities which may be modified, in-part, based on the teachings of this specification. Further, the various embodiments set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

Although this specification focuses on proppants, it should be understood that the formulations, material systems, small volumetric shapes, and methods of making them, taught and disclosed herein, may have applications and uses for many other activities in addition to hydraulic fracturing, for example, as pigments and additives.

The invention may be embodied in other forms than those specifically disclosed herein without departing from its spirit or essential characteristics. The described embodiments are to be considered in all respects only as illustrative and not restrictive.

What is claimed:

1. A method of hydraulically fracturing a well, the method comprising:
   a. preparing at least about 100,000 gallons of a hydraulic fracturing fluid, the hydraulic fracturing fluid comprising a polysiloxane derived ceramic proppant made by the process of first curing a polysiloxane precursor batch to form a cured bead and pyrolizing the cured bead to form the polysiloxane derived ceramic proppant;
   b. pumping at least about 100,000 gallons of hydraulic fracturing fluid into a borehole in a formation, and out of the borehole into the formation; whereby fractures are created in the formation; and,
   c. leaving at least some of the proppant in the fractures.

2. The method of claim 1, wherein the fracturing fluid has at least about 2 lbs per gallon of proppant.

3. The method of claim 1, wherein the fracturing fluid has at least 3 lbs per gallon of proppant.

4. The method of claim 1, wherein the fracturing fluid has at least 4 lbs per gallon of proppant.

5. The method of claim 1, wherein the proppants have a particle size distribution of at least about 95% of the proppants being within about a 10 mesh range.

6. The method of claim 1, wherein the proppants have a specific gravity of less 1.9.

7. The method of claim 1, wherein the proppants have a bulk density of less about 1.3 g/cc.

8. The method of claim 1, wherein the formation is a shale formation.

9. The method of claim 8, wherein the shale formation is Eagleford shale.

10. The method of claim 8, wherein the shale formation is Barnett shale.

11. The method of claim 8, wherein the shale formation is Bakken shale.

12. The method of claim 8, wherein the shale formation is Utica shale.

13. A method of hydraulically fracturing a well, the method comprising:
   a. preparing at least about 100,000 gallons of a hydraulic fracturing fluid, the hydraulic fracturing fluid comprising a synthetic proppant;
   b. the proppant having an apparent specific gravity of less than about 2 and a crush test of less than about 1% fines generated at 10,000 psi.;
   c. pumping at least about 100,000 gallons of hydraulic fracturing fluid into a borehole in a formation, and out of the borehole into the formation; whereby fractures are created in the formation; and,
   d. leaving at least some of the proppant in the fractures.

14. The proppant of claim 13, wherein the proppant consists essentially of silicon, carbon and oxygen.

15. The method of claim 13, wherein the fracturing fluid has at least about 2 lbs per gallon of proppant.

16. The method of claim 13, wherein the fracturing fluid has at least 3 lbs per gallon of proppant.

17. The method of claim 13, wherein the fracturing fluid has at least 4 lbs per gallon of proppant.

18. The method of claim 14, wherein the fracturing fluid has at least about 2 lbs per gallon of proppant.

19. The method of claim 14, wherein the fracturing fluid has at least 3 lbs per gallon of proppant.

20. The method of claim 14, wherein the fracturing fluid has at least 4 lbs per gallon of proppant.

21. The proppant of claim 15, wherein the proppant consists essentially of silicon, carbon and oxygen.

22. The method of claim 14, wherein the fracturing fluid has at least about 2 lbs per gallon of proppant.

23. The method of claim 15, wherein the fracturing fluid has at least about 2 lbs per gallon of proppant.

24. The method f claim 13, wherein the formation is a shale formation.

25. The method of claim 24, wherein the shale formation is Eagleford shale.

26. The method of claim 24, wherein the shale formation is Barnett shale.

27. The method of claim 24, wherein the shale formation is Bakken shale.

28. The method of claim 24, wherein the shale formation is Utica shale.

29. The method of claim 13, wherein the fracturing fluid has at least about 10 lbs per gallon of proppant.

30. The method of claim 13, wherein the fracturing fluid has at least 10 lbs per gallon of proppant.

31. The method of claim 13, wherein the fracturing fluid has at least 10 lbs per gallon of proppant.

32. A method of hydraulically fracturing a well, the method comprising:
   a. preparing at least about 100,000 gallons of a hydraulic fracturing fluid, the hydraulic fracturing fluid comprising a synthetic proppant;
   b. the proppant having an apparent specific gravity of less than about 2.0 and a crush test of less than about 1% fines generated at 15,000 psi.,
   c. pumping at least about 100,000 gallons of hydraulic fracturing fluid into a borehole in a formation, and out of the borehole into the formation; whereby fractures are created in the formation; and,
   d. leaving at least some of the proppant in the fractures.

* * * * *